(12) United States Patent
Cirik et al.

(10) Patent No.: US 12,513,546 B2
(45) Date of Patent: Dec. 30, 2025

(54) TRANSMISSIONS IN CONTROL CHANNEL REPETITION

(71) Applicant: Ofinno, LLC, Reston, VA (US)

(72) Inventors: Ali Cagatay Cirik, Chantilly, VA (US); Esmael Hejazi Dinan, McLean, VA (US); Yunjung Yi, Vienna, VA (US); Hua Zhou, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 195 days.

(21) Appl. No.: 18/195,549

(22) Filed: May 10, 2023

(65) Prior Publication Data
US 2023/0413078 A1    Dec. 21, 2023

Related U.S. Application Data

(63) Continuation of application No. 17/855,082, filed on Jun. 30, 2022, now Pat. No. 11,653,237, which is a
(Continued)

(51) Int. Cl.
*H04W 72/04* (2023.01)
*H04L 1/1812* (2023.01)
(Continued)

(52) U.S. Cl.
CPC .......... *H04W 24/08* (2013.01); *H04L 1/1812* (2013.01); *H04L 5/0053* (2013.01); *H04W 72/0446* (2013.01); *H04W 72/23* (2023.01)

(58) Field of Classification Search
CPC .......... H04W 72/0446; H04W 72/042; H04W 24/08; H04W 72/044; H04W 72/04;
(Continued)

(56) References Cited

U.S. PATENT DOCUMENTS 9,860,678 B2   1/2018  Oh
10,912,071 B2   2/2021  Panteleev et al.
(Continued)

FOREIGN PATENT DOCUMENTS

EP    3761547 A1    1/2021
JP    6122855 B2    4/2017
(Continued)

OTHER PUBLICATIONS

3GPP TS 38.212 V16.2.0 (Jun. 2020); Technical Specification; 3rd Generation Partnership Project; Technical Specification Group Radio Access Network; NR; Multiplexing and channel coding; (Release 16).
(Continued)

*Primary Examiner* — Wei Zhao
(74) *Attorney, Agent, or Firm* — Brett K. Gardner; Kavon Nasabzadeh; Jacob L. Mangan

(57) ABSTRACT

A wireless device determines a first uplink resource for transmission of a first hybrid automatic repeat request acknowledgement (HARQ-ACK) in a first time slot. The wireless device may also receive at least one repetition of downlink control information (DCI) via at least one monitoring occasion of monitoring occasions. In such embodiments, the DCI may indicate a second uplink resource for transmission of a second HARQ-ACK in the first time slot. The wireless device may also transmit the second HARQ-ACK in a second time slot after the first time slot and via an uplink resource.

20 Claims, 26 Drawing Sheets

Related U.S. Application Data continuation of application No. PCT/US2021/056164, filed on Oct. 22, 2021.

(60) Provisional application No. 63/104,224, filed on Oct. 22, 2020.

(51) Int. Cl.
| | |
|---|---|
| *H04L 5/00* | (2006.01) |
| *H04W 24/08* | (2009.01) |
| *H04W 72/0446* | (2023.01) |
| *H04W 72/23* | (2023.01) |

(58) Field of Classification Search
CPC ... H04L 5/0048; H04L 5/0053; H04L 5/0007; H04L 5/004; H04L 5/005
See application file for complete search history.

(56) References Cited

U.S. PATENT DOCUMENTS

| | | | |
|---|---|---|---|
| 11,026,257 | B2 | 6/2021 | Sarkis et al. |
| 2009/0286563 | A1 | 11/2009 | Ji et al. |
| 2012/0113886 | A1 | 5/2012 | Zhang et al. |
| 2013/0294318 | A1* | 11/2013 | Amerga ............. H04W 72/005 370/312 |
| 2016/0227582 | A1 | 8/2016 | Vajapeyam et al. |
| 2016/0345118 | A1 | 11/2016 | Oh |
| 2019/0182807 | A1 | 6/2019 | Panteleev et al. |
| 2019/0253986 | A1 | 8/2019 | Jeon et al. |
| 2019/0261325 | A1 | 8/2019 | Manolakos et al. |
| 2019/0268971 | A1 | 8/2019 | Talarico et al. |
| 2019/0327755 | A1 | 10/2019 | Xiong et al. |
| 2019/0349935 | A1 | 11/2019 | Hussain et al. |
| 2020/0022139 | A1 | 1/2020 | Zhou et al. |
| 2020/0022144 | A1 | 1/2020 | Papasakellariou |
| 2020/0028659 | A1 | 1/2020 | Huang et al. |
| 2020/0145079 | A1* | 5/2020 | Marinier ............. H04W 52/52 |
| 2020/0145167 | A1 | 5/2020 | Jung et al. |
| 2020/0145169 | A1 | 5/2020 | Zhou et al. |
| 2020/0213981 | A1 | 7/2020 | Park et al. |
| 2020/0314860 | A1 | 10/2020 | Zhou et al. |
| 2020/0328849 | A1 | 10/2020 | Noh et al. |
| 2021/0045105 | A1* | 2/2021 | Yoon ..................... H04L 5/0055 |
| 2021/0143943 | A1 | 5/2021 | Zhou et al. |

FOREIGN PATENT DOCUMENTS

| | | |
|---|---|---|
| KR | 20200050596 A | 5/2020 |
| WO | 2013/049768 A1 | 4/2013 |
| WO | 2020022940 A1 | 1/2020 |
| WO | 2020/032733 A1 | 2/2020 |
| WO | 2020/048364 A1 | 3/2020 |
| WO | 2020042528 A1 | 3/2020 |
| WO | 2020144833 A1 | 7/2020 |
| WO | 2020/198645 A1 | 10/2020 |

OTHER PUBLICATIONS

3GPP TS 38.213 V16.2.0 (Jun. 2020); Technical Specification; 3rd Generation Partnership Project; Technical Specification Group Radio Access Network; NR; Physical layer procedures for control; (Release 16).
3GPP TS 38.214 V16.2.0 (Jun. 2020); Technical Specification; 3rd Generation Partnership Project; Technical Specification Group Radio Access Network; NR; Physical layer procedures for data; (Release 16).
3GPP TS 38.300 V16.1.0 (Mar. 2020); Technical Specification; 3rd Generation Partnership Project; Technical Specification Group Radio Access Network; NR; NR and NG-RAN Overall Description; Stage 2; (Release 16).
3GPP TS 38.321 V16.1.0 (Jul. 2020); Technical Specification; 3rd Generation Partnership Project; Technical Specification Group Radio Access Network; NR; Medium Access Control (MAC) protocol specification; (Release 16).
3GPP TS 38.331 V16.1.0 (Jul. 2020); Technical Specification; 3rd Generation Partnership Project; Technical Specification Group Radio Access Network; NR; Radio Resource Control (RRC) protocol specification; (Release 16).
R1-2005285; 3GPP TSG RAN WG1 #102-e; e-Meeting, Aug. 17-28, 2020; Agenda Item: 8.1.2.1; Source: Futurewei; Title: Multi-TRP/panel for non-PDSCH; Document for: Discussion/Decision.
R1-2005364; 3GPP TSG RAN WG1 #102-e; e-Meeting, Aug. 17-28, 2020; Source: vivo; Title: Discussion on enhancement on PDCCH, PUCCH, PUSCH in MTRP scenario; Agenda Item: 8.1.2.1; Document for: Discussion and Decision.
R1-2005455; 3GPP TSG RAN WG1 Meeting #102-e; e-Meeting, Aug. 17-28, 2020; Source: ZTE; Title: Multi-TRP enhancements for PDCCH, PUCCH and PUSCH; Agenda Item: 8.1.2.1; Document for: Discussion and Decision.
R1-2005483; 3GPP TSG RAN WG1 #102-e; e-Meeting, Aug. 17-28, 2020; Agenda Item: 8.1.2.1; Source: InterDigital, Inc.; Title: Discussion on Multi-TRP Physical Channel Enhancements; Document for: Discussion and Decision.
R1-2005542; 3GPP TSG RAN WG1 #102-e; e-Meeting, Aug. 17-28, 2020; Agenda Item: 8.1.2.1; Source: Fujitsu; Title: Enhancements on Multi-TRP for PUCCH and PUSCH; Document for: Discussion.
R1-2005561; 3GPP TSG RAN WG1 Meeting #102-e; e-Meeting, Aug. 17-28, 2020; Agenda Item: 8.1.2.1; Source: Sony; Title: Considerations on Multi-TRP for PDCCH, PUCCH, PUSCH; Document for: Discussion and Decision.
R1-2005621; 3GPP TSG RAN WG1 #102-e; e-Meeting, Aug. 17-28, 2020; Agenda Item: 8.1.2.1; Source: MediaTek Inc.; Title: Enhancements on Multi-TRP for PDCCH, PUSCH and PUCCH; Document for: Discussion and Decision.
R1-2005684; 3GPP TSG RAN WG1 Meeting #102e; e-Meeting, Aug. 17-28, 2020; Source: CATT; Title: Discussion on enhancements on multi-TRP/panel for PDCCH, PUCCH and PUSCH; Agenda Item: 8.1.2.1; Document for. Discussion and Decision.
R1-2005728; 3GPP TSG RAN WG1 #102-e; e-Meeting, Aug. 17-28, 2020; Agenda item: 8.1.2.1; Source: China Telecom; Title: Discussion on multi-TRP enhancement; Document for: Discussion.
R1-2005751; 3GPP TSG RAN WG1 #102-e; e-Meeting, Aug. 17-28, 2020; Agenda item: 8.1.2.1; Source: NEC; Title: Discussion on multi-TRP for PDCCH, PUCCH and PUSCH; Document for: Discussion and Decision.
R1-2005783; 3GPP TSG RAN WG1 Meeting #102-e; E-meeting, Aug. 17-28, 2020; Agenda Item: 8.1.2.1—Enhancements on Multi-TRP for PDCCH, PUCCH and PUSCH; Source: Fraunhofer IIS, Fraunhofer HHI; Title: On multi-TRP enhancements for PDCCH and PUSCH; Document for: Decision.
R1-2005821; 3GPP TSG RAN WG1 #102-e; e-Meeting, Aug. 17-Aug. 28, 2020; Agenda Item: 8.1.2.1; Source: Lenovo, Motorola Mobility; Title: Enhancements on Multi-TRP for PDCCH, PUCCH and PUSCH; Document for: Discussion.
R1-2005859; 3GPP TSG RAN WG1 #102-e; e-Meeting, Aug. 17-28, 2020; Agenda Item: 8.1.2.1; Source: Intel Corporation; Title: Multi-TRP enhancements for PDCCH, PUCCH and PUSCH; Document for: Discussion/Decision.
R1-2005984; 3GPP TSG RAN WG1 #102-e; e-Meeting, Aug. 17-28, 2020; Source: OPPO; Title: Enhancements on multi-TRP for PDCCH, PUCCH and PUSCH; Agenda Item: 8.1.2.1; Document for: Discussion and Decision.
R1-2006129; 3GPP TSG RAN WG1 #102-e; e-Meeting, Aug. 17-28, 2020; Agenda item: 8.1.2.1; Source: Samsung; Title: Enhancements on Multi-TRP for PDCCH, PUCCH and PUSCH; Document for: Discussion and Decision.
R1-2006201; 3GPP TSG RAN WG1 #102-e; e-Meeting, Aug. 17-28, 2020; Agenda item: 8.1.2.1; Title: Enhancements on Multi-TRP for PDCCH, PUCCH and PUSCH; Source: CMCC; Document for: Discussion and Decision.
R1-2006258; 3GPP TSG RAN WG1 #102-e; e-Meeting, Aug. 17-28, 2020; Agenda Item: 8.1.2.1; Source: Spreadtrum Commu-

(56) References Cited

OTHER PUBLICATIONS nications; Title: Discussion on enhancements on Multi-TRP for PDCCH, PUCCH and PUSCH; Document for: Discussion and decision.
R1-2006367; 3GPP TSG-RAN WG1 Meeting #102; eMeeting, Aug. 17-28, 2020; Agenda Item: 8.1.2.1; Source: Ericsson; Title: On PDCCH, PUCCH and PUSCH robustness; Document for: Discussion.
R1-2006391; 3GPP TSG RAN WG1 Meeting #102-e; E-meeting, Aug. 17-28, 2020; Agenda Item: 8.1.2.1; Source: Huawei, HiSilicon; Title: Enhancements on Multi-TRP for reliability and robustness in Rel-17; Document for: Discussion and Decision.
R1-2006500; 3GPP TSG-RAN WG1 Meeting #102-e; e-Meeting, Aug. 17-28, 2020; Agenda Item: 8.1.2.1; Source: Apple Inc.; Title: On Multi-TRP Reliability Enhancement; Document for: Discussion/Decision.
R1-2006543; 3GPP TSG RAN WG1 #102-e; e-Meeting, Aug. 17-28, 2020; Agenda Item: 8.1.2.1; Source: Xiaomi; Title: Enhancements on Multi-TRP for PDCCH, PUCCH and PUSCH; Document for: Discussion and Decision.
R1-2006566; 3GPP TSG RAN WG1 #102; e-Meeting, Aug. 17-28, 2020; Source: Sharp; Title: Enhancement on multi-TRP operation for PDCCH and PUSCH; Agenda Item: 8.1.2.1; Document for: Discussion and Decision.
R1-2006597; 3GPP TSG RAN WG1 #102-e; e-Meeting, Aug. 17-28, 2020; Agenda item: 8.1.2.1; Source: LG Electronics; Title: Enhancements on Multi-TRP for PDCCH, PUCCH and PUSCH; Document for: Discussion and Decision.
R1-2006627; 3GPP TSG-RAN WG1#102-e; e-Meeting, Aug. 17-28, 2020; Agenda item: 8.1.2.1; Title: Multi-TRP Enhancements for PDCCH, PUCCH and PUSCH; Source: Convida Wireless; Document for: Discussion.
R1-2006637; 3GPP TSG-RAN WG1 #102-e; e-Meeting, Aug. 17-28, 2020; Source: Asia Pacific Telecom; Title: Discussion on enhancements on multi-TRP for uplink channels; Agenda item: 8.1.2.1; Document for: Discussion and Decision.
R1-2006719; 3GPP TSG RAN WG1 #102-e; e-Meeting, Aug. 17-Aug. 28, 2020; Source: NTT DOCOMO, Inc; Title: Discussion on MTRP for reliability; Agenda Item: 8.1.2.3; Document for: Discussion and Decision.
R1-2006791; 3GPP TSG-RAN WG1 Meeting #102-e; e-Meeting, Aug. 17-28, 2020; Agenda item: 8.1.2.1; Source: Qualcomm Incorporated; Title: Enhancements on Multi-TRP for PDCCH, PUCCH and PUSCH; Document for: Discussion/Decision.
R1-2006844; 3GPP TSG RAN WG1 #102 Meeting; e-Meeting, Aug. 17-28, 2020; Agenda item: 8.1.2.1; Source: Nokia, Nokia Shanghai Bell; Title: Enhancements for Multi-TRP URLLC schemes; Document for: Discussion and Decision.
R1-2006868; 3GPP TSG RAN WG1 #102-e; e-Meeting, Aug. 17-28, 2020; Agenda Item: 8.1.2.1; Source: ASUSTek; Title: Discussion on enhancement on M-TRP; Document for: Discussion and Decision.
R1-2006901; 3GPP TSG RAN WG1 Meeting #102-e; E-meeting, Aug. 17-28, 2020; Source: TCL communication; Title: Discussion on multi-TRP/multi-panel transmission; Agenda Item: 8.1.2.1; Document for: Discussion and Decision.
International Search Report and Written Opinion of the International Searching authority mailed Apr. 11, 2022, in International Application No. PCT/US2021/056164.
R1-1807415; 3GPP TSG RAN WG1 Meeting #93; Busan, Korea, May 21-25, 2018; Source: NTT DOCOMO, Inc.; Title: Remaining issues CA and type1 HARQ-ACK codebook; Agenda Item: 7 .1.3.4.2; Document for: Discussion and Decision.
R1-1801840; 3GPP TSG RAN WG1 Meeting #92; Athens, Greece, Feb. 26-Mar. 2, 2018; Agenda item: 7.2.3; Source: Spreadtrum Communications; Title: Discussion on PDCCH repetition for URLLC; Document for: Discussion.
R1-1803802; 3GPP TSG RAN WG1 Meeting #92bis; Sanya, China, Apr. 16-20, 2018; Source: ZTE, Sanechips; Title: Discussion on PDCCH repetition for URLLC; Agenda item: 7.2.3; Document for: Discussion and Decision.
Chinese Office Action, mailed Apr. 26, 2024, in CN Patent Application No. 2021800855474.
Notice of Allowance mailed Nov. 15, 2024 in JP Patent Application No. 2023-524632.
Brazilian Office Action mailed Jul. 10, 2025 in BR Patent Application No. 1120230074185.

\* cited by examiner

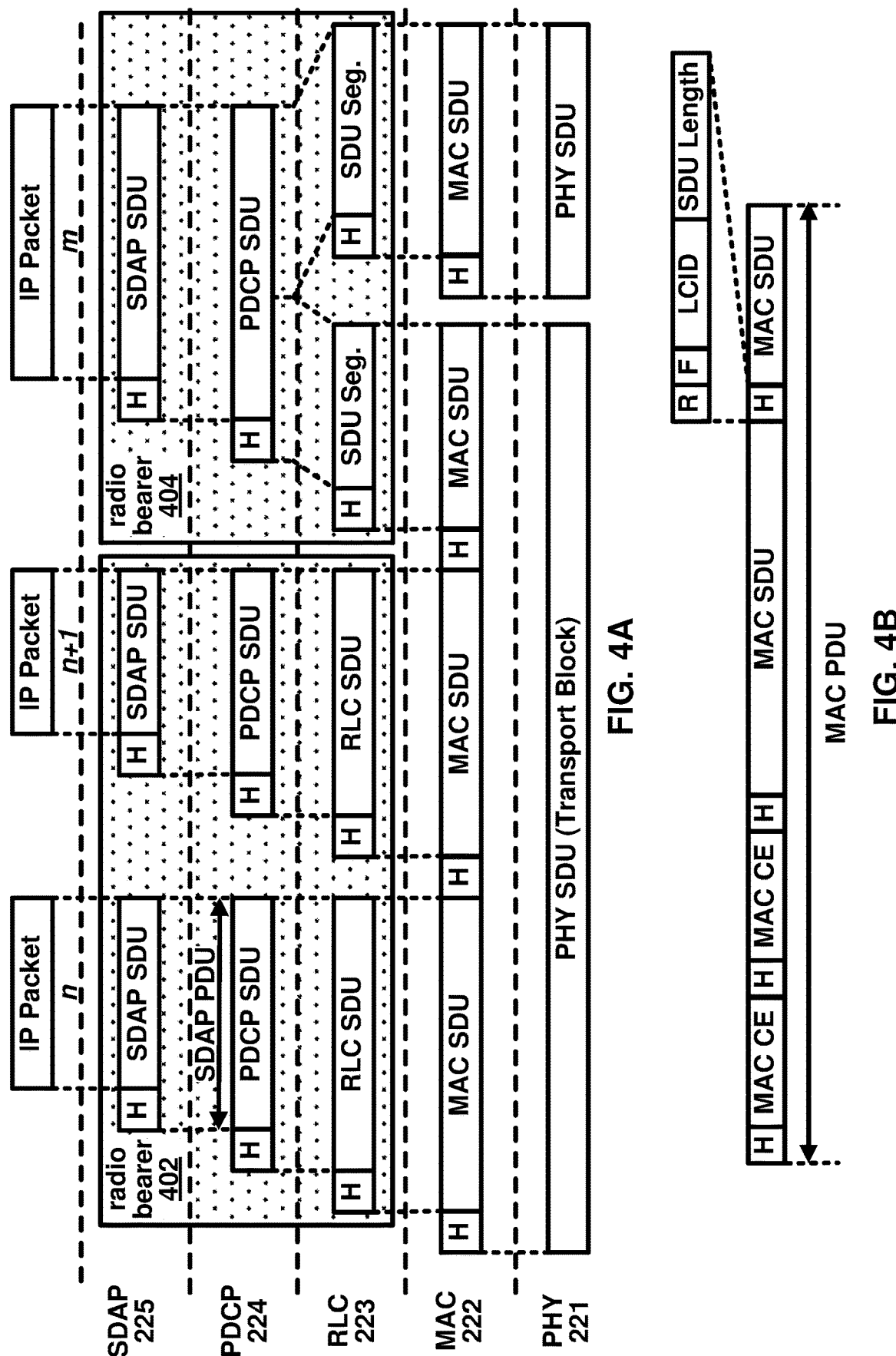

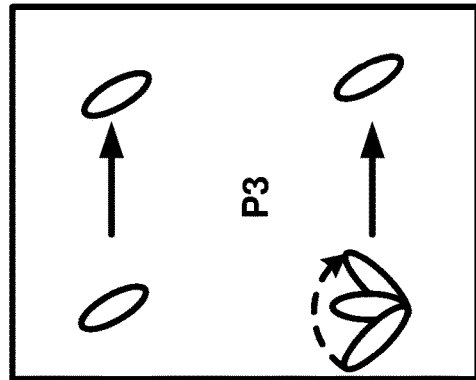
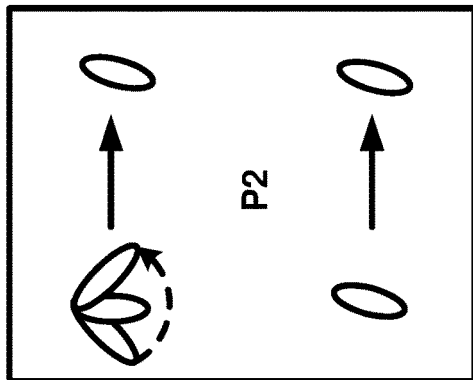
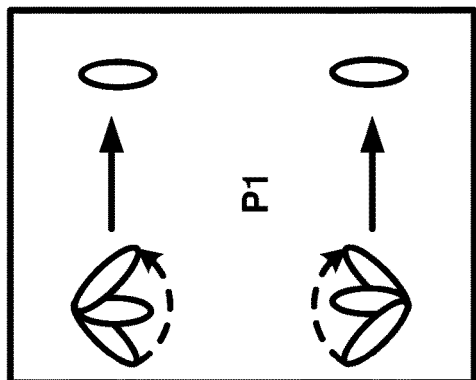
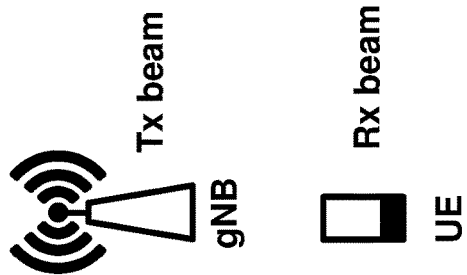
FIG. 12A
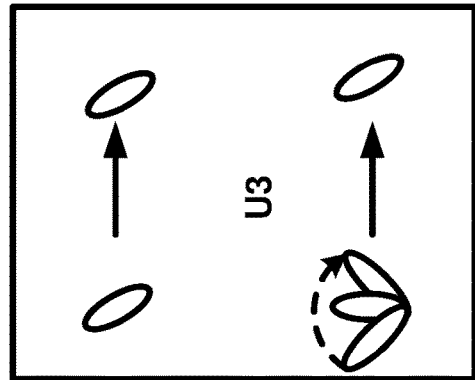
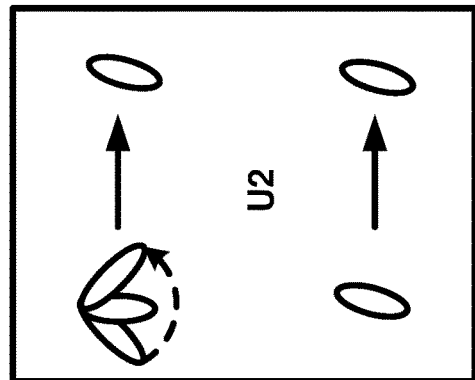
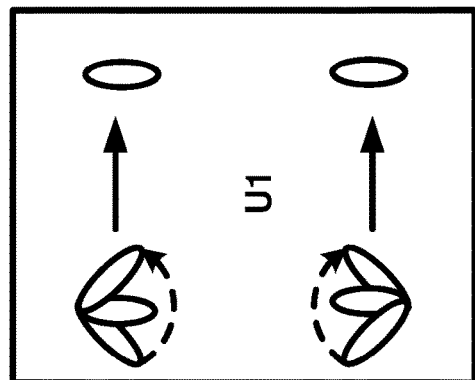
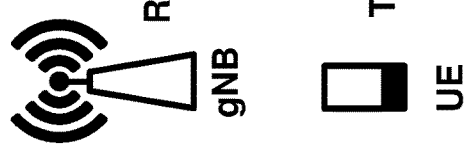
FIG. 12B

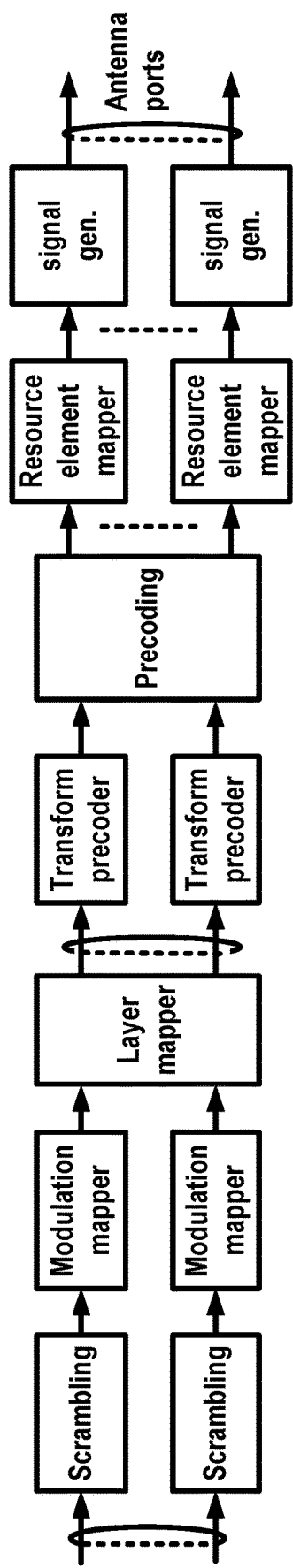
FIG. 16A
FIG. 16B
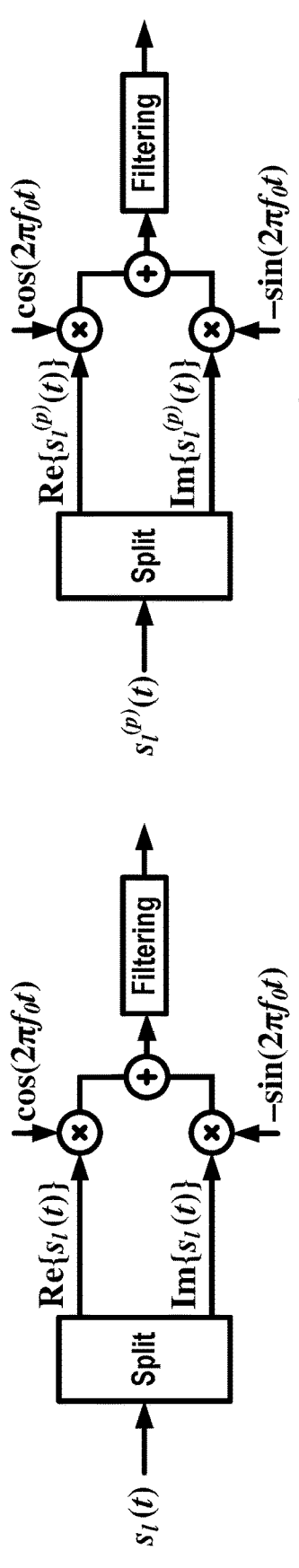
FIG. 16D
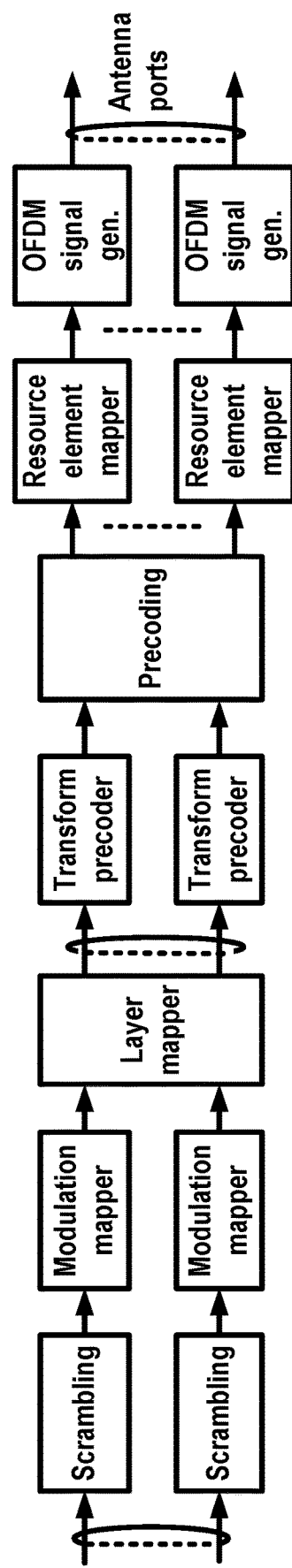
FIG. 16C

```
ControlResourceSet ::=          SEQUENCE {
  controlResourceSetId              ControlResourceSetId,
  frequencyDomainResources          BIT STRING (SIZE (45)),
  duration                          INTEGER (1..maxCoReSetDuration),
  cce-REG-MappingType CHOICE {
    interleaved             SEQUENCE {
      reg-BundleSize            ENUMERATED {n2, n3, n6},
      interleaverSize           ENUMERATED {n2, n3, n6},
      shiftIndex                INTEGER(0..maxNrofPhysicalResourceBlocks-1)
    nonInterleaved                NULL
  },
  precoderGranularity               ENUMERATED {sameAsREG-
bundle, allContiguousRBs},
  tci-StatesPDCCH-ToAddList         SEQUENCE(SIZE (1..maxNrofTCI-StatesPDCCH))
OF TCI-StateId
  tci-StatesPDCCH-ToReleaseList     SEQUENCE(SIZE (1..maxNrofTCI-StatesPDCCH))
OF TCI-StateId
  tci-PresentInDCI                  ENUMERATED {enabled}
  pdcch-DMRS-ScramblingID           INTEGER (0..65535)
...,
[[
  rb-Offset-r16                     INTEGER (0..5)
  tci-PresentInDCI-Format1-2-r16    INTEGER (1..3)
  coresetPoolIndex-r16              INTEGER (0..1)
  controlResourceSetId-v16xy        ControlResourceSetId-v16xy]]}
```

FIG. 18

TRANSMISSIONS IN CONTROL CHANNEL REPETITION

CROSS-REFERENCE TO RELATED APPLICATIONS

This application is a continuation of U.S. patent application Ser. No. 17/855,082, filed Jun. 30, 2022, which is a continuation International Application No. PCT/US2021/056164, filed Oct. 22, 2021, which claims the benefit of U.S. Provisional Application No. 63/104,224, filed Oct. 22, 2020, all of which are hereby incorporated by reference in their entireties.

BRIEF DESCRIPTION OF THE DRAWINGS

Examples of several of the various embodiments of the present disclosure are described herein with reference to the drawings.

FIG. 4A illustrates an example downlink data flow through the NR user plane protocol stack of FIG. 2A.

FIG. 4B illustrates an example format of a MAC subheader in a MAC PDU.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 18 illustrates example configuration parameters for a coreset as per an aspect of an embodiment of the present disclosure.

DETAILED DESCRIPTION

Figure 1A:
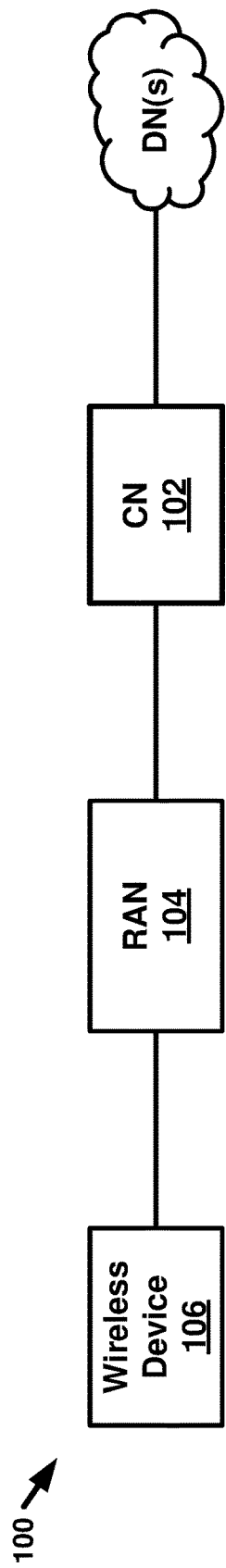
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
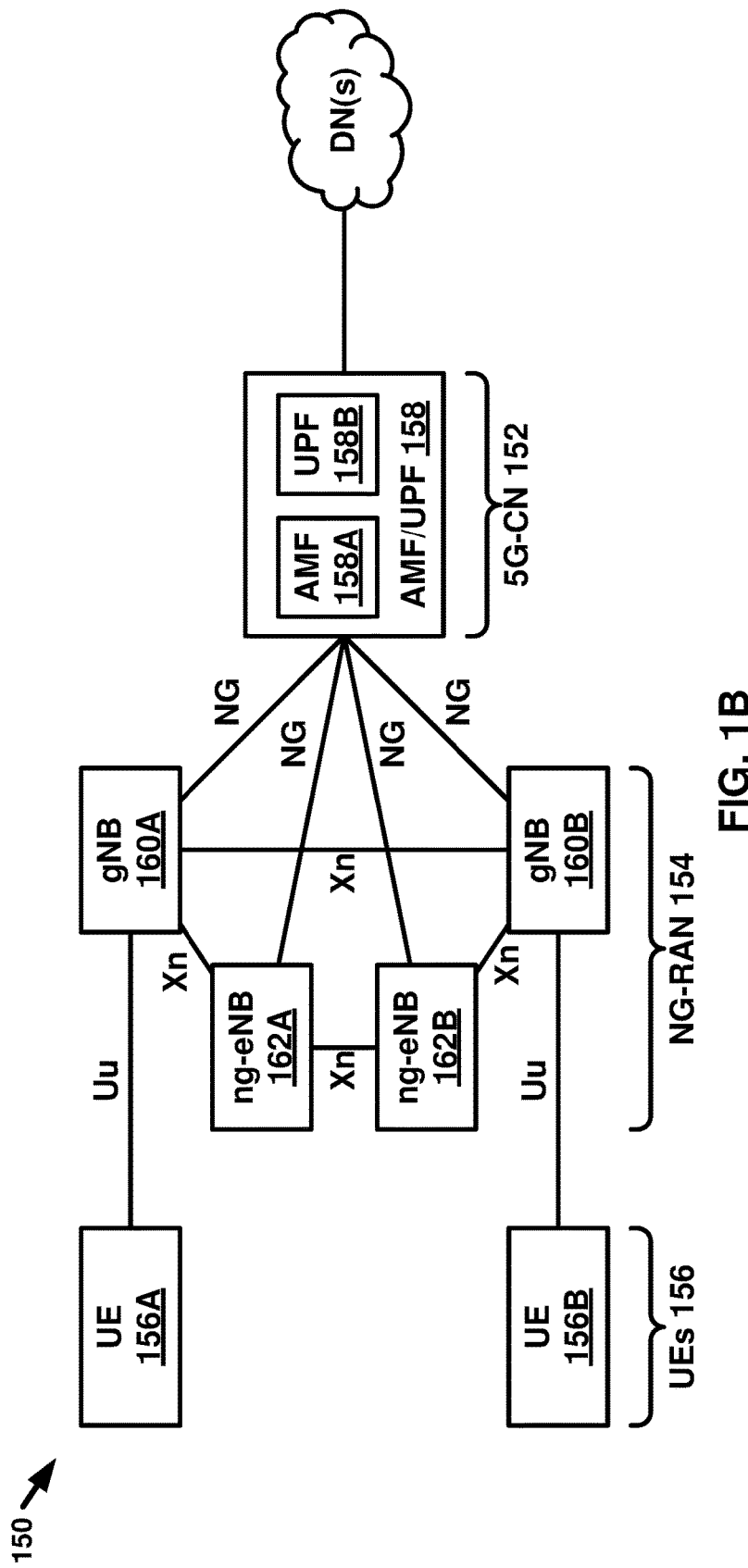

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interlace and to other base stations by an Xn interface. The NG and Xn interlaces may be established using direct physical connections and/or indirect connections over an underlying transport network, such as an internet protocol (IP) transport network. The gNBs 160 and/or the ng-eNBs 162 may be connected to the UEs 156 by means of a Uu interlace. For example, as illustrated in FIG. 1B, gNB 160A may be connected to the UE 156A by means of a Uu interlace. The NG, Xn, and Uu interlaces are associated with a protocol stack. The protocol stacks associated with the interlaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interlaces. For example, the gNB 160A may be connected to the UPF 158B of the AMF/UPF 158 by means of an NG-User plane (NG-U) interlace. The NG-U interlace may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interlace may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interlace. For example, the gNB 160A may provide NR user plane and control plane protocol terminations toward the UE 156A over a Uu interlace associated with a first protocol stack. The ng-eNBs 162 may provide Evolved UMTS Terrestrial Radio Access (E-UTRA) user plane and control plane protocol terminations towards the UEs 156 over a Uu interlace, where E-UTRA refers to the 3GPP 4G radio-access technology. For example, the ng-eNB 162B may provide E-UTRA user plane and control plane protocol terminations towards the UE 156B over a Uu interlace associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
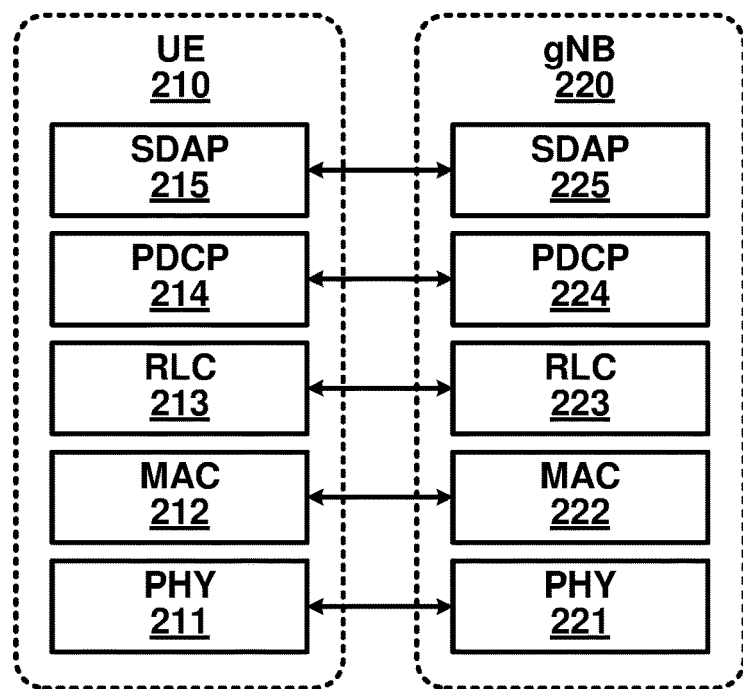
FIG. 2A and FIG. 2B respectively illustrate a New Radio (NR) user plane and control plane protocol stack.
Figure 2B:
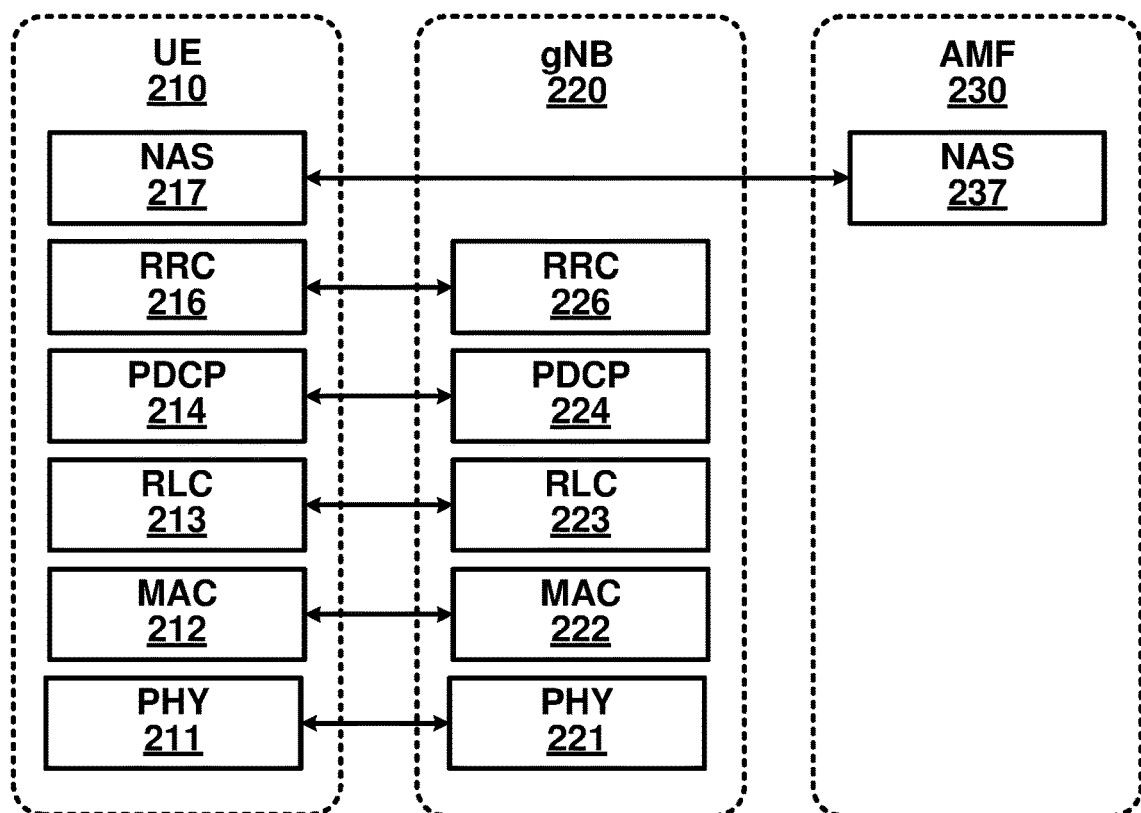

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
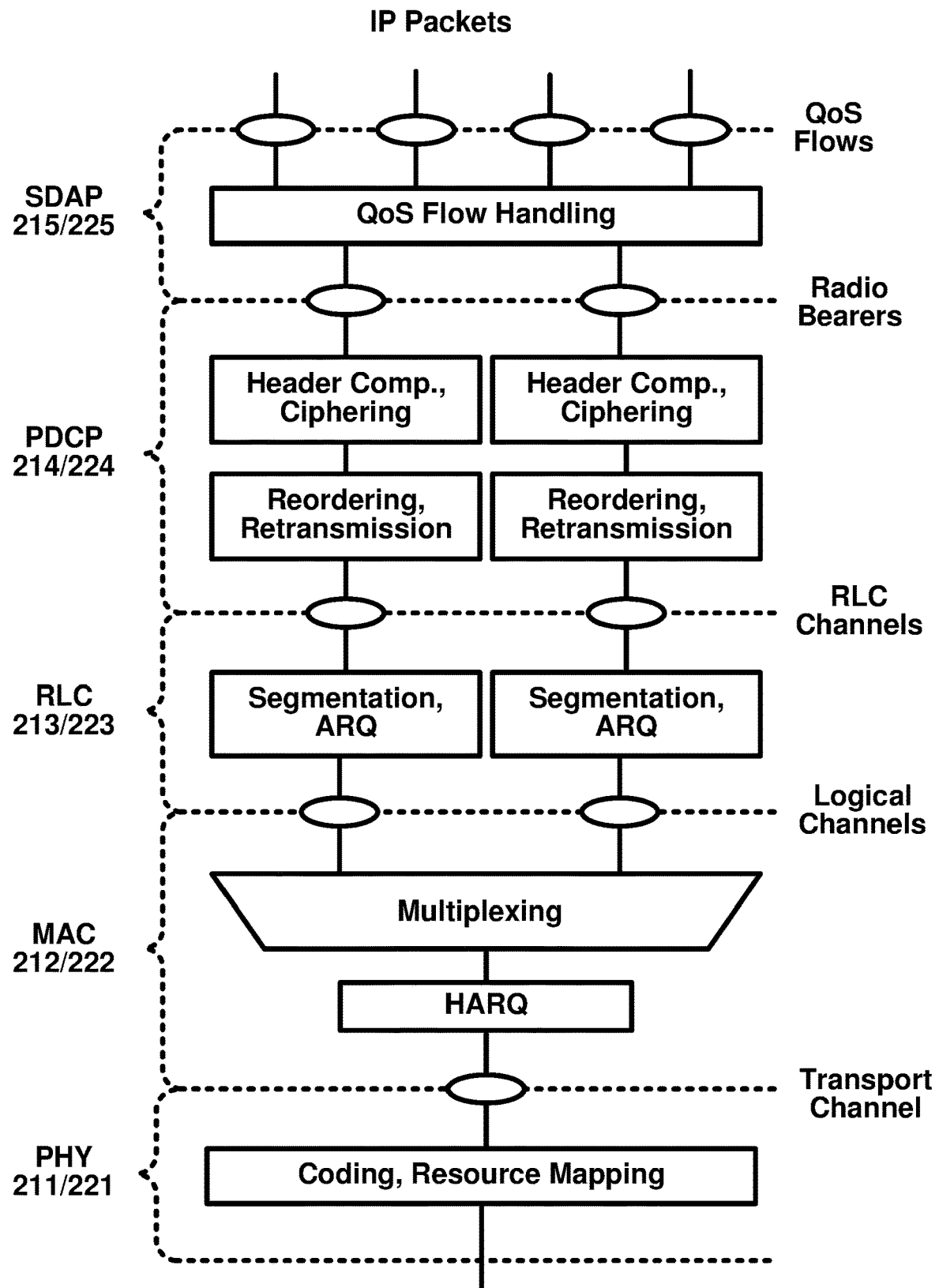
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
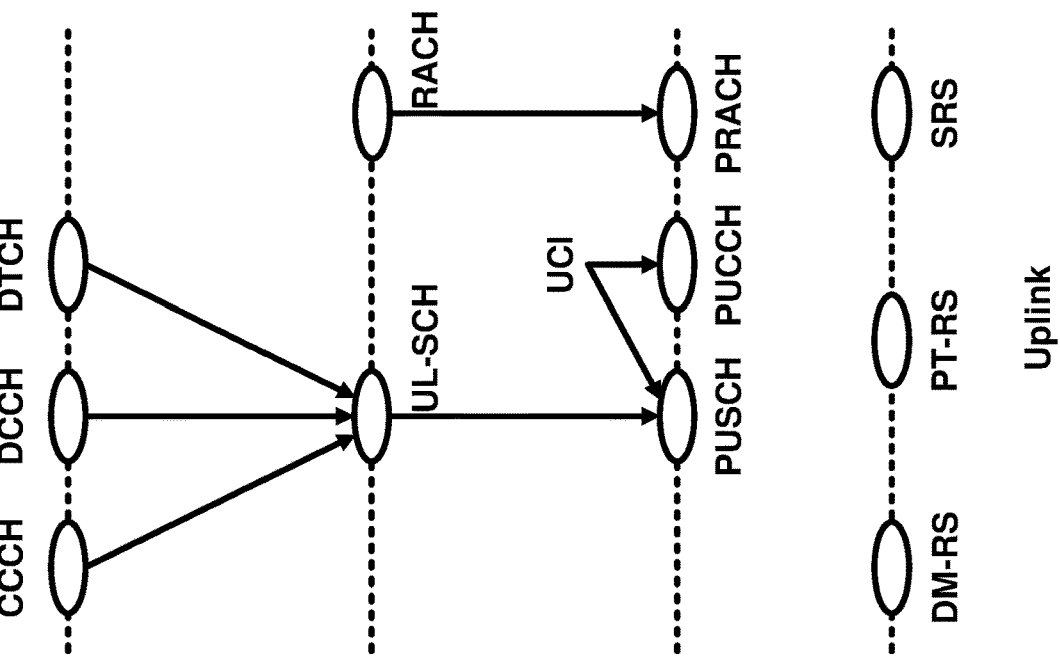
FIG. 5A and FIG. 5B respectively illustrate a mapping between logical channels, transport channels, and physical channels for the downlink and uplink.
Figure 5A:
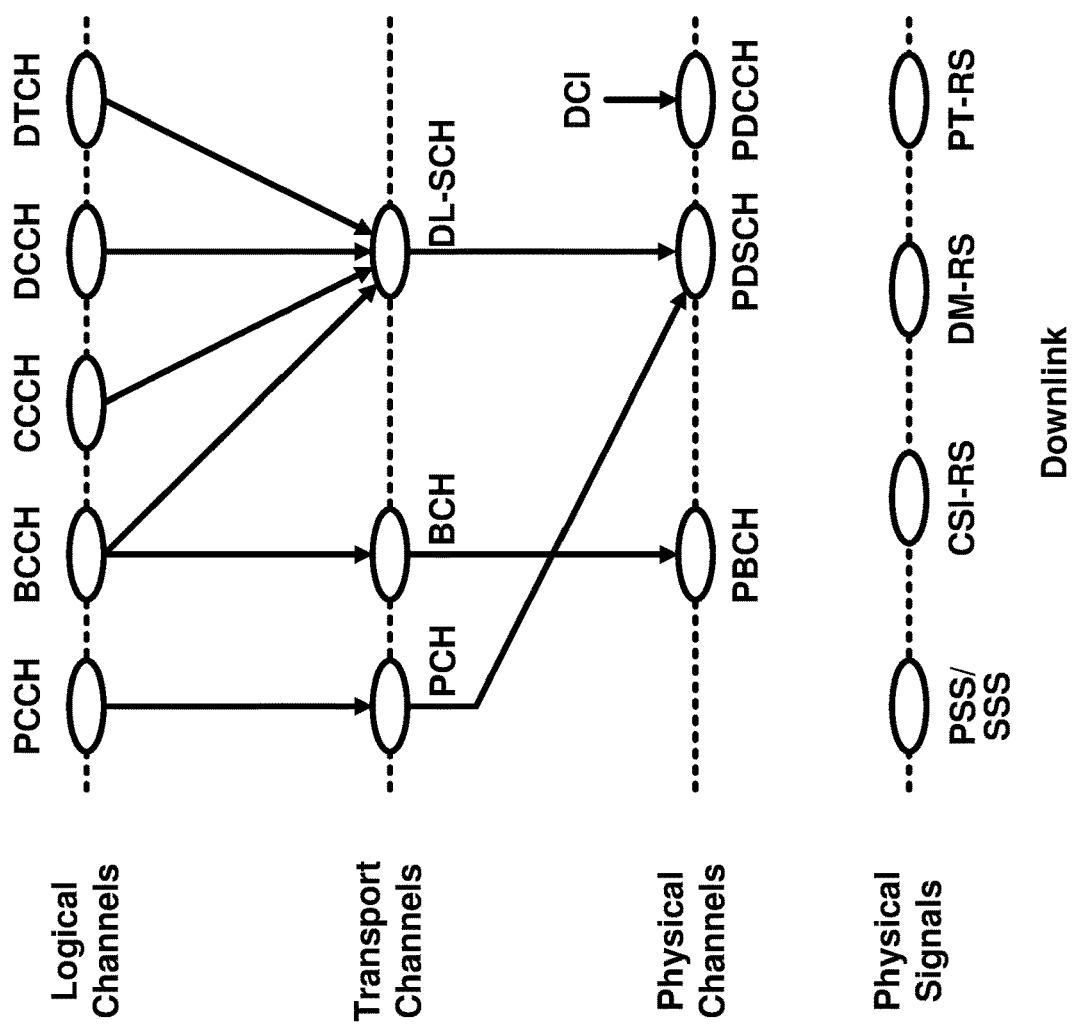

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR);

and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
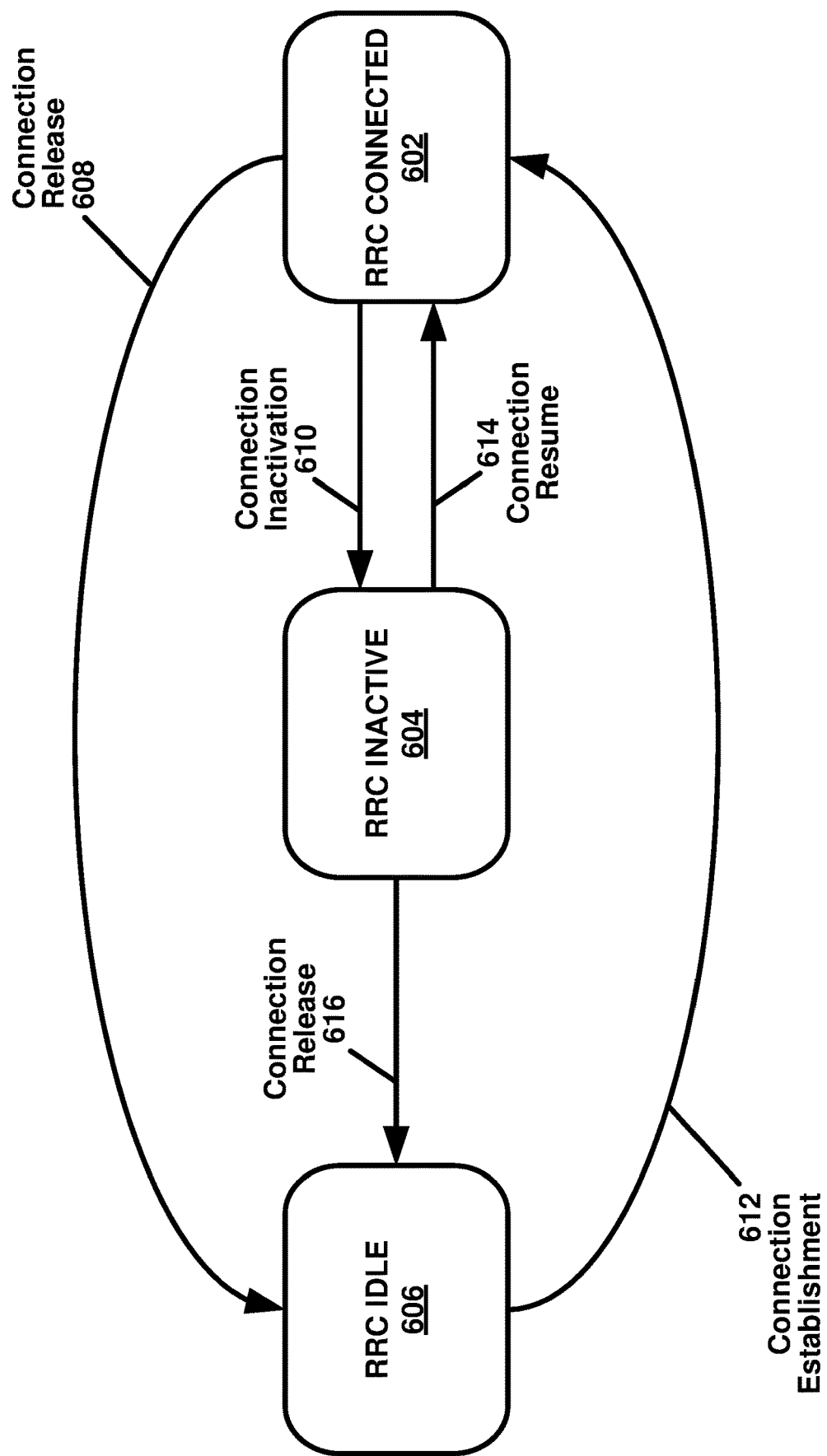
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
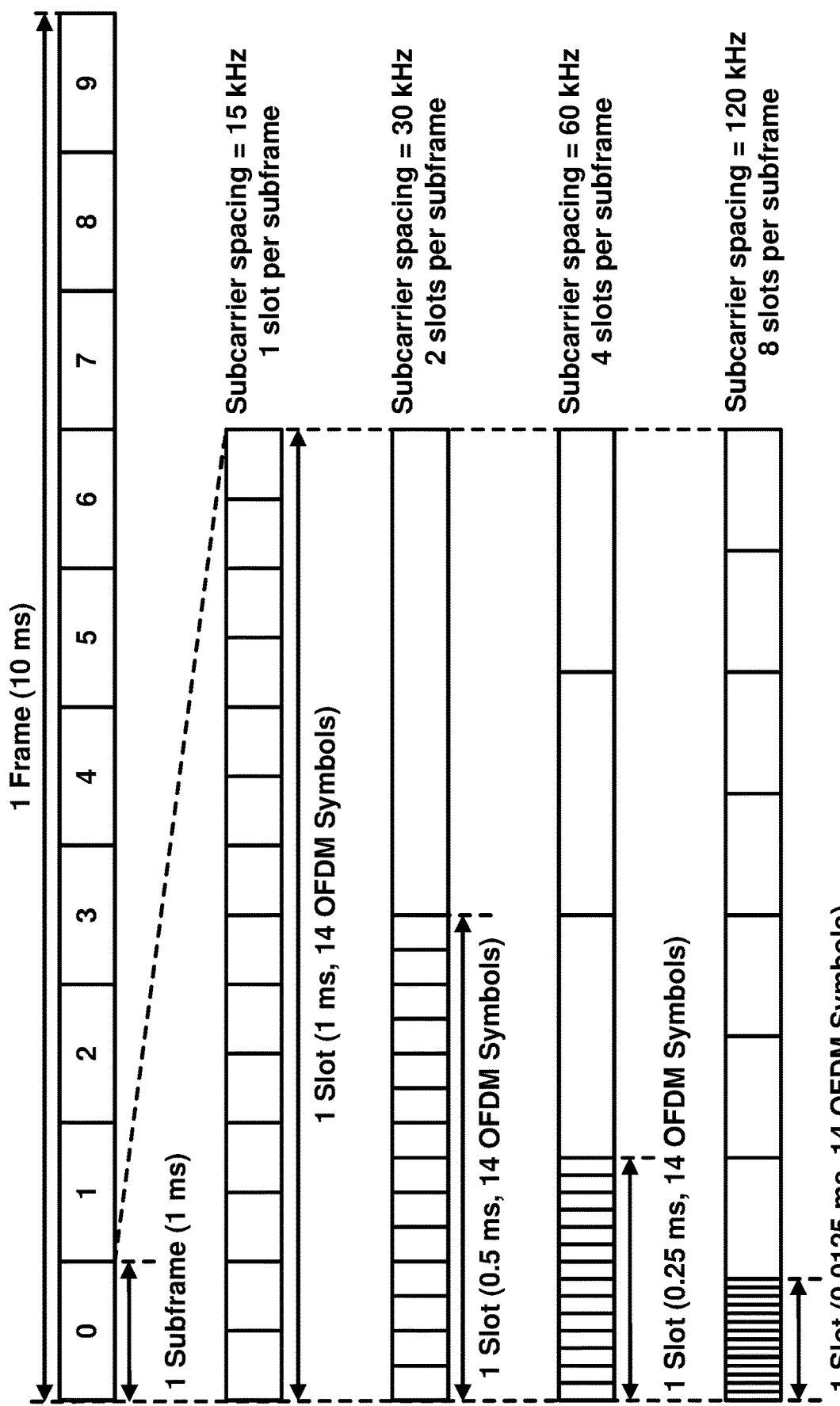
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
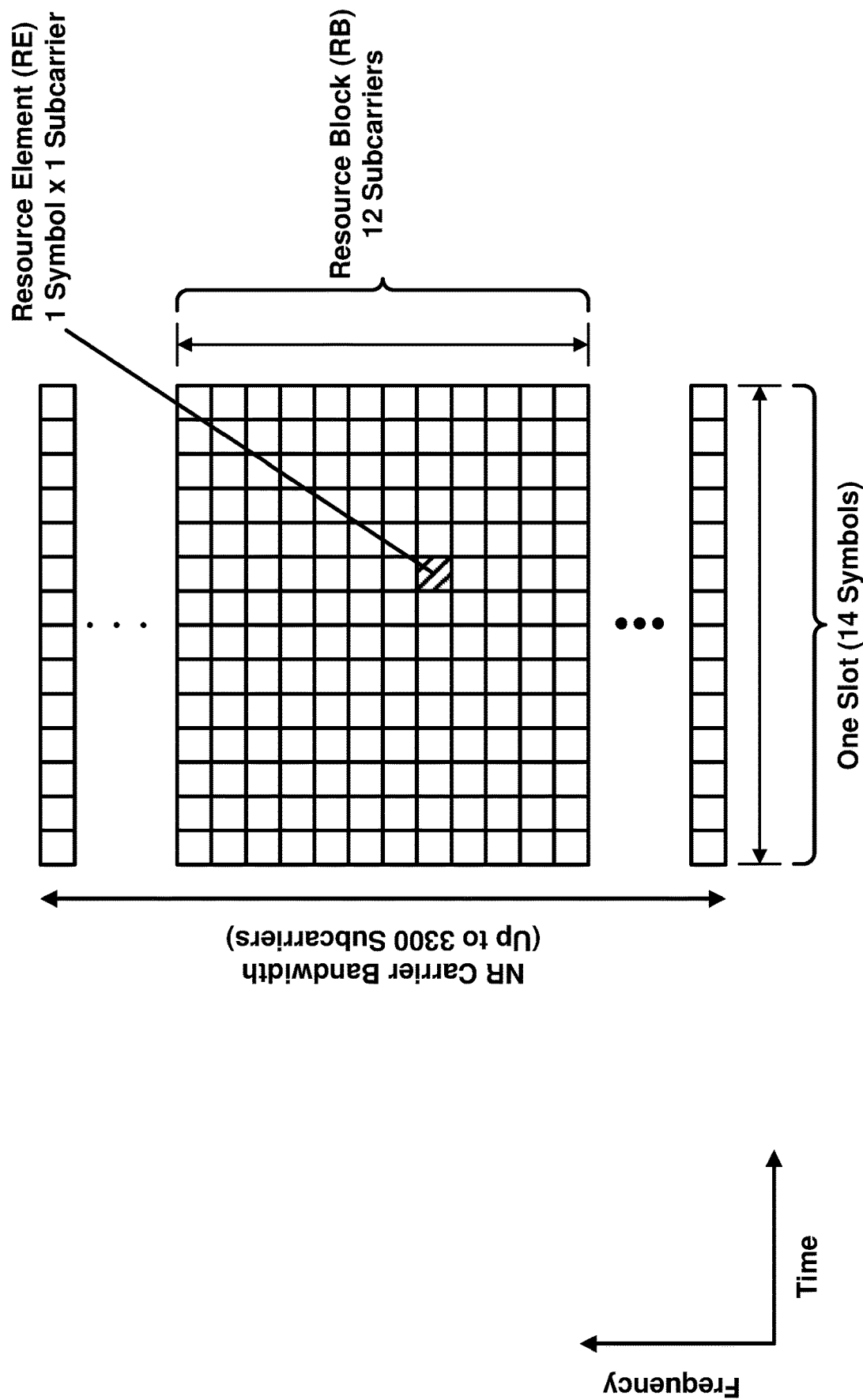
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
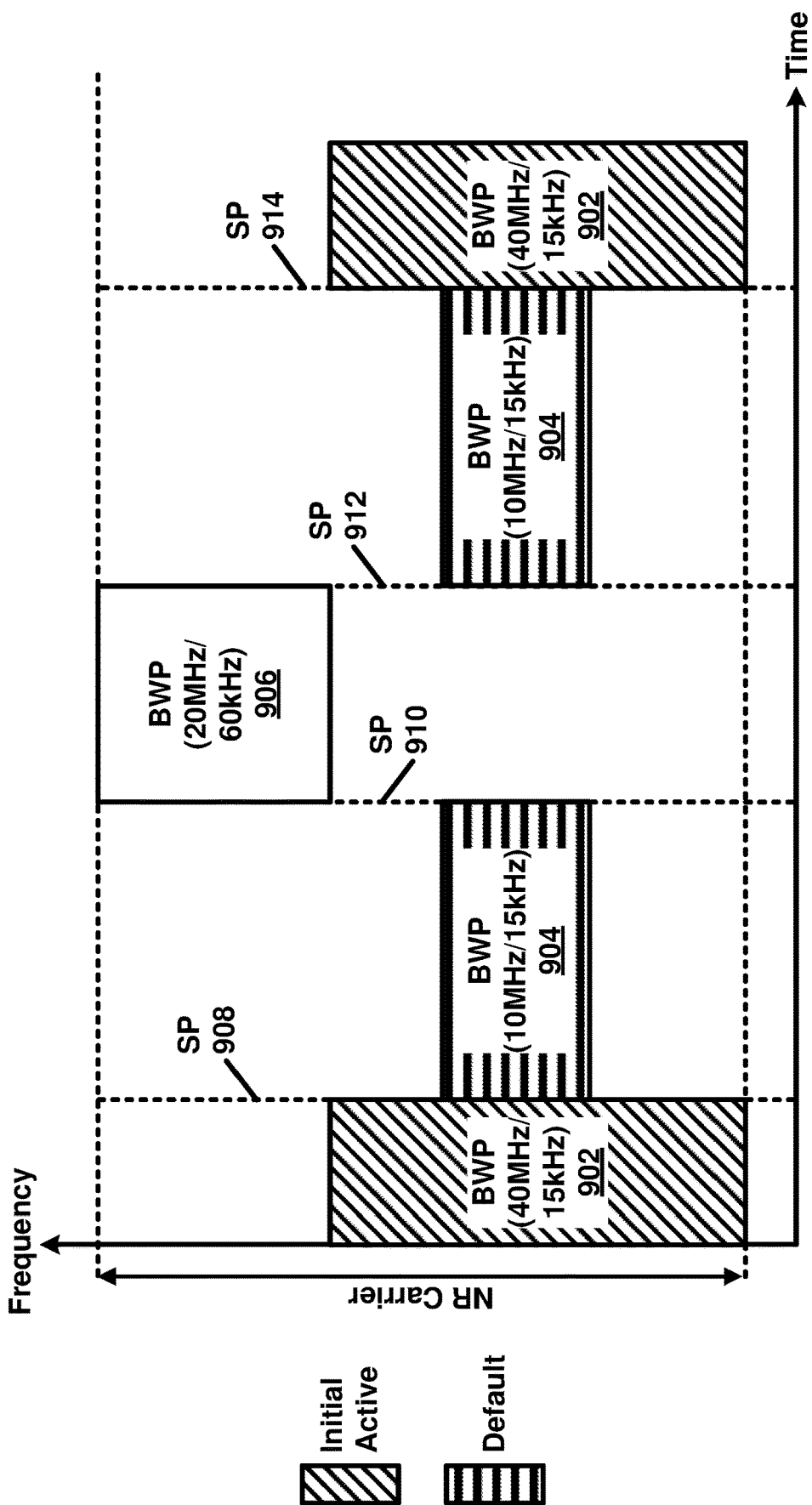
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
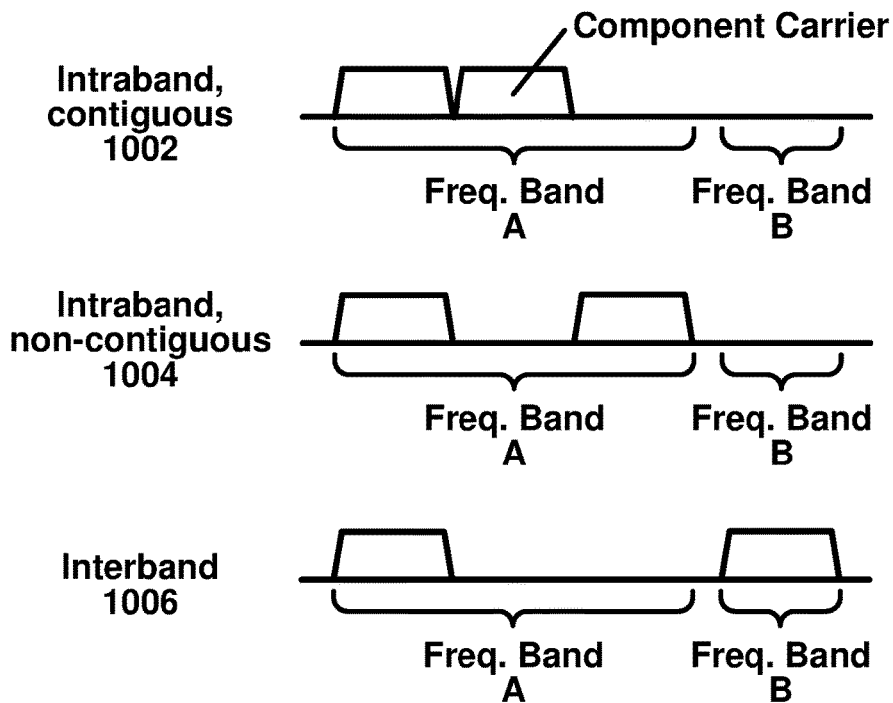
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
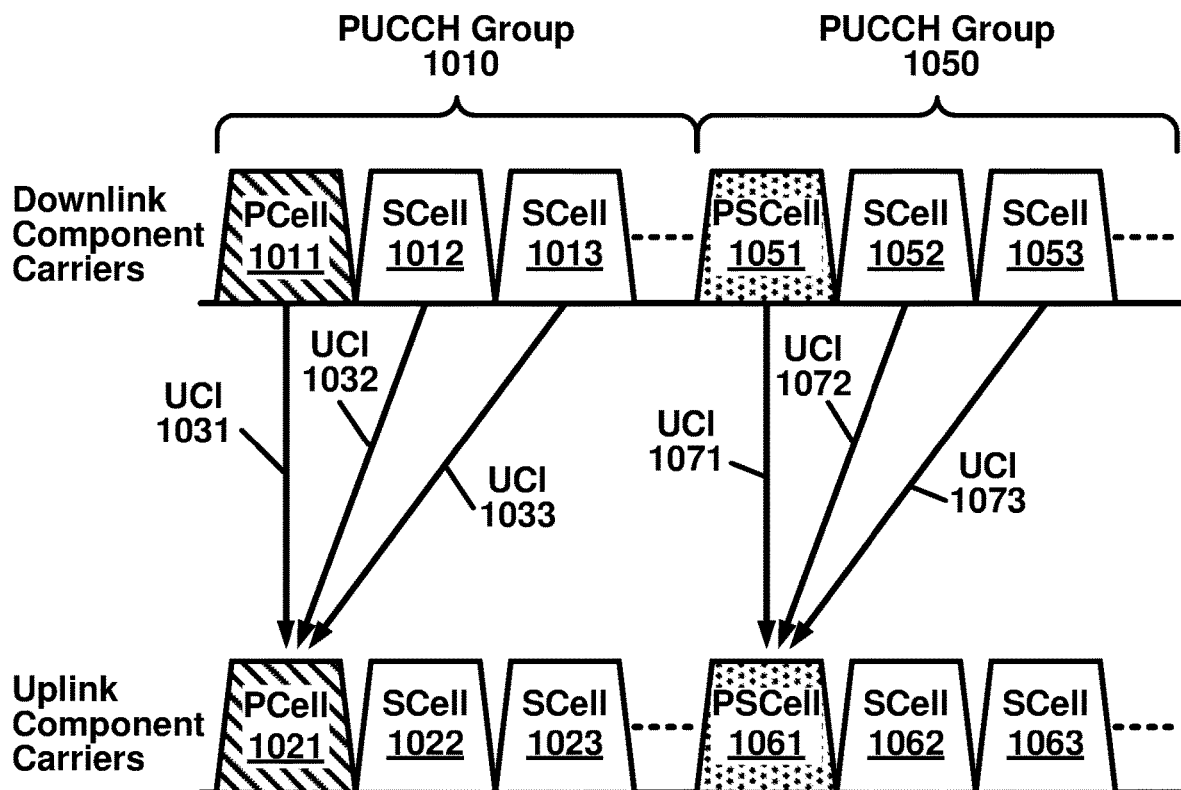
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
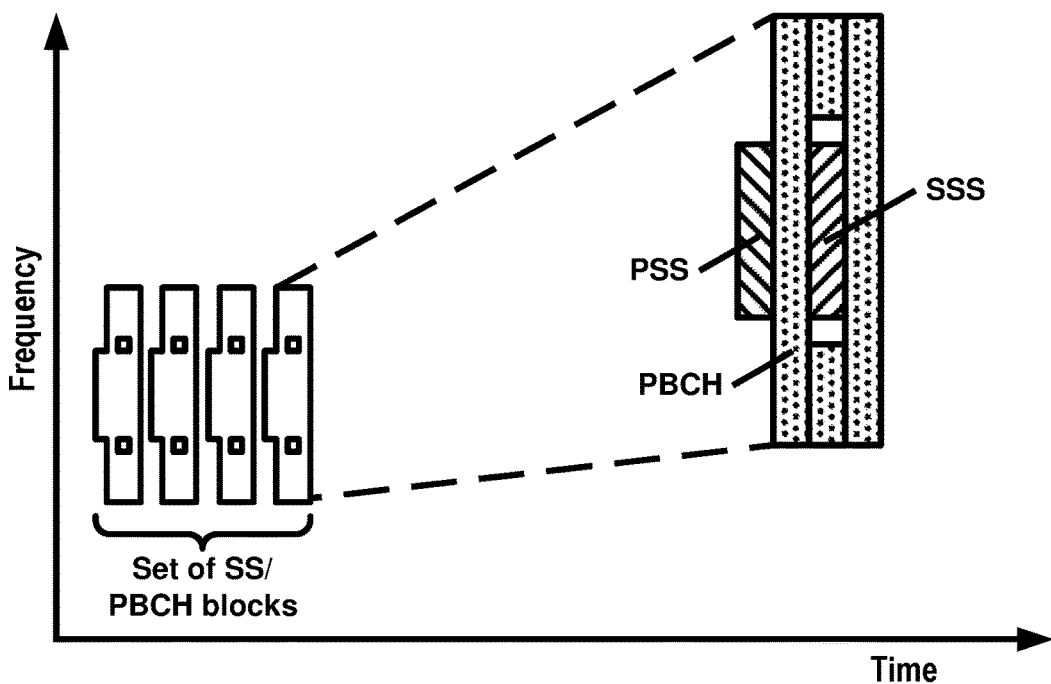
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
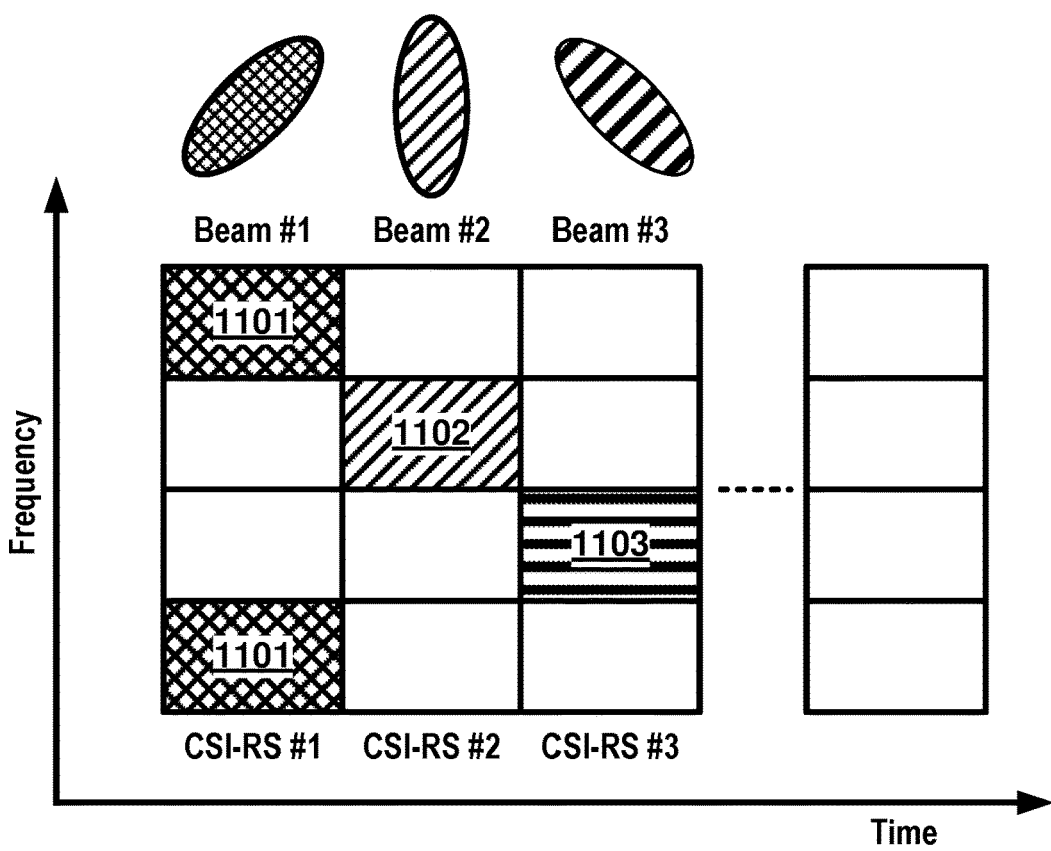
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (ICI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
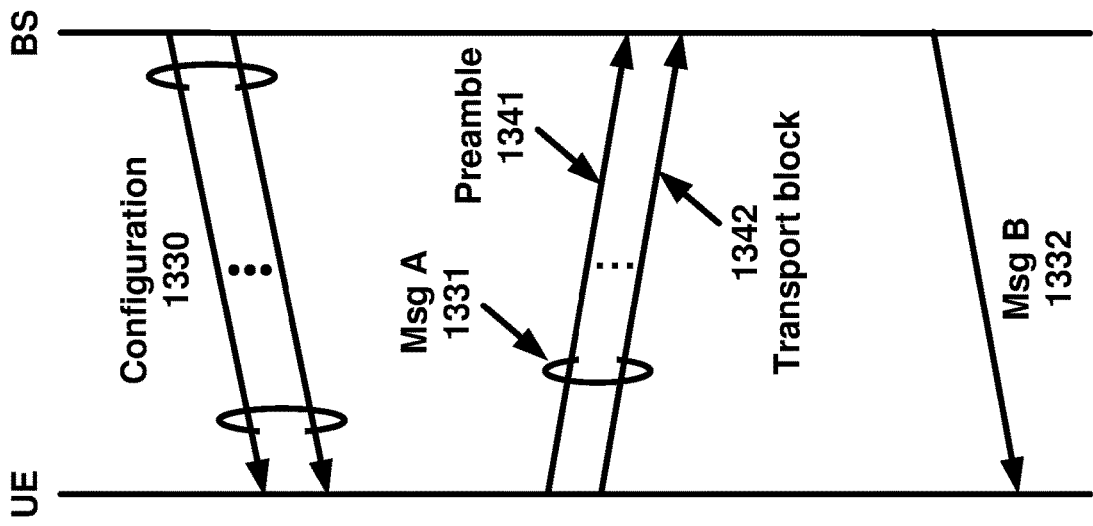
FIG. 13A, FIG. 13B, and FIG. 13C respectively illustrate a four-step contention-based random access procedure, a two-step contention-free random access procedure, and another two-step random access procedure.
Figure 13B:
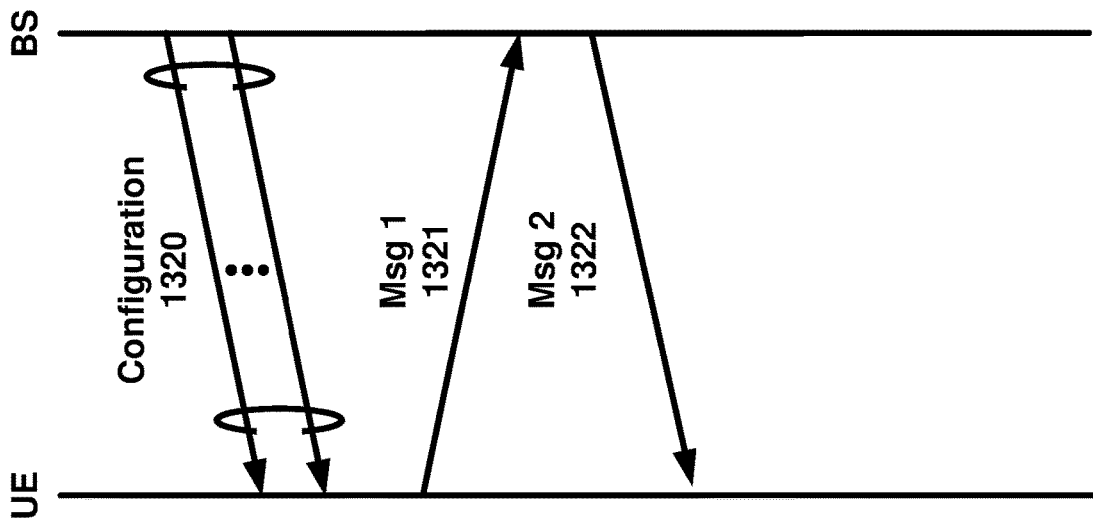
Figure 13A:
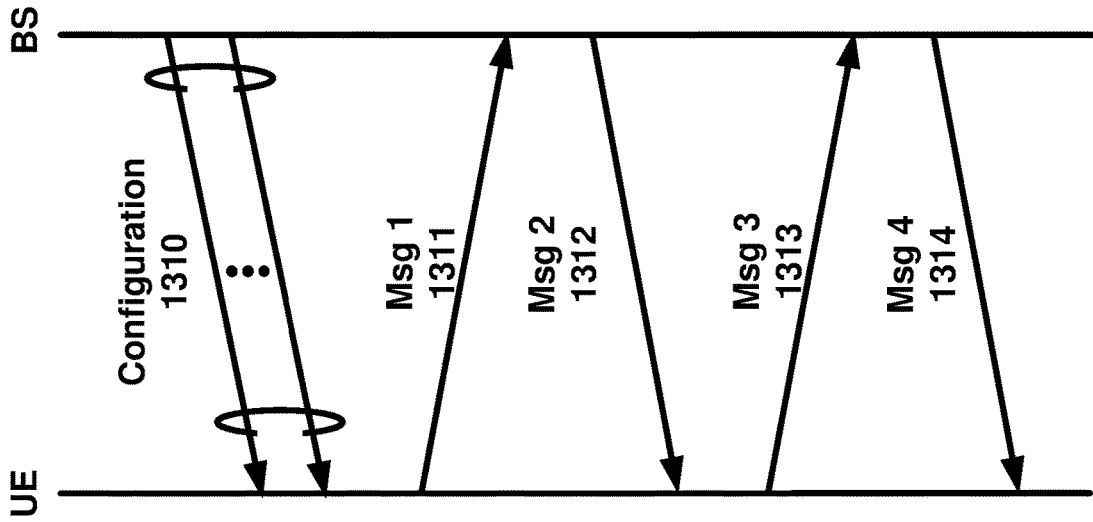

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network.

The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
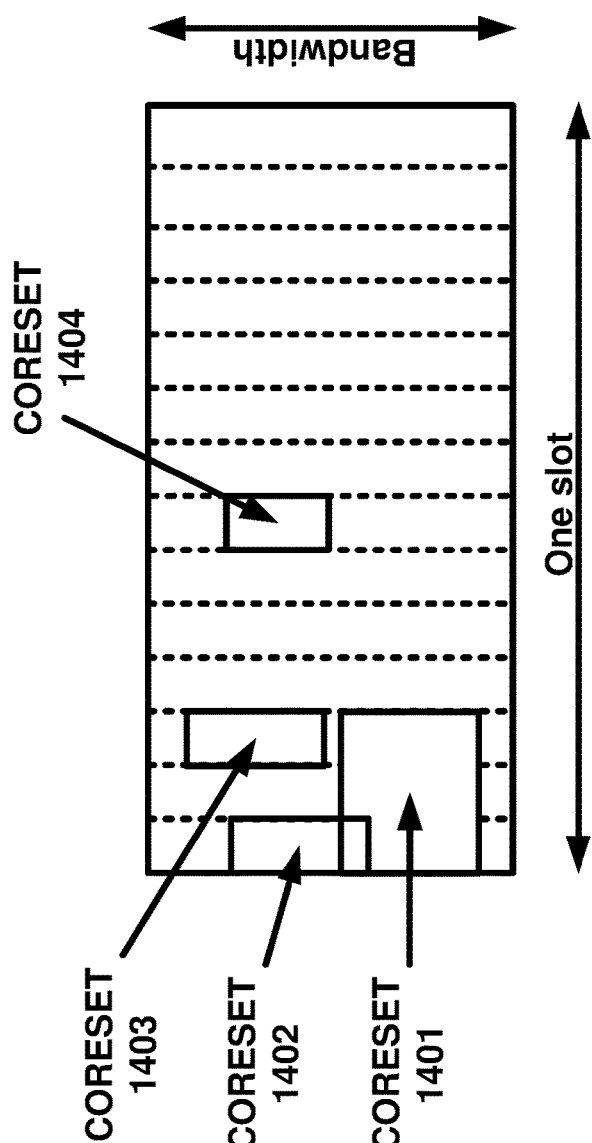
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
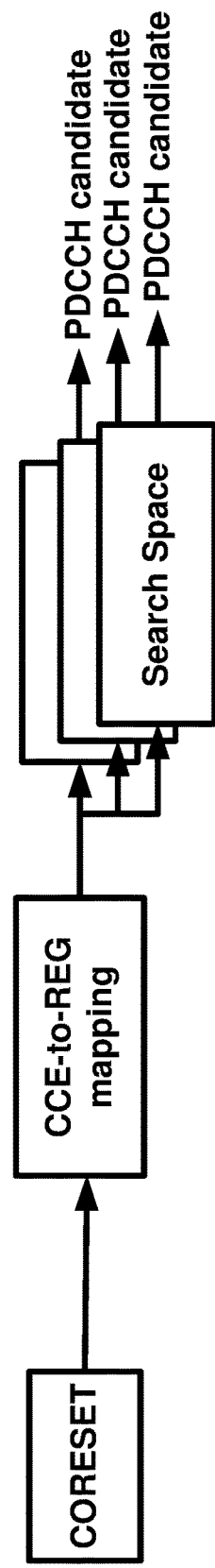
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUCCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
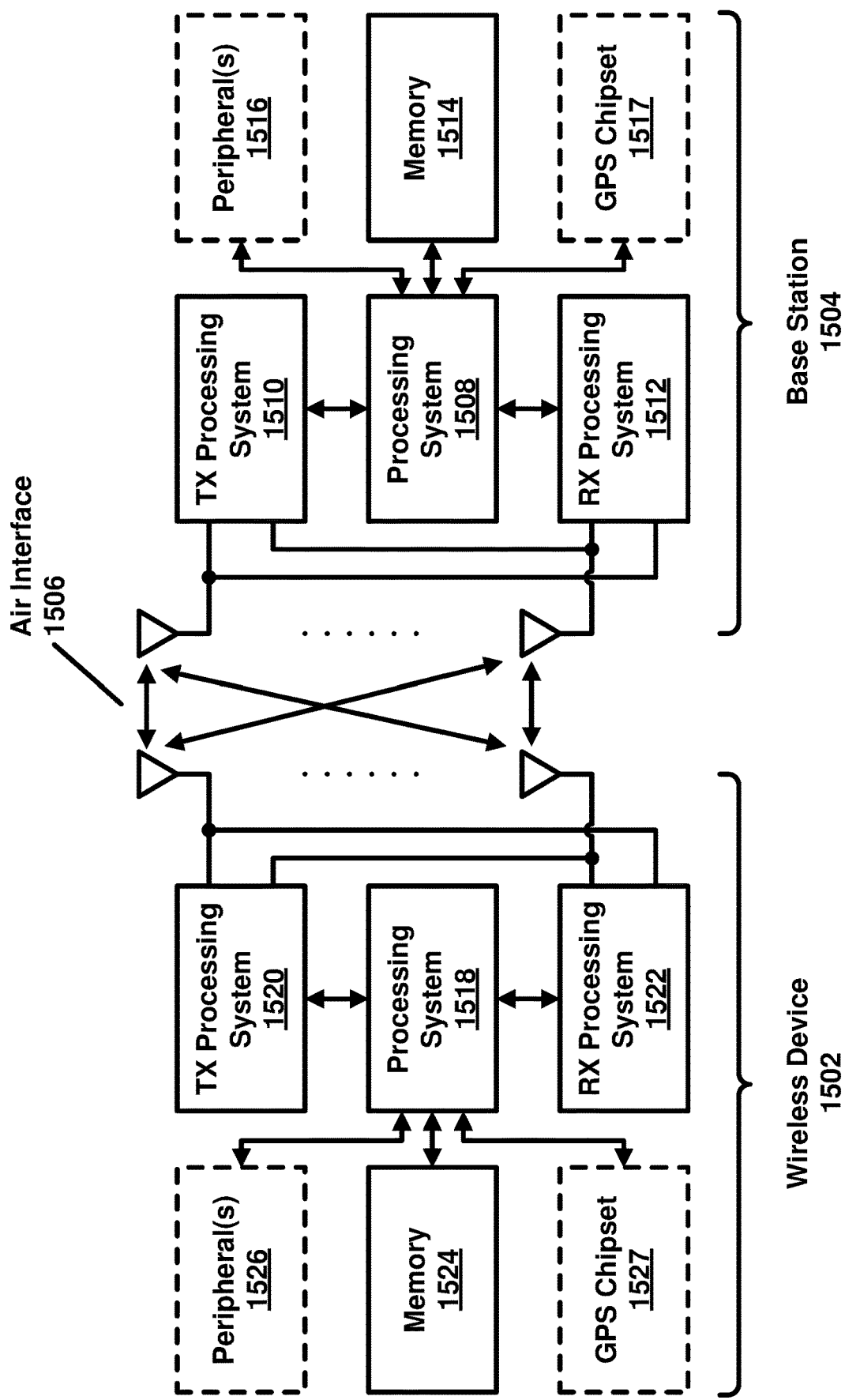
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

A wireless device may receive/detect, in a PDCCH monitoring occasion, a DCI.

In an example, the DCI may schedule/activate/trigger a sidelink transmission (e.g., PSCCH, PSCCH, SPS). The wireless may determine, for sidelink transmission, a time slot/symbol based on the PDCCH monitoring occasion that the wireless device receives the DCI. The wireless device may perform the sidelink transmission based on the time slot/symbol. The wireless device may perform the sidelink transmission, for example, after the time slot/symbol.

In an example, the DCI may indicate transmission of a HARQ-ACK information bit. The wireless may determine, for multiplexing of the HARQ-ACK information bit in an uplink resource indicated by another DCI, a time slot/symbol based on the PDCCH monitoring occasion that the wireless device receives the DCI. The wireless device may multiplex the HARQ-ACK information bit in the uplink resource, for example, based on the time slot/symbol being/occurring earlier than a time duration from a first/starting/earliest symbol of the uplink resource. The wireless device may not multiplex the HARQ-ACK information bit in the uplink resource, for example, based on the time slot/symbol being/occurring later than (or after) a time duration from a first/starting/earliest symbol of the uplink resource.

In an example, the DCI may schedule an uplink transmission (e.g., PUSCH). The wireless device may determine, based on the PDCCH monitoring occasion, whether to consider the uplink transmission in determination/computation/calculation of a power headroom report in another uplink transmission scheduled by another DCI. For example, the wireless device may determine/compute/calculate, based on the uplink transmission, the power headroom report in another uplink transmission in response to the PDCCH monitoring occasion occurring/being before a PDCCH monitoring occasion that the other DCI is received/detected. For example, the wireless device may not determine/compute/calculate, based on the uplink transmission, the power headroom report in another uplink transmission in response to the PDCCH monitoring occasion occurring/being after a PDCCH monitoring occasion that the other DCI is received/detected.

In an example, the wireless device may receive, e.g., from a base station, configuration parameters. The configuration parameters may indicate a control channel repetition, wherein the base station transmits, via one or more coresets, repetitions of a DCI. The repetitions may be transmitted in a plurality of transmission/repetition occasions (e.g., PDCCH monitoring occasions or time slots). The wireless device may monitor, for the repetitions of the DCI, the one or more coresets in the plurality of transmission occasions. Accordingly, control channel repetition may increase control channel reliability and robustness.

In existing technologies, co-implementation of time slot/symbol determination and control channel repetition may cause ambiguity/misalignment. In an example, the wireless device may receive, via a first transmission/repetition occasion of the plurality of transmission/repetition occasions, a DCI. The wireless device may determine a first time slot/symbol based on the first transmission/repetition occasion that the wireless device receives the DCI.

The DCI may schedule/activate/trigger a sidelink transmission. In the implementation of the existing technologies, the wireless device may perform the sidelink transmission, for example, after the first time slot/symbol.

The DCI may indicate transmission of a HARQ-ACK information bit. In the implementation of the existing technologies, the wireless may determine whether to multiplex the HARQ-ACK information bit in an uplink resource indicated by another DCI or not based on the first time slot/symbol.

The DCI may schedule an uplink transmission (e.g., PUSCH). In the implementation of the existing technologies, the wireless device may determine, based on the first transmission/repetition occasion, whether to consider the uplink transmission in determination/computation/calculation of a power headroom report in another uplink transmission scheduled by another DCI.

In an example, the base station may not have information on which transmission/repetition occasion(s) of the plurality of transmission/repetition occasions the wireless device successfully received the DCI. In an example, the base station may determine a second time slot/symbol based on a second transmission/repetition occasion of the plurality of transmission/repetition occasions. The base station may determine the second time slot/symbol based on the second transmission/repetition occasion, for example, randomly/blindly (or based on a rule unknown at the wireless device).

The base station may determine, based on the second time slot/symbol, whether the HARQ-ACK information bit is multiplexed by the wireless device in the uplink resource indicated by another DCI or not.

The base station may determine, based on the second transmission/repetition occasion, whether the uplink transmission is considered by the wireless device in determination/computation/calculation of the power headroom report in another uplink transmission scheduled by another DCI.

The first time slot/symbol (or the first transmission/repetition occasion) determined by the wireless device and the second time slot/symbol (or the second transmission/repetition occasion) determined by the base station may not be the same. The misalignment/ambiguity on the time slots/symbols may result in, for example, missing reception of the sidelink transmission. The misalignment/ambiguity on the time slots/symbols may result in, for example, missing reception of HARQ-ACK information bits. The misalignment/ambiguity on the time slots/symbols may result in, for example, inaccurate estimation/computation of the power headroom report. This may lead to increased retransmissions, increased latency/delay in successful communication, and increased power consumption.

The example embodiments enhance/improve time slot/symbol determination when transmission of a DCI is repeated by a base station in a plurality of transmission/repetition occasions. In an example embodiment, the wireless device and the base station may determine a reference transmission/repetition occasion among the plurality of transmission/repetition occasions based on a predefined rule (e.g., the last/ending/first/starting transmission/repetition occasion among the plurality of transmission/repetition occasions, etc). The wireless device and the base station may determine a common time slot/symbol based on the reference transmission/repetition occasion. Using the common time slot/symbol (or the reference transmission/repetition occasion) may reduce the possibility of misalignment on the time slot/symbol used to determine power headroom report, sidelink transmission, and/or HARQ-ACK information bit multiplexing. This may reduce latency/delay of a successful communication, reduce power consumption, and reduce retransmissions.

A wireless device may perform a power headroom reporting procedure to indicate, to a base station, at least one of following information: Type 1 power headroom (PH) indicating a difference between a nominal maximum transmit power and an estimated power for UL-SCH transmission per activated serving cell configured with the wireless device; Type 2 PH indicating a difference between a nominal maximum transmit power and an estimated power for UL-SCH and PUCCH transmission on SpCell of another MAC entity (e.g., E-UTRA MAC entity in EN-DC); Type 3 PH indicating a difference between a nominal maximum transmit power and an estimated power for SRS transmission per activated serving cell.

A wireless device may receive an RRC message indicating one or more parameters for the power headroom reporting procedure. A MAC entity of the wireless device may determine when to transmit, to a base station, a power headroom report (PHR) based on the one or more parameters. The wireless device may determine which cell and/or which type of power headroom need to be reported via the PHR. For example, the one or more parameters may indicate a first value of a PHR periodic timer (e.g., phr-PeriodicTimer), a second value of a PHR prohibit timer (e.g., phr-ProhibitTimer), a PHR pathloss change threshold (e.g., phr-Tx-PowerFactorChange), a presence/absence indicator of a PH value for other cell in the PHR (e.g., phr-Type2OtherCell), a mode (e.g., real or virtual) indicator of a PH (e.g., phr-ModeOtherCG), and/or a multiple PHR indicator (e.g., multiplePHR).

In an example, a MAC entity of a wireless device may trigger a PHR based on one or more conditions. For example, the wireless derive may trigger a PHR at least one of following events: a first timer (e.g., phr-PeriodicTimer) expires; upon configuration or reconfiguration of the power headroom reporting functionality by upper layers, which may not be used to disable the function; activation of an SCell of any MAC entity with configured uplink; and/or an addition of the PSCell (e.g., a PSCell may be added or changed).

In an example, a MAC entity of a wireless device may, for example, if the wireless device has UL resources allocated for a new transmission, start a PHR periodic timer if a first UL resource is firstly allocated for a new transmission since a last MAC reset. A wireless device may transmit, for example, if a PHR procedure determines that at least one PHR has been triggered and not cancelled and/or if allocated UL resources accommodate at least one PHR (e.g., a MAC CE for the PHR which the MAC entity is configured to transmit, plus its subheader, as a result of logical channel prioritization), at least one PHR to a base station. A PHR procedure and/or a PHR format may be determined, for example on whether a base station configures a wireless device with a single entry PHR format (e.g., a multiple PHR indicator (e.g., multiplePHR) is not configured) or a multiple entry PHR format (e.g., a multiple PHR indicator (e.g., multiplePHR) is configured).

In an example, if a base station configures a wireless device with a multiple PHR indicator (e.g., by transmitting an RRC configuration parameter indicating the multiple entry PHR format (e.g., multiplePHR)), a MAC entity of the wireless device may determine, for each of one or more activated cells with configured uplink(s) associated with the wireless device, a first value of a first type power headroom (PH), e.g., Type 1 PH determined based on a PUSCH transmission, or a third type PH, e.g., Type 3 PH determined based on an SRS transmission. A wireless device may determine, for example, if the wireless device has UL resources allocated for a transmission on the at least one cell, or if one or more other cells of the one or more activated cells have UL resources allocated for transmission on the at least one cell and PHR configuration parameters transmitted for indicating a PHR mode of the one or more cells indicates a real PH value (e.g., a mode (e.g., real or virtual) indicator of a PH (e.g., phr-ModeOtherCG)) indicate a real PH value), a second value corresponding to PCMAX, c (described elsewhere in this specification) and transmit the first value and the second value via corresponding one or more fields in a PHR.

In an example, if a presence/absence indicator of a PH value for other cell in the PHR (e.g., phr-Type2OtherCell) is configured to a wireless device, and/or if other MAC entity is a particular radio access technology (e.g., 4G) MAC entity, an MAC entity of the wireless device may determine a first value corresponding to a second type PH (e.g., Type 2 PH) for an SpCell of the other MAC entity. If a PHR mode of the one or more cells indicates a real PH value (e.g., a mode (e.g., real or virtual) indicator of a PH (e.g., phr-ModeOtherCG)) indicate a real PH value), a wireless device may determine a second value corresponding to PCMAX, c. The wireless device may transmit the first value and the second value via one or more corresponding fields in a PHR.

In an example, an MAC entity of a wireless device may trigger a multiplexing and assembly procedure for generating and transmitting a PHR (e.g., in a form of a PHR MAC CE). The PHR may comprise a first value of a first type PH, a second type PH, and/or a third type PH of at least one cell. The PHR may comprise a second value, corresponding to PCMAX, c, for example, based on a configured serving cell index (e.g., ServCellIndex) and/or configured PUCCH(s) for the wireless device. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

In an example, if a base station configures a wireless device with a single entry PHR format (e.g., by transmitting a PHR configuration parameter indicating the single entry PHR format, and/or by not configuring a PHR configuration parameter indicating a multiple entry PHR format (e.g., if multiplePHR is absent)), the wireless device may, for example, determine a first value, of a first type PH or of a third type PH, for a corresponding uplink carrier of a cell (e.g., a PCell). The wireless device may, for example, determine a second value corresponding to PCMAX, c. The wireless device may, for example, based on determining the first value and the second value, transmit a PHR to a base station (e.g., a gNB). The PHR may comprise one or more fields indicating the first value and the second value. A wireless device may trigger a multiplexing and assembly procedure for generating and transmitting a PHR MAC CE comprising a value of a first type PH or of a third type PH. A wireless device may, for example, based on transmitting a PHR, start or restart a PHR periodic timer (e.g., periodicPHR-Timer) and/or a PHR prohibit timer (e.g., prohibitPHR-Timer). A wireless device may, for example, based on transmitting a PHR, cancel one or more triggered PHRs.

In an example, a MAC entity may determine whether PH value for an activated serving cell is based on real transmission or a (uplink) reference format based on configured grant(s) and downlink control information that may have been received until and including the PDCCH occasion in which a first UL grant for a new transmission is received since a PHR has been triggered if a PHR MAC CE is reported on an uplink grant received on the PDCCH or until the first uplink symbol of PUSCH transmission minus PUSCH reparation time predefined, e.g., if the PHR MAC CE is reported on a configured grant.

In an example, the PHR MAC CEs may comprise at least one of:
  a presence/absence indication field (e.g., Ci) that indicates a presence of a PH field for a serving cell with a cell ID i (e.g., ServCellIndex i). The Ci field set to "1" may indicate that a PH field for the serving cell with the cell ID i (e.g., ServCellIndex i) is reported. The Ci field set to "0" may indicate that a PH field for the serving cell with a cell ID i (e.g., ServCellIndex i) is not reported;
  a reservation field (e.g., R) indicating one or more reserved bit (e.g., R set to "0");
  a PH mode indicator (e.g., V) that indicate if the PH value is based on a real transmission or a reference format. For Type 1 PH, V=0 may indicates a real transmission on PUSCH and V=1 may indicate that a PUSCH reference format is used. For Type 2 PH, V=0 may indicate a real transmission on PUCCH and V=1 may indicate that a PUCCH reference format is used. For Type 3 PH, V=0 may indicate a real transmission on SRS and V=1 may indicate that an SRS reference format is used. For Type 1, Type 2, and Type 3 PH, V=0 may indicate a presence of an octet comprising an associated PCMAX,f,c field, and V=1 may indicate that the octet comprising the associated PCMAX,f,c field is omitted;
  a PH field indicating a power headroom level;
  a power backoff indicator file (e.g., a P field) indicating whether the MAC entity applies power backoff due to power management. The MAC entity may set P=1 if a corresponding PCMAX,f,c field have had a different value if no power backoff due to power management had been applied;
  a PCMAX,f,c field. If present, this field may indicates the PCMAX,f,c or P-CMAX,f,c for a serving cell used for determining a preceding PH field.

In an example, a wireless device may determine whether a power headroom report, for an activated serving cell, is based on an actual uplink transmission or a reference uplink transmission based on a higher layer signaling of a configured grant. The wireless device may further determine whether the power headroom report is based on the actual uplink transmission or the reference uplink transmission based on one or more periodic/semi-persistent sounding reference signal transmissions. The wireless device may further determine whether the power headroom report is based on the actual uplink transmission or the reference uplink transmission based on a downlink control information.

In an example, the wireless device may report the power headroom report on a PUSCH triggered/scheduled by the first DCI. The wireless device may receive the downlink control information until and including a PDCCH monitoring occasion where the wireless device detects a first DCI (e.g., DCI format 0_0 or DCI format 0_1) scheduling an initial transmission of a transport block since a power headroom report was triggered.

In an example, the wireless device may report the power headroom report on a PUSCH using a configured grant. The wireless device may receive the downlink control information until a first uplink symbol of a configured PUSCH transmission minus a processing time (e.g., Tproc,2). The processing time may be based on a capability of the wireless device. The processing time may be based on a subcarrier spacing of an active downlink BWP of a scheduling cell for the configured grant.

A PDCCH may carry scheduling assignments and other control information in the form of DCI messages. The information carried by the PDCCH may be referred to as DCI. A base station may transmit, to a wireless device, a plurality of PDCCHs within a control region. The wireless device may monitor the plurality of PDCCHs. A PDCCH may include an aggregate of one or more control channel elements (CCEs). Monitoring may comprise performing blind decoding for a plurality of candidate PDCCHs. The blind decoding may comprise performing cyclic redundancy check (CRC) de-masking for each of the plurality of candidate PDCCHs using a radio network temporary identifier (RNTI). The blind decoding may be used for detection of a PDCCH. If no CRC error is detected, the wireless device may determine that PDCCH carries its own control information.

Figure 17:
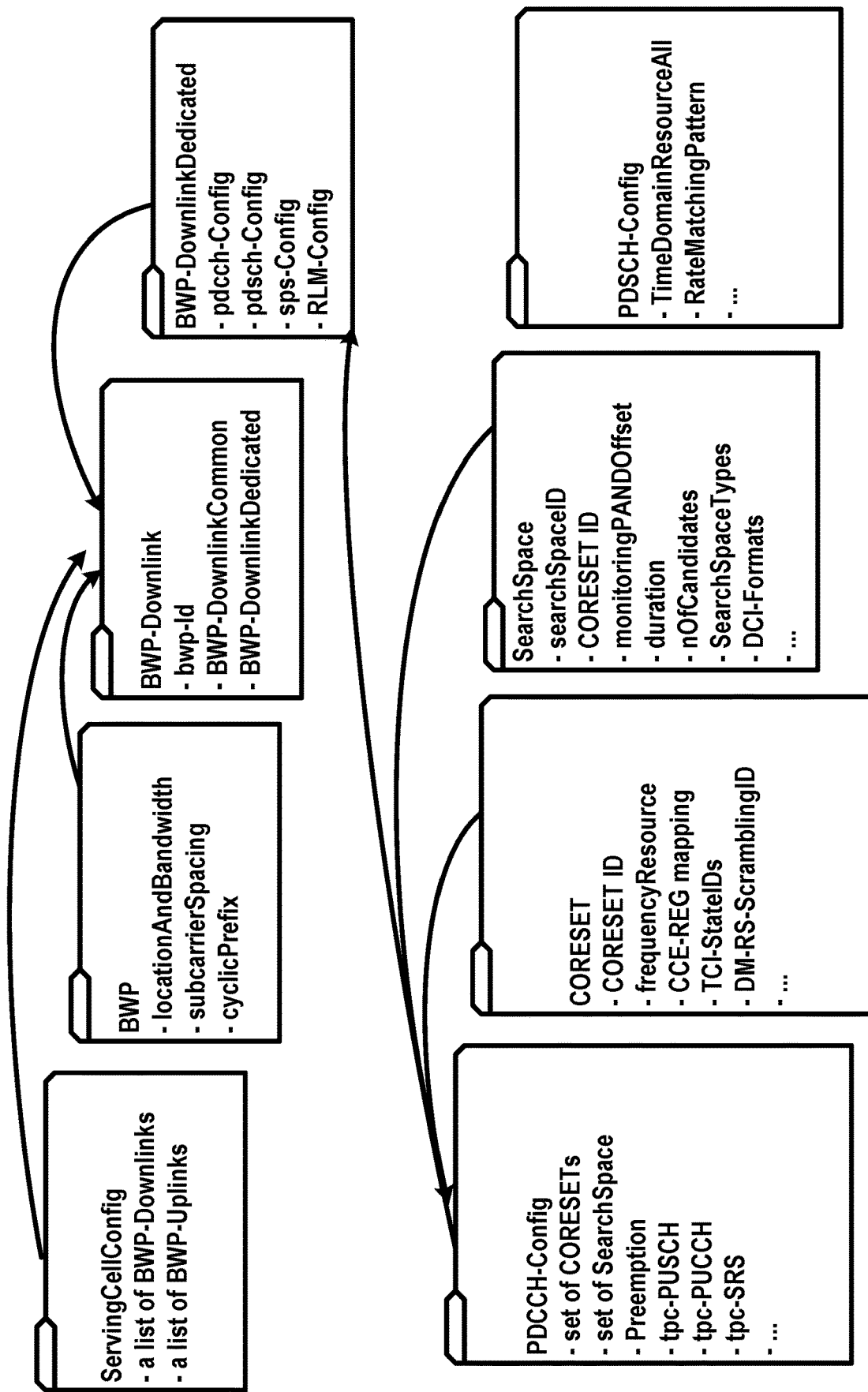
FIG. 17 illustrates example configuration parameters for control and/or data as per an aspect of an embodiment of the present disclosure.

FIG. 17 illustrates example configuration parameters for control and/or data as per an aspect of an embodiment of the present disclosure. A wireless device may receive one or more radio resource control (RRC) messages comprising configuration parameters of a cell. The configuration parameters may comprise one or more parameters of a serving cell configuration (e.g., ServingCellConfig). The one or more parameters of the serving cell configuration may indicate one or more downlink bandwidth parts (e.g., a list of MP-Downlinks). The one or more parameters of the serving cell configuration may indicate one or more uplink bandwidth parts (e.g., a list of MP-Uplinks). A downlink bandwidth part (e.g., MP-Downlink) and/or an uplink bandwidth part (e.g., MP-Uplink) may comprise a bandwidth part index (e.g., bwp-Id), configuration parameters of a cell-common downlink bandwidth part (e.g., BWP-DownlinkCommon), and/or a UE-specific downlink bandwidth part (e.g., BWP-DownlinkDedicated). For example, the bandwidth part index (bwp-Id) may indicate a bandwidth part configuration, wherein an index of the bandwidth part is the bandwidth part index. The bandwidth part configuration may comprise a location and bandwidth information (locationAndBandwidth). The locationAndBandwidth may indicate a starting resource block (RB) of the bandwidth part and a bandwidth of the bandwidth part, based on a reference point (e.g., a pointA of a carrier/cell for the bandwidth part). The bandwidth part configuration may comprise a subcarrier spacing (e.g., subcarrierSpacing) and a cyclic prefix (e.g., cyclicPrefix). For example, the subcarrier spacing may be one of 15 kHz, 30 kHz, 60 kHz, 120 kHz, 240 kHz, 480 kHz, and 960 kHz. For example, the cyclic prefix may be one of a normal cyclic prefix and an extended cyclic prefix.

Configuration parameters of the cell-specific downlink bandwidth (e.g., BWP-DownlinkCommon) may comprise genericParameters, pdcch-ConfigCommon, and/or pdsch-ConfigCommon. For example, pdcch-ConfigCommon may comprise cell-specific parameters for receiving downlink control information (DCIs) via the cell-specific downlink bandwidth part (e.g., an initial BWP). For example, pdsch-ConfigCommon may comprise cell-specific parameters for receiving PDSCHs of transport blocks (TBs) via the cell-specific downlink bandwidth part. Configuration parameters of the UE-specific downlink bandwidth part (e.g., BWP-DownlinkDedicated) may comprise pdcch-Config, pdsch-Config, sps-Config, and/or radioLinkMonitoringConfig (e.g., RLM-Config). The configuration parameters may comprise sps-ConfigList and/or beamFailureRecoveryS-CellConfig. For example, beamFailureRecoverySCellConfig may comprise reference signal parameters for beam failure recovery for secondary cells. For example, pdcch-Config may comprise parameters for receiving DCIs for the UE-specific downlink bandwidth part. For example, pdsch-Config may comprise parameters for receiving PDSCHs of TBs for the UE-specific downlink bandwidth part. For example, sps-Config may comprise parameters for receiving semi-persistent scheduling PDSCHs. The base station may configure a SPS for a BWP or a list of SPS for the BWP. For example, radioLinkMonitoringConfig may comprise parameters for radio link monitoring.

Configuration parameters of pdcch-Config may comprise at least one of a set of coresets, a set of search spaces, a downlink preemption (e.g., downlinkPreemption), a transmission power control (TPC) for PUSCH (e.g. tpc-PUSCH), a TPC for PUCCH and/or a TPC for SRS. The configuration parameters may comprise a list of search space switching groups (e.g., searchsSpaceSwitchingGroup), a search space switching timer (e.g., searchSpaceSwitchingTimer), an uplink cancellation, and/or a monitoring capability configuration (e.g., monitoringCapabilityConfig). The base station may configure the list of search space switching groups, where the wireless device may switch from a first search space group to a second search space group based on the search space switching timer or a rule, an indication, or an event. The base station may configure up to K (e.g., K=3) coresets for a BWP of a cell. The downlink preemption may indicate whether to monitor for a downlink preemption indication for the cell. The monitoring capability config may indicate whether a monitoring capability of the wireless device would be configured for the cell, where the capability is based on a basic capability or an advanced capability. The base station may configure up to M (e.g., M=10) search spaces for the BWP of the cell. The tpc-PUCCH, tpc-PUSCH, or tpc-SRS may enable and/or configure reception of TPC commands for PUCCH, PUSCH or SRS respectively. The uplink cancellation may indicate to monitor uplink cancellation for the cell.

Configuration parameters of pdcch-ConfigCommon may comprise a control resource set zero (e.g., controlResourceSetZero), a common control resource set (e.g., commonControlResourceSet), a search space zero (e.g., searchSpaceZero), a list of common search space (e.g., commonSearchSpaceList), a search space for SIB1 (e.g., searchSpaceSIB1), a search space for other SIBs (e.g., searchSpaceOtherSystemInformation), a search space for paging (e.g., pagingSearchSpace), a search space for random access (e.g., ra-SearchSpace), and/or a first PDCCH monitoring occasion. The control resource set zero may comprise parameters for a first coreset with an index value zero. The coreset zero may be configured for an initial bandwidth part of the cell. The wireless device may use the control resource set zero in a BWP of the cell, wherein the BWP is not the initial BWP of the cell based on one or more conditions. For example, a numerology of the BWP may be same as the numerology of the initial BWP. For example, the BWP may comprise the initial BWP. For example, the BWP may comprise the control resource set zero. The common control resource set may be an additional common coreset that may be used for a common search space (CSS) or a UE-specific search space (USS). The base station may configure a bandwidth of the common control resource set is smaller than or equal to a bandwidth of the control resource set zero. The base station may configure the common control resource set such that it is contained within the control resource set zero (e.g., CORESET #0). The list of common search space may comprise one or more CSSs. The list of common search space may not comprise a search space with index zero (e.g., SS #0). The first PDCCH monitoring occasion may indicate monitoring occasion for paging occasion. The base station may configure a search space for monitoring DCIs for paging (e.g., pagingSearchSpace), for RAR monitoring (e.g., ra-SearchSpace), for SIB1 (e.g., searchSpaceSIB1) and/or for other SIBs than SIB1 (e.g., searchSpaceOtherSystemInformation). The search space with index zero (e.g., searchSpaceZero, SS #0) may be configured for the initial BWP of the cell. Similar to the corset #0, the SS #0 may be used in the BWP of the cell based on the one or more conditions.

FIG. 18 illustrates example configuration parameters for a coreset as per an aspect of an embodiment of the present disclosure. A ControlResourceSet (coreset) may comprise a coreset index (e.g., ControlResourceSetId), frequency domain resources (e.g., frequencyDomainResources), a duration of the coreset (e.g., a number of OFDM symbols between [1, maxCoReSetDuration], where maxCoReSetDuration=3) and a control channel element (CCE) to resource element group (REG) mapping type (e.g., between interleaved and nonInterleaved). When the CCE-REG mapping type is configured as interleaved, the base station may also configure a bundle size of REG (e.g., reg-BundleSize) and a interleaver size (e.g., interleaverSize). The coreset may also comprise a precoder granularity (e.g., between same as REG bundle (e.g., sameAsREG-bundle) and across all contiguous RBs (e.g., allContiguousRBs)). For example, when the precoder granularity is configured as 'same as REG bundle', the wireless device may assume that a same precoder is used across REGs in a bundle. For example, when the precoder granularity is configured as 'across all contiguous RBs', the wireless device may assume that a same precoder is used across RBs in contiguous RBs of the coreset. The coreset may comprise a list of TCI states, wherein the coreset is not a coreset #0. The coreset may comprise a parameter of a TCI presence in DCI. The wireless device may expect a DCI format comprising a TCI indication in a DCI based on the DCI format being scheduled via a search space associated with the coreset if the coreset is configured with the TCI presence in DCI. For example, the DCI format may be a DCI format 1_1 and/or a DCI format 0_1. The coreset may optionally comprise one or more of a DMRS scrambling identity, a coreset pool index, an enhanced coreset index (e.g., Control ResourceSetId-v16xy), a TCI present in DCI for a DCI format 1_2, and an RB offset. For example, when the enhanced coreset index is present in the coreset configuration, the wireless device may ignore the coreset index. The enhanced coreset index may indicate a value between [0, . . . , 15] whereas the coreset index may indicate a value between [0, . . . , 11].

A coreset is associated with a search space, where the wireless device may determine search space candidates and/or monitoring occasions of the search space based on configuration of the search space and the coreset. A search space is associated with a coreset, where the wireless device may determine search space candidates and/or monitoring occasions of the search space based on configuration of the search space and the coreset. Parameters of the search space may comprise an index of the coreset when the search space is associated with the coreset or the coreset is associated with the search space.

A search space may comprise an index of the search space (e.g., searchSpaceId), an index for associated coreset (e.g., controlResourceSetId), a monitoring periodicity and offset (e.g., periodicity in terms of a number of slots and an offset in terms of a number of slots, between [1, 2560] slots for periodicity, an offset between [0, . . . , P−1] where the P is the periodicity). The search space may comprise a duration, wherein the wireless device may monitor the search space in a consecutive slots starting from the monitoring occasion based on the duration. The base station may not configure the duration for a search space scheduling a DCI format 2_0. A maximum duration value may be the periodicity −1 (e.g., repeated in each slot within an interval/periodicity). The search space may comprise a monitoring symbols within a slot (e.g., a bitmap of size of OFDM symbols in a slot (e.g., 12 for extended cyclic prefix (CP), 14 for normal CP)). The search space may comprise a set of a number of candidates of each aggregation level (e.g., a first candidate number for an aggregation level L=1, a second candidate number of an aggregation level L=2, and so on). The search space may comprise a search space type (e.g., between CSS and USS). Each CSS or USS may comprise one or more DCI formats monitored in the search space. For example, for CSS, one or more of a DCI format 0_0/1_0, a DCI format 2_0, a DCI format 2_1, a DCI format 2_2 and a DCI format 2_3 may be configured. For USS, the base station may configure a list of search space group index (if configured). For USS, the base station may configure a frequency monitoring occasion/location for a wideband operation of unlicensed spectrum or licensed spectrum. In the specification, DCI format 0_0/1_0 may be interchangeably used with DCI format 0-0/1-0 or fallback DCI format. DCI format 0_1/1_1 may be interchangeably used with DCI format 0-1/1-1 or non-fallback DCI format. DCI format 0_2/1_2 may be interchangeably used with DCI format 0-2/1-2 or non-fallback DCI format.

Configuration parameters of the pdsch-Config may comprise parameters for receiving transport blocks. For example, the configuration parameters may comprise a data scrambling identify for PDSCH, a DM-RS mapping type (e.g., between mapping type A and mapping type B), a list of transmission configuration indicator (TCI) states, a parameter of (virtual RB) VRB-to-(physical RB) PRB interleaves, resource allocation type (e.g., resource allocation type 0, resource allocation type 1 or a dynamic switch between two), a list of time domain allocation, a aggregation factor, a list of rate matching patterns, a RBG (resource block group) size, a MCS table (e.g., between QAM 256 and a QAM64LowSE, between high MCSs or low MCSs), a maximum codeword (e.g., between 1 or 2), parameter(s) related to a PRB bundling, maximum MIMO layer, a minimum scheduling offset related to a power saving technique, and/or one or more parameters related to a DCI format 1_2 (e.g., a compact DCI or small sized DCI format).

In an example, the base station may configure a coreset with a plurality of TCI states. The base station may indicate a TCI of the plurality of TCI states for the coreset as an active TCI state via a MAC CE command or a DCI command. For example, a serving cell index (e.g., Serving Cell ID) may indicate an index of a serving cell, where the MAC CE command applies. A coreset index (e.g., CORESET ID) may indicate a coreset index where the MAC CE command applies. A TCI state index (e.g., TCI State ID) may indicate a TCI state identified by TCI-StateId. For example, when the coreset is CORESET #0, the TCI state ID may indicate one TCI state of first 64 TCI states configured for pdsch-Config of a BWP of the serving cell. The BWP of the serving cell may be an active BWP of the cell. When the coreset is not the CORESET #0 (e.g., CORESET ID is not zero), the TCI state ID may indicate a TCI state of the plurality of TCI states configured for the coreset in pdcch-Config.

In an example, a physical downlink control channel (PDCCH) may comprise one or more control-channel elements (CCEs). For example, the PDCCH may comprise one CCE that may correspond to an aggregation level (AL)=1. For example, the PDCCH may comprise two CCEs that may correspond to an AL of two (AL=2). For example, the PDCCH may comprise four CCEs that may correspond to an AL of four (AL=4). For example, the PDCCH may comprise eight CCEs that may correspond to an AL of eight (AL=8). For example, the PDCCH may comprise sixteen CCEs that may correspond to an AL of sixteen (AL=16).

In an example, a PDCCH may be carried over one or more control resource sets (coresets). A coreset may comprise N_rb_coreset resource blocks (RBs) in the frequency domain and N_symbol_coreset symbols in the time domain. For example, the N_rb_coreset may be multiple of 6 RBs (e.g., 6, 12, 18, . . . ). For example, N_symbol_coreset may be 1, 2 or 3. A CCE may comprise M (e.g., M=6) resource-element groups (REGs). For example, one REG may comprise one RB during one OFDM symbol. REGs within the coreset may be ordered/numbered in increasing order in a time-first manner, starting with 0 for a first OFDM symbol and a lowest number (e.g., a lowest frequency) RB in the coreset. The wireless device may increase the numbering in the first OFDM symbol by increasing a frequency location or a RB index. The wireless device may move to a next symbol in response to all RBs of the first symbol may have been indexed. The wireless device may map one or more REG indices for one or more 6 RBs of N_rb_coreset RBs within N_symbol_coreset OFDM symbols of the coreset.

In an example, a wireless device may receive configuration parameters from a base station. The configuration parameters may indicate one or more coresets. One coreset may be associated with one CCE-to-REG mapping. For example, a single coreset may have a single CCE mapping to physical RBs/resources of the single coreset. For example, a CCE-to-REG of a coreset may be interleaved or non-interleaved. For example, a REG bundle may comprise L consecutive REGs (e.g., iL, iL+1, iL+L−1). For example, L may be a REG bundle size (e.g., L=2 or 6 for N_symbol_coreset=1 and L=N_symbol_coreset or 6 when N_symbol_coreset is 2 or 3). An index of a REG bundle (e.g., i), may be in a range of [0, 1, . . . N_reg_coreset/L−1]. For example, N_reg_coreset may be defined as N_rb_coreset*N_symbol_coreset (e.g., a total number of REGs in the single coreset). For example, a j-th indexed CCE may comprise one or more REG bundles of {f(6j/L), f(6j/L+1), f(6j/L+6/L−1)}. For example, f(x) may be an interleaver function. In an example, f(x) may be x (e.g., j-th CCE may comprise 6j/L, 6j/L+1, . . . , and 6j/L+6/L−1), when the CCE-to-REG mapping may be non-interleaved. When the CCE-to-REG mapping may be interleaved, L may be defined as one of {2, 6} when N_symbol_coreset is 1 or may be defined as one of {N_symbol_coreset, 6} when N_symbol_coreset is 2 or 3. When the CCE-to-REG mapping may be interleaved, the function f(x) may be defined as (rC+c+n_shift) mod (N_reg_coreset/L), wherein x=cR+r, r=0, 1, . . . , R−1, c=0, 1, . . . , C−1, C=N_reg_coreset/(L*R), and R is one of {2, 3, 6}.

For example, the configuration parameters may comprise a frequencyDomainResources that may define N_rb_coreset. The configuration parameters may comprise duration that may define N_symbol_coreset. The configuration parameters may comprise cce-REG-MappingType that may be selected between interleaved or non-interleaved mapping. The configuration parameters may comprise reg-BundleSize that may define a value for L for the interleaved mapping. For the non-interleaved mapping, L=6 may be predetermined. The configuration parameters may comprise shiftIndex that may determine n_shift as one of {0, 1, . . . , 274}. The wireless device may determine/assume a same precoding for REGs within a REG bundle when precoder granularity (e.g., a precoderGranularity indicated/configured by the configuration parameters) is configured as sameAsREG-bundle. The wireless device may determine/assume a same precoding for all REGs within a set of contiguous RBs of a coreset when the precoderGranularity is configured as all-ContiguousRBs.

For a first coreset (e.g., CORESET #0) may be defined/configured with L=6, R=2, n_shift=cell ID, and precoderGranularity=sameAsREG-bundle.

In an example, a base station may transmit one or more messages comprising configuration parameters. The configuration parameters may be for a plurality of serving cells for a wireless device. The configuration parameters may comprise parameter(s) to enable control channel repetition. For example, the control channel repetition may be transmitted via one or more serving cells. The control channel repetition may schedule one or more resources for a transport block. The transport block may be transmitted via one or more PDSCHs or one or more PUSCHs. For example, the control channel repetition may be transmitted via a single cell, where the single cell may operate with a single transmission and reception point (TRP) or a plurality of TRPs. The base station may transmit one or more control channels for a control channel repetition via one or more resources (e.g., or a plurality of downlink control signal/channel transmission occasions) in different frequency resources (e.g., repetition in a frequency domain or in a plurality of carriers/cells). The one or more resources may overlap in time domain. The base station may transmit one or more second control channels for a control channel repetition via one or more second resources (e.g., or a plurality of downlink control signal/channel transmission occasions) in different time resources (e.g., repetition in a time domain or in a plurality of slots). The one or more second resources may overlap in frequency domain. For example, the base station may transmit the repetitions of the control channel repetition via a plurality of coresets of the single cell. For example, the base station may transmit the control channel repetition via a plurality of search spaces of the single cell.

In an example, the control channel repetition may be transmitted via a plurality of PDCCHs. For example, a PDCCH may indicate a physical control channel transmitted in one search space candidate. A search space candidate may comprise one or more CCEs based on an aggregation level. The plurality of PDCCHs may be transmitted via a plurality of coresets of a plurality of cells. For example, the base station may transmit, via a coreset of a cell of the plurality of cells, a PDCCH of the plurality of the PDCCHs. The plurality of PDCCHs may be transmitted via a plurality of coresets of a cell. For example, the base station may transmit, via a coreset of the plurality of coresets, a PDCCH of the plurality of the PDCCHs. The plurality of PDCCHs may be transmitted via a plurality of search spaces, where a PDCCH of the plurality of PDCCHs maybe transmitted via a search space of the plurality of search spaces. The plurality of PDCCHs may be transmitted via a plurality of search space candidates where each PDCCH of the plurality of PDCCHs may be transmitted via a respective search space candidate of the plurality of search space candidates. The plurality of search space candidates may belong to a single search space or a plurality of search spaces. A search space may comprise a set of search space candidates over monitoring occasions. Monitoring occasions of the search space may refer timing occasions where the wireless device may monitor a search space candidate for receiving a DCI/a PDCCH.

In an example, a PDCCH of the plurality of PDCCHs for the control channel repetition may convey/transmit a DCI based on a DCI format. For example, a first DCI of a first PDCCH of the plurality of PDCCHs may be the same as a second DCI of a second PDCCH of the plurality of PDCCHs. For example, content of the first DCI/PDCCH may be same as content of the second DCI/PDCCH. Based on same content of the plurality of PDCCHs, the wireless device may aggregate the plurality of DCIs/PDCCHs before decoding a DCI/PDCCH. For example, the wireless device may need to determine a reference frequency domain resource (e.g., a reference downlink control signal/channel transmission/repetition occasion) and/or a reference time domain resource (e.g., a reference downlink control signal/channel transmission/repetition occasion) and/or a reference CCE index and/or a reference REG index when the control channel repetition is transmitted/performed via equal content DCIs/PDCCHs. For example, the wireless device may determine an aggregated DCI/PDCCH by aggregating the plurality of DCIs/PDCCHs. The wireless device may decode the aggregated DCI/PDCCH.

For example, the reference frequency domain resource of the plurality of DCIs/PDCCHs may be determined based on an earliest PDCCH (or a latest PDCCH) among the plurality of PDCCHs. For example, when a first PDCCH of the plurality of PDCCHs is transmitted in a slot n and a second PDCCH of the plurality of PDCCHs is transmitted in a slot n+1, the first PDCCH may determine the reference frequency domain resource. Similarly, the reference time domain resource and/or the reference CCE index and/or the reference REG may be determined based on the earliest PDCCH or the latest PDCCH. The reference frequency (and/or time) domain resource of the plurality of DCIs/PDCCHs may be determined based on a CORESET index of one or more CORESETs where the plurality of DCIs/PDCCHs are transmitted. For example, a smallest (or a largest) coreset index of the one or more CORESETs may be used for the determining.

The reference frequency (and/or time) domain resource of the plurality of DCIs/PDCCHs may be determined based on a search space index of one or more search spaces where the plurality of DCIs/PDCCHs are transmitted. For example, a smallest (or a largest) index of the one or more search spaces may be used for the determining. The reference frequency domain resource of the plurality of DCIs/PDCCHs may be determined based on a cell index of one or more cells where the plurality of DCIs/PDCCHs are transmitted. For example, a smallest (or a largest) index of the one or more cells may be used for the determining. Similarly, the reference time domain resource and/or the reference CCE index and/or the reference REG may be determined based on the CORESET index, the search space index and/or the cell index. Combinations of transmission time, a CORESET index, a search space and/or a cell index may be used. For example, first the reference frequency domain resource may be determined based on the transmission time of a DCI/PDCCH. When there are multiple DCIs/PDCCHs transmitted at a same time, the wireless device may use the CORESET index or the search space index and/or the cell index to further identify a reference DCI/PDCCH among the plurality of DCIs/PDCCHs. The wireless device may determine the reference DCI/PDCCH for determining the reference frequency domain resource, the reference time domain resource, the reference CCE index and/or the reference REG index.

In an example, the base station may, by/via the configuration parameters, configure/indicate a maximum repetition number K for the control channel repetition. The base station may transmit a number of repetitions M that is smaller than the K. In response to the M being smaller than K, the wireless device may determine the reference DCI/PDCCH based on a candidate DCI/PDCCH in K-th repetition regardless whether the K-th repetition has been actually transmitted or not (or the K-th repetition has been actually received or not). The wireless device may determine the reference DCI/PDCCH based on a first DCI/PDCCH which is a first repetition. The wireless device may determine the reference DCI/PDCCH based on a last DCI/PDCCH which has been actually transmitted (e.g., M-th repetition). For a convenience, in the specification, this type of control channel repetition (e.g., same content is repeated over a plurality of DCIs/PDCCHs) may be called/referred as a first control channel repetition mode (e.g., a mode 1, a repetition mode 1, a 1st repetition mode). In an example, a base station may configure a list of time domain resource allocation entries. A time domain resource allocation entry may comprise a number of repetition of a control channel, a scheduling offset between the control channel and a PDSCH, and/or a number of PDSCH repetition. For example, the number of repetition of the control channel may represent the number of repetition K. Based on the number of repetition, the wireless device may determine a reference DCI/PDCCH timing based on K-th DCI/PDCCH repetition. The repeated DCIs/PDCCHs may indicate an entry of the list of time domain resource allocation entries.

In an example, a first DCI/PDCCH of the plurality of DCIs/PDCCHs may be different from a second DCI/PDCCH of the plurality of DCIs/PDCCHs. For example, a wireless device may not aggregate the first DCI/PDCCH and the second DCI as contents of the first DCI/PDCCH may be different. The wireless device may attempt to decode the first DCI/PDCCH separately from the second DCI/PDCCH. For example, the wireless device may complete the decoding of the control channel repetition when the wireless device has received at least one DCI/PDCCH of the plurality of DCIs/PDCCHs. For example, the wireless device may be able to receive or transmit a TB scheduled by the plurality of DCIs/PDCCHs when the wireless device has received at least one DCI/PDCCH of the plurality of DCIs/PDCCHs. In the specification, this type of control channel repetition (e.g., potentially different contents are transmitted via a plurality of DCIs/PDCCHs, a DCI/PDCCH of the plurality of DCIs/PDCCHs may schedule one or more resources of a transport block) may be called/referred as a second control channel repetition mode (e.g., a mode 2, a repetition mode 2, a 2nd repetition mode). For example, a reference DCI/PDCCH of the plurality of DCIs/PDCCHs based on the second control channel repetition mode may be each DCI/PDCCH received by the wireless device.

Figure 19:
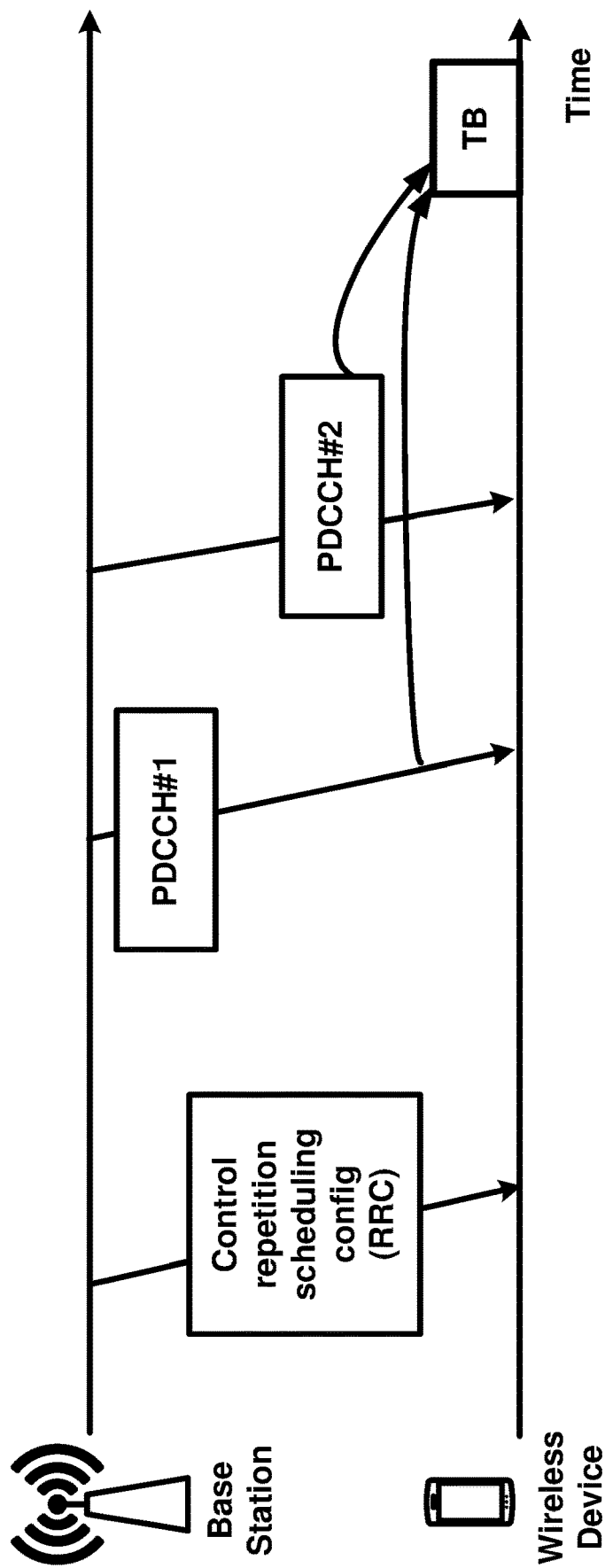
FIG. 19 illustrates an example of a PDCCH repetition as per an aspect of an embodiment of the present disclosure.

FIG. 19 illustrates an example of a PDCCH repetition as per an aspect of an embodiment of the present disclosure. The base station may transmit one or more RRC messages comprising configuration parameters. The configuration parameters may comprise parameters for a control channel repetition. The parameters may comprise one or more scheduling carriers/cells for transmitting one or more PDCCHs/DCIs of repeated control channels (or of the control channel repetition). The parameters may comprise one or more search spaces for the control channel repetition. FIG. 19 illustrates an example of enabling a control channel repetition via a first search space (SS #1) of a first carrier/cell (DL carrier #0). The parameters may indicate one or more indexes of the one or more search spaces of the first carrier and/or a carrier/cell index of the first carrier. The base station may transmit a first PDCCH, scheduling a TB via the first carrier, via the first search space of the first carrier. The base station may transmit a second PDCCH, scheduling the TB via the first carrier, via the first search space of the first carrier. The first PDCCH and the second PDCCH may be transmitted via a plurality of monitoring occasions of the first search space. The wireless device may aggregate the first PDCCH and the second PDCCH based on the first control channel repetition mode or may attempt to receive/decode each PDCCH independently based on the second control channel repetition mode. Based on the first PDCCH and/or the second PDCCH, the wireless device may receive the TB.

In an example, a base station may transmit one or more RRC messages indicating a control channel repetition enabled for a first carrier/cell. Based on the indication of the control channel repetition, a wireless device may determine one or more first search spaces of the first carrier/cell, for the control channel repetition, based on the active BWP of the first carrier/cell. For example, the one or more first search spaces may be configured with a non-fallback DCI format or be configured with a DCI format 1_1 and/or a DCI format 1_2 and/or a DCI format 0_1 and/or a DCI format 0_2. In an example, the one or more RRC messages may indicate one or more search space indexes of the one or more first search spaces for the control channel repetition. The one or more RRC messages may indicate one or more DCI formats, where the wireless device may apply the control channel repetition. The wireless device may determine the one or more first search spaces of the first carrier/cell based on the one or more DCI formats of the control channel repetition.

In an example, a base station may transmit a plurality of DCIs/PDCCHs, scheduling resource(s) for a transport block of a cell, via a plurality of TRPs or via a plurality of coreset pools or via a plurality of coreset groups. For example, a base station may configure a first TRP (or a first coreset pool) for a first cell via one or more RRC messages. The one or more RRC messages may comprise configuration parameters. The configuration parameters may comprise the first coreset pool of the first cell. The configuration parameters may comprise a second coreset pool of the first cell. For example, the second coreset pool may correspond to a second TRP of the first cell. The base station may transmit a first DCI/PDCCH via a first search space of a first coreset of the first coreset pool. The base station may transmit a second DCI/PDCCH via a second search space of a second coreset of the second coreset pool. The first DCI/PDCCH and the second DCI/PDCCH may schedule resource(s) of a transport block. The first/PDCCH and the second DCI/PDCCH may be repeated transmission of a control information (e.g., DCI). The transport block, for example, may be transmitted via the first TRP and the second TRP. The transport block may be transmitted based on a plurality of TCI states. The transport block may be transmitted based on a TCI state, where the TCI state is associated with a plurality of TCI states. The transport block, for example, may be transmitted via the first TRP or the second TRP.

The configuration parameters may indicate a control channel repetition enabled/configured for the first cell. For example, a parameter of a control channel repetition mode may be configured. The control channel repetition mode may be the first control channel repetition mode or the second control channel repetition mode. The configuration parameters may indicate a first coreset associated with (or configured with or of) the first coreset pool. The configuration parameters may indicate a second coreset associated with (or configured with or of) the second coreset pool. The wireless device may determine a pair of the first coreset and the second coreset, where repeated DCI/PDCCHs may be transmitted, based on a rule. For example, the wireless device may determine the first coreset of the first coreset pool based on a search space associated with the first coreset, where the wireless device may monitor a DCI format via the search space. For example, the DCI format may be a DCI format 1_1 or a DCI format 0_1 or a DCI format 1_2 or a DCI format 0_2 (or a DCI format 3_0 or a DCI format 3_1). When there is a plurality of first search spaces, of the first coreset pool, configured with the DCI format, the wireless device may determine the plurality of first coresets of the first coreset pool. Similarly, the wireless device may determine the second coreset of the second coreset pool based on a search space associated with the second coreset, where the wireless device may monitor the DCI format via the search space. When there is a plurality of second search spaces, of the second coreset pool, configured with the DCI format, the wireless device may determine the plurality of second search spaces. In an example, the wireless device may be configured with at most one search space for a DCI format in each coreset pool.

In an example, the wireless device may determine the second coreset of the second coreset pool based on a first coreset index of the first coreset of the first coreset pool. For example, a second index of the second coreset may be the first coreset index+GAP. For example, the GAP may be a determined/predetermined value (e.g., 0, 12). For example, the configuration parameters may comprise a parameter indicating a value of the GAP. In an example, the wireless device may determine the second coreset based on a second search space, associated with the second coreset, and the first search space. For example, an index of the second search space may be a first index of the first search space+SS-GAP. For example, SS-GAP may be a predetermined value (e.g., 20, 0). For example, the wireless device may determine the second coreset and/or the second search space based on an association configured by the configuration parameters. For example, the configuration parameters may indicate the association between each of a coreset/search space associated with the first coreset pool and each of a coreset/search space associated with the second coreset pool. In an example, the configuration parameters may comprise a first coreset and/or a first search space of the first coreset pool. The wireless device may monitor a first DCI/PDCCH via the first search space of the first coreset pool. The configuration parameters may indicate/comprise a parameter indicating a control channel repetition across a multi-TRP or a multi-coreset pool for the first coreset or the first search space. Based on the parameter, the wireless device may determine a second coreset or a second search space of the second coreset pool. For example, the wireless device may determine the second coreset based on one or more parameters of the first coreset. For example, a same set of resource blocks configured for the first coreset may be used for the second coreset. For example, monitoring occasions of the first search space may be used for determining monitoring occasions of the second search space.

In an example, a base station may indicate a control channel repetition based on (or for) a coreset. For example, the base station may transmit a plurality of DCIs/PDCCHs via the coreset. The base station may transmit the plurality of DCIs/PDCCHs over a plurality of TRPs. The base station may transmit one of more RRC messages and/or MAC CEs indicating a plurality of TCI states are activated for the coreset. For example, the plurality of TCI states may comprise a first TCI state, corresponding to a first TRP of the plurality of TRPs, and a second TCI state, corresponding to a second TRP of the plurality of TRPs. The base station may transmit one or more second RRC messages comprising configuration parameters for the coreset. For example, the configuration parameters may indicate a control channel repetition based on the coreset. The configuration parameters may indicate the control channel repetition across a plurality of TRPs. The configuration parameters may indicate a repetition pattern across the plurality of TRPs. For example, the repetition pattern (e.g., TRP switching pattern) may be [0, . . . , 0, 1, . . . , 1] where 0 may represent a first TRP of the plurality of TRPs and 1 may represent a second TRP of the plurality of TRPs. The base station may indicate, for example via the configuration parameters, a bitmap indicating a number of control channel repetition. Each bit of the bitmap may represent which TRP may transmit i-th repetition. The repetition pattern may be [0, 1, 0, 1, . . . , 0, 1]. The repetition pattern may be [0, 0, . . . , 0, 1, 1, . . . , 1, 0, 0, . . . , 0, 1, 1, . . . , 1]. Various repetition patterns may be considered. Based on the repetition pattern, the wireless device may receive a control channel repetition based on a TCI state of the plurality of TCI states. For example, when the repetition pattern indicates the first TRP, the wireless device may receive the control channel repetition based on the first TCI state. When the repetition indicates the second TRP, the wireless device may receive the control channel repetition based on the second TCI state.

Figure 20:
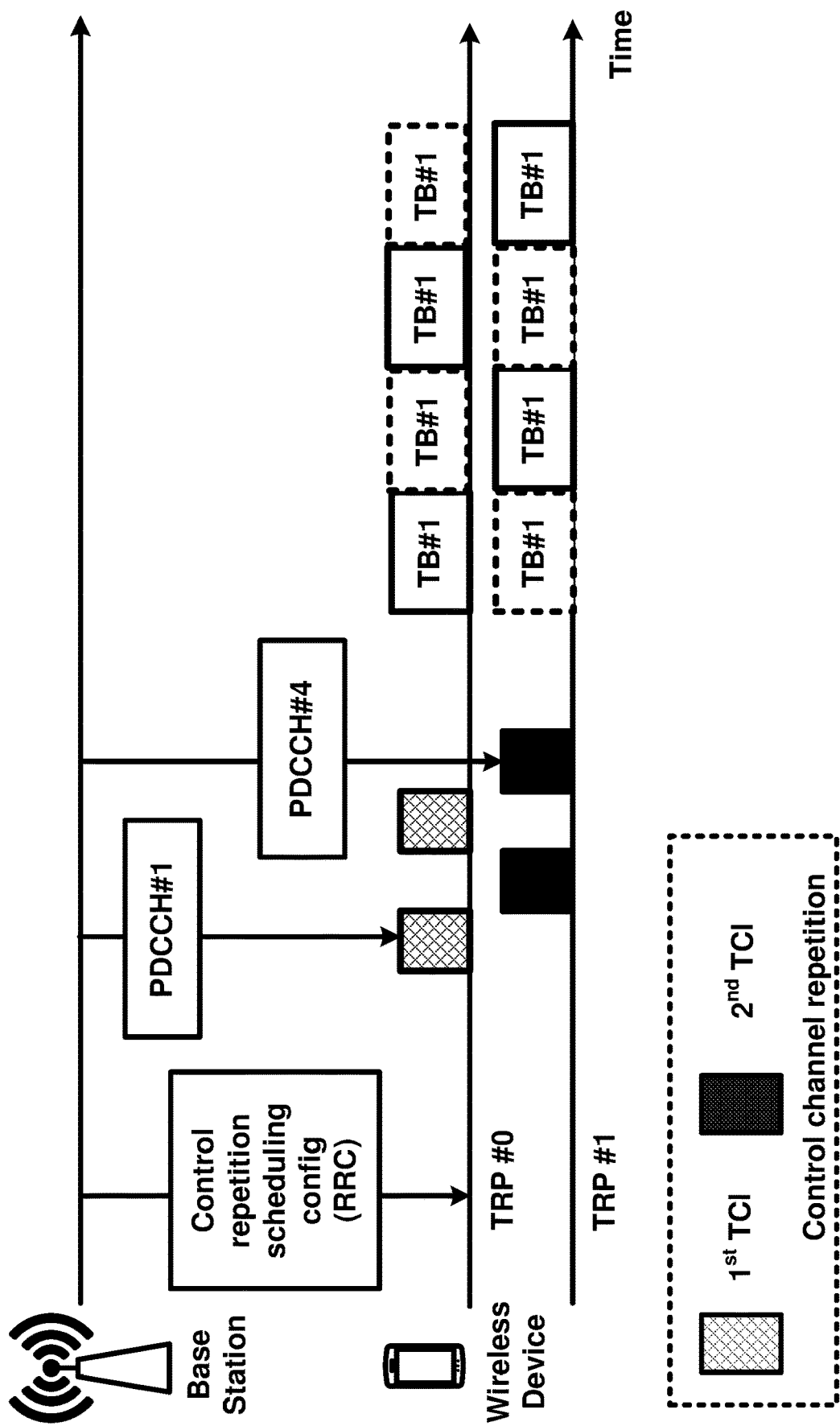
FIG. 20 illustrates an example of control channel repetition across a plurality of TRPs as per an aspect of an embodiment of the present disclosure.

FIG. 20 illustrates an example of control channel repetition across a plurality of TRPs as per an aspect of an embodiment of the present disclosure. The base station may transmit one or more RRC messages comprising configuration parameters. The configuration parameters may indicate/comprise a first TRP (TRP #0) and a second TRP (TRP #1) associated with a cell. The configuration parameters may comprise/indicate a control channel repetition across a multi-TRP (e.g., via the first TRP and the second TRP). The base station may transmit a first DCI/PDCCH (e.g., PDCCH #1) via the first TRP or a first coreset pool. The first DCI/PDCCH may comprise/indicate resources scheduling a TB via the multi-TRP. The base station may transmit a second DCI/PDCCH (e.g., PDCCH #2) via the second TRP or a second coreset pool. The second DCI/PDCCH may comprise/indicate the resources scheduling the TB via the multi-TRP. The first DCI/PDCCH and the second DCI/PDCCH may indicate a same HARQ process index (e.g., HARQ-K) scheduling the TB. The base station may transmit a third DCI/PDCCH via the first TRP. The base station may transmit a fourth DCI/PDCCH (e.g., PDCCH #4) via the second TRP. A control information scheduling the TB may be repeated four times via a plurality of TRPs. A wireless device may monitor the first DCI/PDCCH and the third DCI/PDCCH based on a first TCI state, associated with the first TRP or the first coreset pool. The wireless device may monitor the second DCI/PDCCH and the fourth DCI/PDCCH based on a second TCI state, associated with the second TRP or the second coreset pool.

The base station may repeat the TB via four repetitions of the first TRP and via four repetitions of the second TRP. The wireless device may repeat the TB simultaneously via the first TRP and the second TRP when the wireless device may support simultaneous reception via the first TRP and the second TRP. When the wireless device may not support simultaneous reception via the first TRP and the second TRP, the base station may transmit the repeated transmission of the TB via the first TRP and the second TRP based on a time-domain division multiplexing. For example, the base station may transmit a first repetition of the repeated transmission via the first TRP. The base station may transmit a second repetition of the repeated transmission via the second TRP. A switching pattern between the first TRP and the second TRP may be configured by the base station based on RRC/MAC-CE/DCI signaling. The first DCI and the second DCI may schedule the repeated transmissions of the TB.

Embodiments of a control channel repetition via a plurality of TRPs may enhance a reliability and lead better QoS experience.

In an example, a base station may transmit one or more RRC messages comprising configuration parameters. The configuration parameters may indicate a control channel repetition enabled for a cell. The base station may transmit a plurality of DCIs/PDCCHs scheduling a transport block via a plurality of coresets of the cell. For example, the configuration parameters may configure a first coreset and a second coreset for the control channel repetition. The configuration parameters may comprise/indicate a first search space associated with the first coreset. The configuration parameters may comprise/indicate a second search space associated with the second coreset. The configuration parameters may comprise/indicate a first TCI state associated with the first coreset. The configuration parameters may comprise/indicate a second TCI state associated with the second coreset. The first TCI state may be same or different from the second TCI state. The configuration parameters may comprise/indicate a set of first TCI states associated with the first coreset. One or more MAC CEs may indicate the first TCI state of the set of the first TCI states for the first coreset. For example, the configuration parameters may comprise/indicate a set of second TCI states associated with the second coreset. One or more second MAC CEs may indicate the second TCI state of the set of the second TCI states for the second coreset. The configuration parameters may indicate the first coreset and the second coreset are associated to schedule repeated DCIs/PDCCHs for a transport block.

In an example, the configuration parameters may indicate/comprise a search space associated with the first coreset and the second coreset. The configuration parameters may comprise a plurality of coreset indexes. The configuration parameters may comprise a coreset index, of the plurality of coreset indexes, indicating the first coreset. The configuration parameters may comprise one or more indexes, of the plurality of coreset indexes, of repeated/additional coresets (e.g., coresets used for a control channel repetition in addition to the first coreset, the second coreset). For example, an index of the one or more indexes may indicate the second coreset. When the first coreset and the second coreset are associated for a control channel repetition, first parameters of the first coreset and second parameters of the second coreset may have restriction in terms of configuration. For example, a set of resource blocks (RB) in frequency domain of the first coreset may be same to (or a subset of or a superset of) a set of resource block in frequency domain of the second coreset. The wireless device may determine a set of RBs belonging to the first coreset and the second coreset for the control channel repetition. For example, a first duration of the first coreset may be same to a second duration of the second coreset. For example, a number of REGs of the first coreset may be same as a number of REGs. For example, a number of CCEs of the first coreset may be same as (or less than or larger than) a number of CCEs of the second coreset. The wireless device may determine a number of REGs based on the determined set of RBs or based on the set of RBs of the first coreset. For example, a first CCE-to-REG mapping type of the first coreset (e.g., between interleaved or non-interleaved) may be same as a second CCE-to-REG mapping type of the second coreset. For example, a precoder granularity of the first coreset may configured as same to a precoder granularity of the second coreset. For example, a first tci-PresenceInDCI of the first coreset may same as a second tci-PresenceInDCI of the second coreset. For example, a first rb-Offset of the first coreset may be same as a second rb-Offset of the second coreset.

The first coreset and the second coreset may have potentially different configurations for one or more parameters. For example, the one or more parameters may comprise one or more TCI states. For example, the one or more parameters may comprise DM-RS scrambling identity (e.g., pdcch-DMRS-ScramblingID). For example, the one or more parameters may comprise a coreset pool index (e.g., coresetPoolIndex). For example, the one or more parameters may comprise a coreset index.

When the wireless device may receive first configuration parameters of the first coreset and second configuration parameters of the second coreset, the wireless device determines whether a first number of CCEs of the first coreset is equal to or smaller (or larger) than a second number of CCEs of the second coreset. Based on the determining, the wireless device may consider the first coreset and the second coreset may be used for a control channel repetition. Otherwise, the wireless device may determine the first coreset and the second coreset may not be used for the control channel repetition. Alternatively, the wireless device may determine a smallest number of CCEs (e.g., M) among one or more number of CCEs of one or more coresets (e.g., determine a coreset of the one or more coresets with a smallest number of CCEs). For example, the one or more coresets may be configured/indicated/used for a control channel repetition. The wireless device may determine/assume/consider that first M candidates of each coreset of the one or more coresets are used for the control channel repetition.

In an example, a wireless device may determine a number of REGs of a first coreset of one or more coresets configured for a control channel repetition. The wireless device may determine a second number of REGs of a second coreset of the one or more coresets. The wireless device may determine whether the number of REGs is equal to the second number of REGs. In response to the determining the number of REGs being equal to the second number of REGs, the wireless device may consider the control channel repetition is configured via the first coreset and the second coreset. Otherwise, the wireless device may consider the configuration as an error case and may not activate the control channel repetition via the first coreset and the second coreset. In an example, the wireless device may determine a smallest number of REGs of the one or more coresets (e.g., determine a coreset with a smallest number of REGs). The wireless device may assume that the smallest number of REGs used for the control channel repetition.

The configuration parameters of the search space, associated with the first coreset and the second coreset, may comprise/indicate a switching pattern or mapping pattern of the first coreset and the second coreset. For example, the wireless device may determine a search space monitoring occasion based on the configuration parameters of the search space. The wireless device may determine the search space monitoring occasion based on the first coreset. The wireless device may determine a second search space monitoring occasion or an extended monitoring occasion based on a rule. For example, the wireless device may determine the second search space monitoring occasion as a next slot of the first monitoring occasion. The wireless device may determine the second search space monitoring occasion based on the second search space. The configuration parameters may indicate a bitmap of a number of OFDM symbols in a slot (or of a number of slots e.g., a multiple slots). The bitmap may indicate 0 for the first coreset or 1 for the second coreset for each corresponding OFDM symbol or a slot. When 0 is indicated for a OFDM symbol, the wireless device may monitor a search space monitoring occasion based on the first coreset. When 1 is indicated for a second OFDM symbol, the wireless device may monitor a second search space monitoring occasion based on a second coreset.

In an example, a wireless device may receive one or more RRC messages comprising configuration parameters. The configuration parameters may indicate/comprise a coreset of a bandwidth part of a cell. The configuration parameters may comprise parameters of a search space associated with the coreset. The parameters of the search space may indicate a first monitoring periodicity in a unit of a first time duration. For example, the first time duration may be a slot or a few slots. The parameters of the search space may indicate a second monitoring periodicity in a unit of a second time duration. For example, the second time duration may be an OFDM symbol or a few OFDM symbols or a slot. For example, the second time duration may be smaller than the first time duration. The wireless device may monitor one or more repeated DCIs/PDCCHs via one or more monitoring occasions (e.g., a plurality of downlink control signal/channel transmission occasions) determined based on the second monitoring periodicity within the first monitoring periodicity. For example, the configuration parameters may indicate the one ore monitoring occasions within the first monitoring periodicity.

For example, the wireless device may receive/monitor a first DCI/PDCCH of the one or more repeated DCIs/PDCCHs via a first monitoring occasion of the one or more monitoring occasions. The wireless device may receive/monitor a second DCI/PDCCH of the one or more repeated DCIs/PDCCHs via a second monitoring occasion of the one or more monitoring occasions. The first DCI/PDCCH may be same as the second DCI/PDCCH. The first DCI/PDCCH and the second DCI/PDCCH may indicate same resource(s) for a transport block. The wireless device may receive/monitor a DCI via the one or more monitoring occasions, where a search space candidate for the DCI may comprise one or more candidates of the one or more monitoring occasions. For example, the search space candidate may comprise a first candidate of the first monitoring occasion and a second candidate of the second monitoring occasion. For example, a first starting CCE index of the first candidate of the first monitoring occasion may be same as a second starting CCE index of the second candidate of the second monitoring occasion.

The wireless device may receive/monitor the DCI/PDCCH via the one or more monitoring occasions, where the search space candidate for the DCI/PDCCH may comprise one or more CCEs from the one or more monitoring occasions.

For example, the coreset may be associated with a plurality of TCI states as active TCI states. For example, the plurality of TCI states may be activated via one or more RRC messages or MAC CEs or DCIs. The wireless device may monitor the first monitoring occasion based on a first TCI of the plurality of TCI states. The wireless device may monitor the second monitoring occasion based on a second TCI of the plurality of TCI states.

Figure 21:
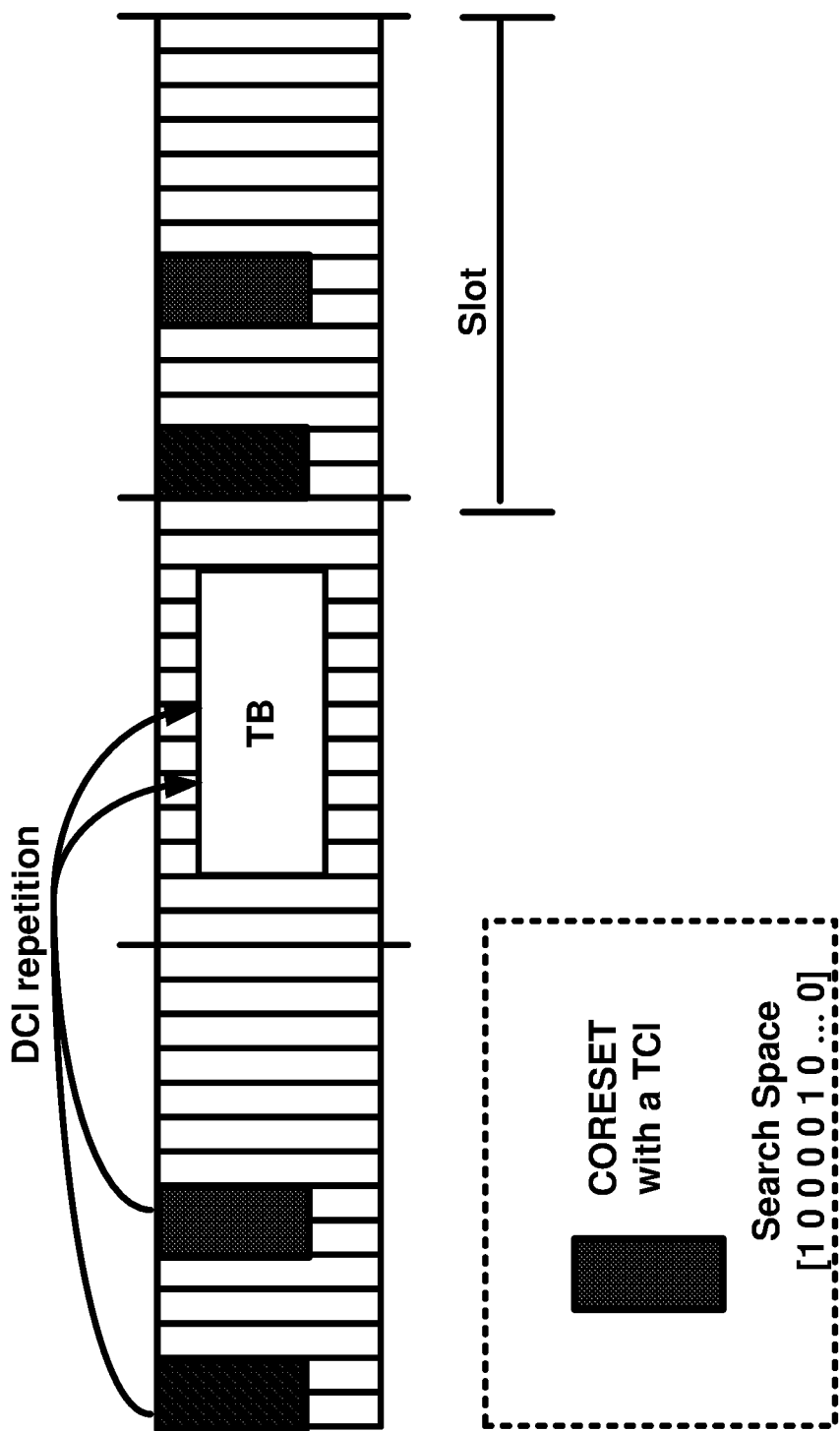
FIG. 21 illustrates an example of control channel repetition as per an aspect of an embodiment of the present disclosure.

FIG. 21 illustrates an example of control channel repetition as per an aspect of an embodiment of the present disclosure. For example, a base station may transmit one or more RRC messages comprising configuration parameters. The configuration parameters may comprise/indicate a coreset associated with an active TCI state. A base station may activate the active TCI state via the one or more RRC messages or one or more MAC CEs or one or more DCIs. The configuration parameters may comprise/indicate a bitmap indicating one or more monitoring occasions for a control channel repetition. FIG. 21 illustrates that a bitmap size is 14 (e.g., the bitmap corresponds to a slot where each bit maps to each OFDM symbol). The bitmap indicates monitoring occasions of 1st OFDM symbol and 6th OFDM symbol of a slot. The configuration parameters may indicate/comprise a first monitoring periodicity as two slots (e.g., monitor in every two slots). In each monitoring periodicity, the wireless device may determine one or more monitoring occasions based on the bitmap. For example, when the bitmap is not present, the wireless device may determine a monitoring occasion starting at a first OFDM symbol of a slot. In the example of FIG. 21, the wireless device may determine a first monitoring occasion and a second monitoring occasion based on the bitmap in each monitoring periodicity. The wireless device may monitor the first monitoring occasion and the second monitoring occasion for receiving one or more DCIs/PDCCHs scheduling a transport block.

In an example, the configuration parameters indicate, for a search space, one or more monitoring occasions within a monitoring periodicity. For example, monitoringSlotPeriodicityAndOffset may determine the monitoring periodicity. When parameters may comprise a monitoringSymbolWithinSlot, the wireless device may determine the monitoring periodicity based on a gap between each monitoring occasion within the slot based on the monitoringSymbolWithinSlot. The wireless device may expect an equal interval between monitoring occasions within the slot. Alternatively, the parameters may not comprise the monitoringSymbolsWithinSlot when the search space is used for a control channel repetition. In an example, the monitoringSymbolsWithinSlot may be used to indicate the one or more monitoring occasions within a monitoring periodicity determined based on the monitoringSlotPeriodicityAndOffset when a control channel repetition is enabled. For example, a parameter to indicate enabling of the control channel repetition may be configured for the search space or for a coreset associated with the search space or a DCI format monitored via the search space. For example, a duration of the search space may be used to determine the one or more monitoring occasions within the monitoring periodicity. For example, when the monitoring periodicity is larger than a slot, the wireless device may determine the one or more monitoring occasions based on the monitoring periodicity and the duration. For example, when the monitoring periodicity is P slots and the duration is D, the wireless device may determine a first monitoring occasion of the one or more monitoring occasions based on the monitoringSlotPeriodicityAndOffset. The wireless device may determine a second monitoring occasion of the one or more monitoring occasions as a next slot of the first monitoring occasion. The wireless device may determine D number of monitoring occasions starting from the first monitoring occasions in consecutive slots. For example, when a search space is configured/associated with a plurality of coresets, the search space may comprise a plurality of control resource set Id (e.g., a controlResourceSetID and a second controlResourceSetID).

In an example, a base station may transmit a first DCI/PDCCH via a first monitoring occasion of the one or more monitoring occasions. The base station may transmit a second DCI/PDCCH via a second monitoring occasions of the one or more monitoring occasions. The first DCI/PDCCH and the second DCI/PDCCH may indicate same resource(s) for a transport block. A first content of the first DCI/PDCCH may be same as or different from a second content of the second DCI/PDCCH. The wireless device may attempt to decode the first DCI/PDCCH independently from the second DCI/PDCCH. The wireless device may not assume that the base station may transmit the first DCI/PDCCH and the second DCI/PDCCH. The base station may transmit one or more DCIs/PDCCHs over the one or more monitoring occasions. The base station may transmit a single DCI/PDCCH over the one or more monitoring occasions. The base station may transmit a DCI/PDCCH in each monitoring occasion. The base station may transmit any number of repeated DCIs/PDCCHs over the one or more monitoring occasions.

The base station may indicate the first control channel repetition mode is used for the one or more monitoring occasions. Based on the first control channel repetition mode, the wireless device may determine a number of the one or more monitoring occasions O in a monitoring periodicity. Based on a time-first manner, a monitoring occasions of the one or more monitoring occasions is indexed from 0, ..., O−1. The wireless device may attempt to decode one or more search space candidates aggregating candidates from the monitoring occasion from 0 to i (e.g., i=0, ..., O−1 or i=0, 1, 3, 7, ...). For example, when O is 4, the wireless device may attempt to decode a first candidate aggregating a candidate from 1st monitoring occasion of the one or more monitoring occasions. The wireless device may attempt to decode a second candidate aggregating the candidate and another candidate from 2nd monitoring occasion of the one or more monitoring occasions. The wireless device may attempt to decode a fourth candidate aggregating each candidate of each monitoring occasion of the one or more monitoring occasions. The wireless device may aggregate candidates from the one or more monitoring occasions where a starting CCE index of a candidate of the candidates is same or the wireless device may determine candidates based on a rule. For example, the wireless device may determine candidates of same frequency resources in each monitoring occasion. For example, the wireless device may determine candidates of same REGs (or same REG indexes) in each monitoring occasion.

In an example, a wireless device may determine each list of candidates via each monitoring occasion of one or more monitoring occasions within a monitoring periodicity of a search space. The wireless device may determine a list of candidates across the one or more monitoring occasions based on each list of candidates. The list of candidates may comprise one or more candidates of an aggregation level. For example, the wireless device may determine a first list of candidates of a first aggregation level 2*L based on two candidates over two monitoring occasions of aggregation level L or four candidates over four monitoring occasions of aggregation level L/2.

In an example of determination of one or more search space candidates of an aggregation level across one or more monitoring occasions, a base station may indicate four monitoring occasions in a monitoring periodicity indexed from 1st to 4th monitoring occasion. In the example, a set of candidates for an aggregation level is assumed to be consistent across the four monitoring occasions. For example, a first candidate of an aggregation level 2 may start in 3rd CCE and a second candidate of the aggregation level 2 may start in 5th CCE. For example, a first candidate of an aggregation level 4 may start in N_CCE (e.g., a number of CCEs)−8th CCE and a second candidate of the aggregation level 4 may start in N_CCE−4th CCE. The wireless device may determine a list of candidates with an aggregation level 8 by combining/aggregating four candidates (one candidate from one monitoring occasion each) of the aggregation level 2 and/or by combining/aggregating two candidates (one candidate from one monitoring occasion each) of the aggregation level 4. In the example, a first box in the left and a second small box in the right illustrate AL=8 candidates. The wireless device may determine more candidates by aggregating/combining 2nd candidates of AL=2 and/or 2nd candidates of AL=4. Similarly, the wireless device may determine a candidate of aggregation level (AL)=16 by combining/aggregating four candidates of AL=4. The wireless device may determine two AL=16.

The wireless device may not aggregate candidates wherein the candidates may not comprise a candidate from the first monitoring occasion (or 1st monitoring occasion, an earliest monitoring occasion in a monitoring periodicity). The wireless device may determine possible aggregation levels and/or candidates by aggregating candidates from 1st monitoring occasion, 1st+2nd monitoring occasions, 1st+2nd+3rd+4th monitoring occasions, 1st+2nd+3rd+4th+5th-6th+7th+8th, . . . , and so on.

In an example, the wireless device may determine a list of candidates for an aggregation level based on a hashing function applied in each slot. Same candidates may be mapped when a first monitoring occasion and a second monitoring occasion reside in a same slot. Otherwise, different candidates may be determined. A base station may transmit a DCI over a candidate of the across the one or more monitoring occasions.

In an example, a base station may transmit one or more messages comprising configuration parameters. The configuration parameters may comprise/indicate a search space group for a control channel repetition. The search space group may comprise one or more search spaces. For example, the search group may comprise a first search space of a first carrier and a second search space of a second carrier. For example, the search space group may comprise a first search space of a first BWP of a cell and a second search space of a second BWP of the cell. For example, the search space group may comprise a first search space of first BWP of a first cell and a second search space of a second BWP of a second cell. For example, for a BWP of a cell, the configuration parameters may indicate one or more search space groups. A search space group of the one or more search space groups may be associated/configured with one or more DCI formats. In an example, a wireless device may determine a search space group based on one or more search spaces configured/associated with the BWP of the cell, where each search space of the one or more search spaces may be configured to monitor a DCI format of the one or more DCI formats. For example, the one or more DCI formats may comprise a DCI format 1_1 and a DCI format 0_1. For example, the one or more DCI formats may comprise a DCI format 0_0 and a DCI format 1_0. For example, the one or more DCI formats may comprise a DCI format 1_2 and a DCI format 0_2. For example, the one or more DCI formats may comprise a DCI format 3_0 and a DCI format 3_1. For example, the one or more DCI formats may comprise downlink/uplink DCIs of non-fallback DCIs. For example, the one or more DCI formats may comprise downlink/uplink DCIs of fallback DCIs. For example, the one or more DCI formats may comprise DCI format(s) of sidelink DCIs.

The wireless device may determine a search space candidate over the one or more search space of the search space group in a similar manner addressed for a control repetition based on a plurality of coresets. In an example, the wireless device may determine one or more monitoring occasions in a slot based on the one or more search spaces. For example, in a slot n, the wireless device may determine one or more first monitoring occasions based on a first search space of the one or more search spaces. The wireless device may determine, in the slot n, one or more second monitoring occasions based on a second search space of the one or more search spaces. The wireless device may monitor the one or more first monitoring occasions and the one or more second monitoring occasions in the slot n. The wireless device may not expect to have overlap between a monitoring occasion of a search space of the one or more search spaces and a second monitoring occasion of a second search space of the one or more search spaces in a time domain. The wireless device may monitor one or more repeated DCIs based on the DCI format via the one or more monitoring occasions in the slot.

In an example, the one or more repeated DCIs may be transmitted, by the base station, via one or more PDCCHs, where each PDCCH may carry/transmit each DCI. Each DCI of the one or more repeated DCIs may have same content or different content. The wireless device may aggregate the one or more repeated DCIs when each DCI may have same content. In an example, the one or more repeated DCIs may be transmitted via a PDCCH, where the PDCCH may be transmitted over one or more search space candidates of the one or more search spaces. In an example, a DCI may be transmitted repeatedly via one or more PDCCHs, where each PDCCH may carrier/transmit the DCI repeatedly.

Figure 22:
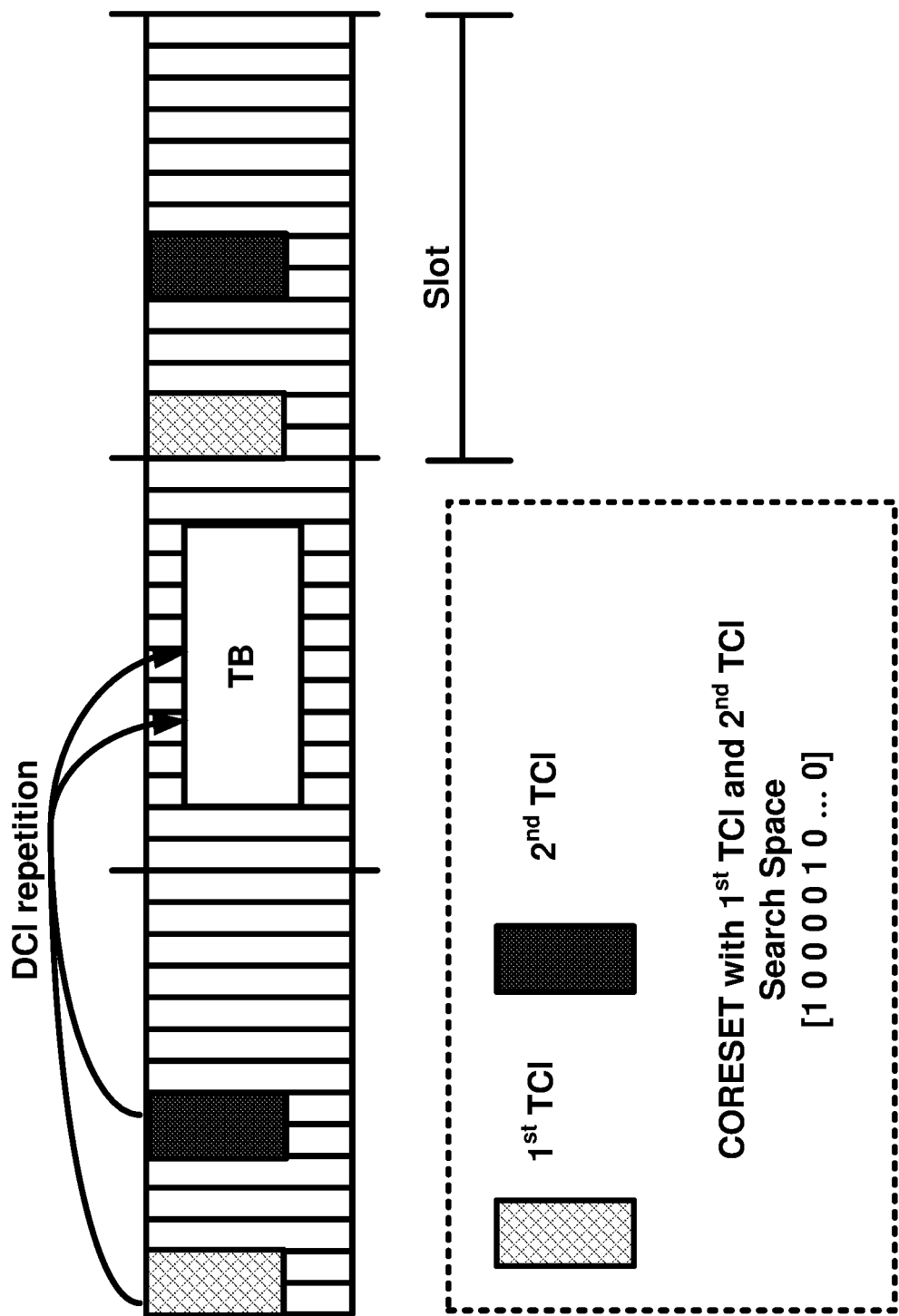
FIG. 22 illustrates an example of a coreset being associated with a plurality of TCI states as active TCI states as per an aspect of an embodiment of the present disclosure.

In an example, a base station may associate a plurality of TCI states with a coreset as active TCI states. FIG. 22 illustrates an example of a coreset being associated with a plurality of TCI states as active TCI states as per an aspect of an embodiment of the present disclosure. In the example, the base station may indicate a plurality of monitoring occasions within a slot or in a monitoring periodicity for a control channel repetition. A wireless device may monitor a first monitoring occasion based on a first TCI state of the plurality of TCI states. The wireless device may monitor a second monitoring occasion based on a second TCI state of the plurality of TCI states. The base station may indicate a pattern to switch between the plurality of TCI states. For example, configuration parameters of a search space associated with the coreset may comprise/indicate enabling a control channel repetition. The configuration parameters may comprise/indicate enabling a TCI switching or enabling the control channel repetition via a plurality of TCI states. The configuration parameters may comprise/indicate a switching pattern. For example, the switching pattern may be an alternating between a first TCI state of the plurality of TCI states and a second TCI state of the plurality of TCI states in each monitoring occasion of one or more monitoring occasions within a monitoring periodicity or a slot or within a few slots (e.g., between a monitoring periodicity configured by monitoringSlotPeriodicityAndOffset parameter of the search space). For example, the switching pattern may be a half-half between the first TCI state and the second TCI state. For example, a number of the one or more monitoring occasions is K. The wireless device may monitor first floor (K/2) monitoring occasion(s) based on the first TCI state. The wireless device may monitor remaining monitoring occasion(s) based on the second TCI state within the monitoring periodicity. For example, the switching pattern may be a bitmap to indicate a TCI state in each monitoring occasion of the one or more monitoring occasions.

Figure 23:
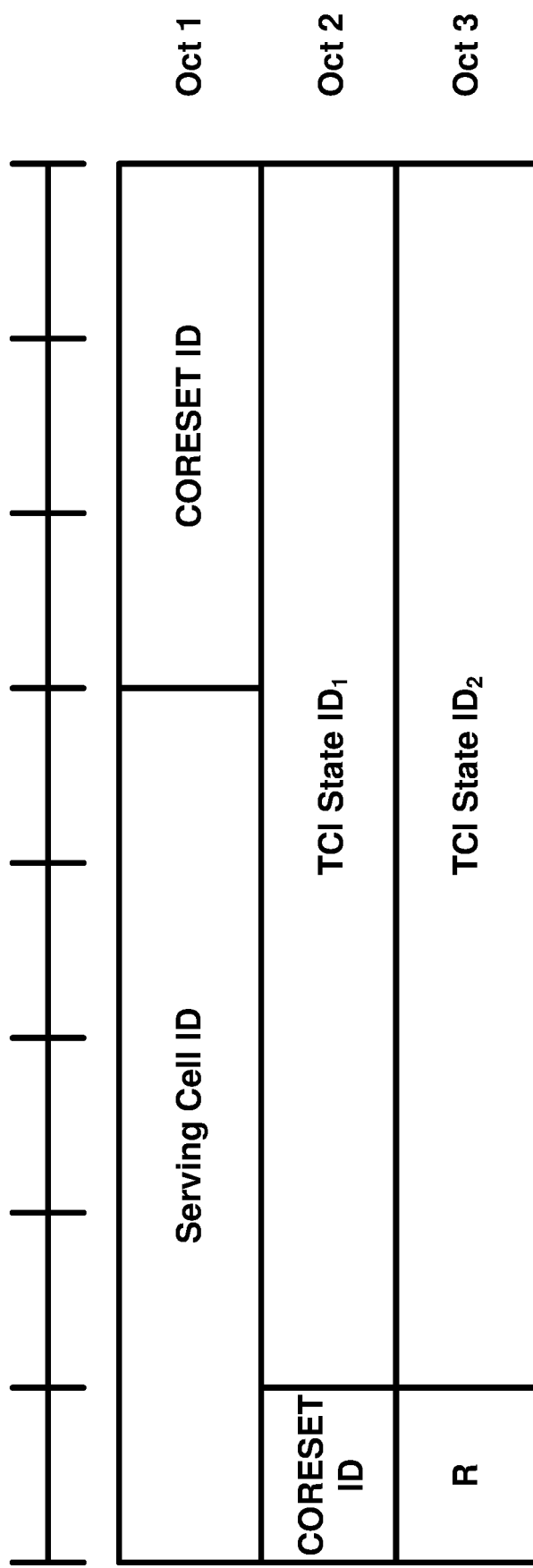
FIG. 23 illustrates an example of a MAC CE format activating a plurality of TCI states for a coreset as per an aspect of an embodiment of the present disclosure.

FIG. 23 illustrates an example of a MAC CE format (e.g., TCI State Indication for UE-specific PDCCH MAC CE, Enhanced TCI State Indication for UE-specific PDCCH MAC CE) indicating/activating/updating/selecting one or more TCI states (e.g., TCI state 1 and TCI state 2) for a coreset of a serving cell. The base station may indicate, in the MAC CE format, one or more TCI state indexes (e.g., TCI state ID 1 and TCI state ID 2) to activate the one or more TCI states for the coreset (indicated by a coreset ID). The one or more TCI state indexes may indicate/identify the one or more TCI states. Each TCI state index of the one or more TCI state indexes may indicate/identify a respective TCI state of the one or more TCI states. The MAC CE format may comprise one or more fields. A first field of the one or more fields may indicate/comprise a serving cell index (e.g., Serving Cell ID provided by a higher layer parameter ServCellIndex or indicated by one or more configuration parameters) of/identifying/indicating the serving cell. A second field of the one or more fields may indicate/comprise a coreset index (e.g., Coreset ID) of/identifying/indicating the coreset of the serving cell. A third field of the one or more fields may indicate/comprise a first TCI state index (e.g., TCI state ID 1) of/identifying/indicating a first TCI state. The one or more TCI states may comprise the first TCI state. A fourth field (e.g., R) of the one or more fields may be a reserved field. A fifth field of the one or more fields may indicate/comprise a second TCI state index (e.g., TCI state ID 2) of/identifying/indicating a second TCI state. In an example, the one or more fields of the MAC CE format may comprise the second TCI state index based on a value of the fourth field (e.g., R). For example, when the value of the fourth field is equal to zero, the MAC CE format may not comprise the second TCI state index (e.g., the fifth field may be a reserved field). When the value of the fourth field is equal to one, the MAC CE format may comprise the second TCI state index. The one or more TCI states may comprise the second TCI state. The MAC CE format may be an activation command. The configuration parameters may indicate the first TCI state index for the first TCI state. The configuration parameters may indicate the second TCI state index for the second TCI state. The configuration parameters may indicate the coreset index for the coreset. The configuration parameters may indicate the serving cell index for the serving cell. The configuration parameters may indicate the one or more TCI state indexes for the one or more TCI states. The one or more TCI states may comprise the first TCI state and the second TCI state. The one or more TCI state indexes may comprise the first TCI state index and the second TCI state index.

Figure 24:
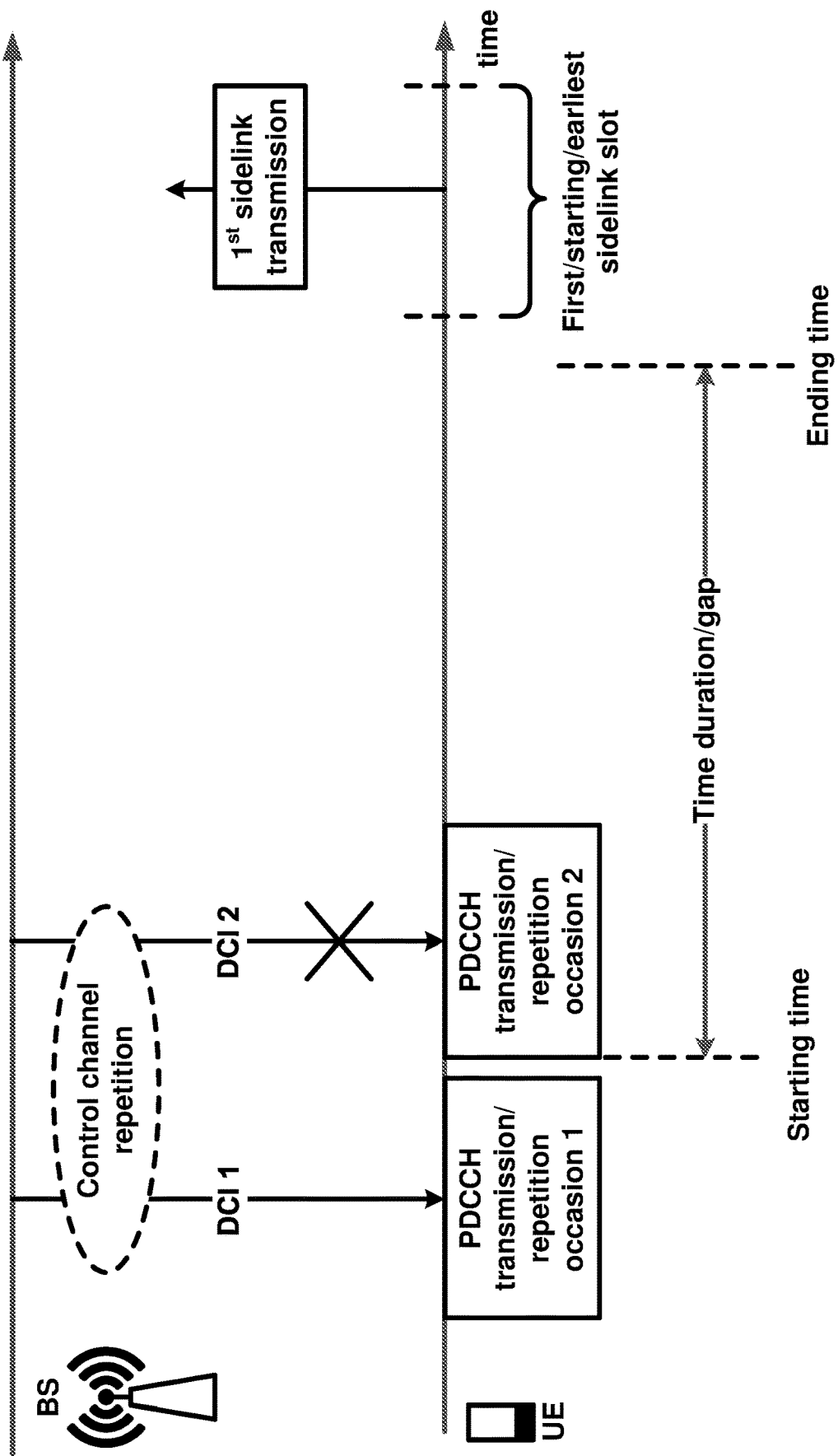
FIG. 24 is an example of control channel repetition as per an aspect of an embodiment of the present disclosure.
Figure 25:
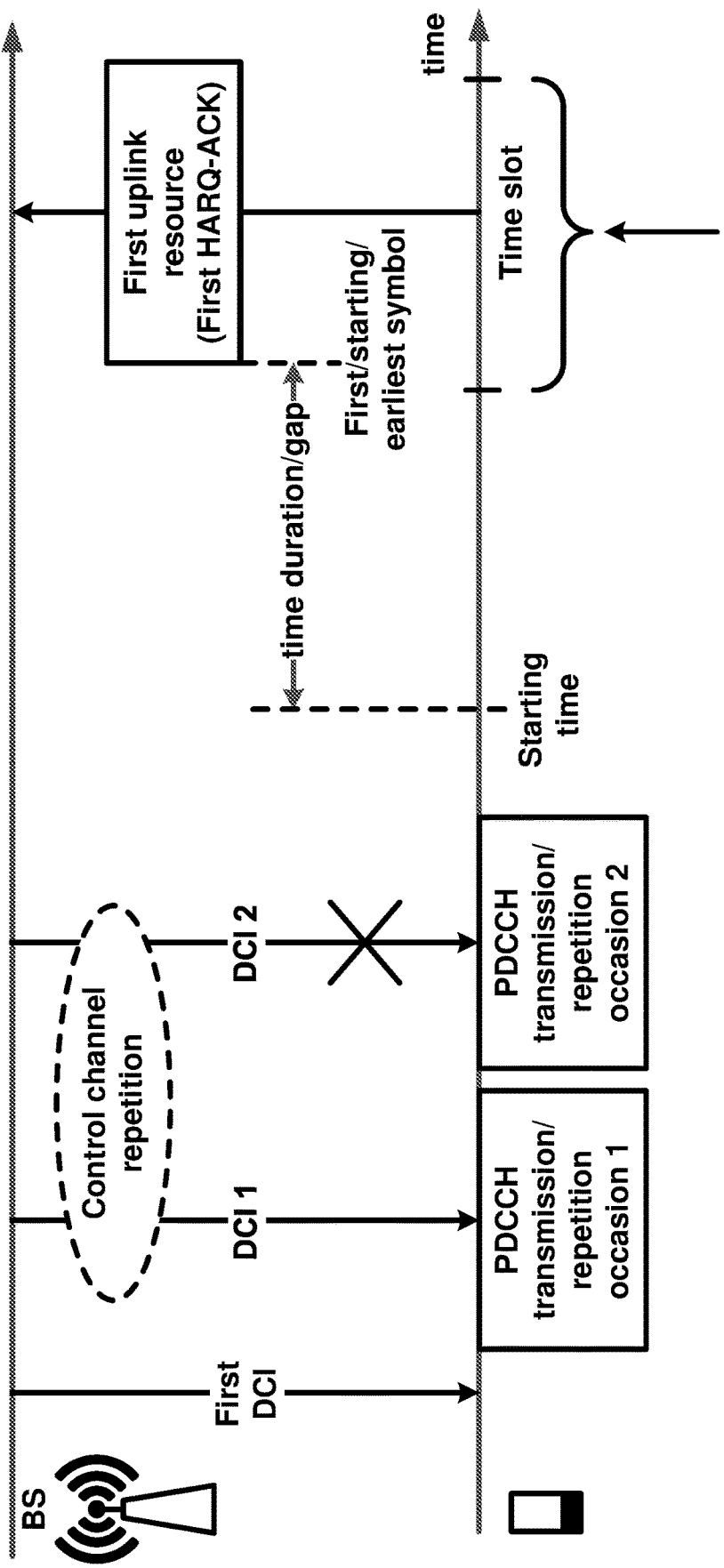
FIG. 25 is an example of control channel repetition as per an aspect of an embodiment of the present disclosure.
Figure 26:
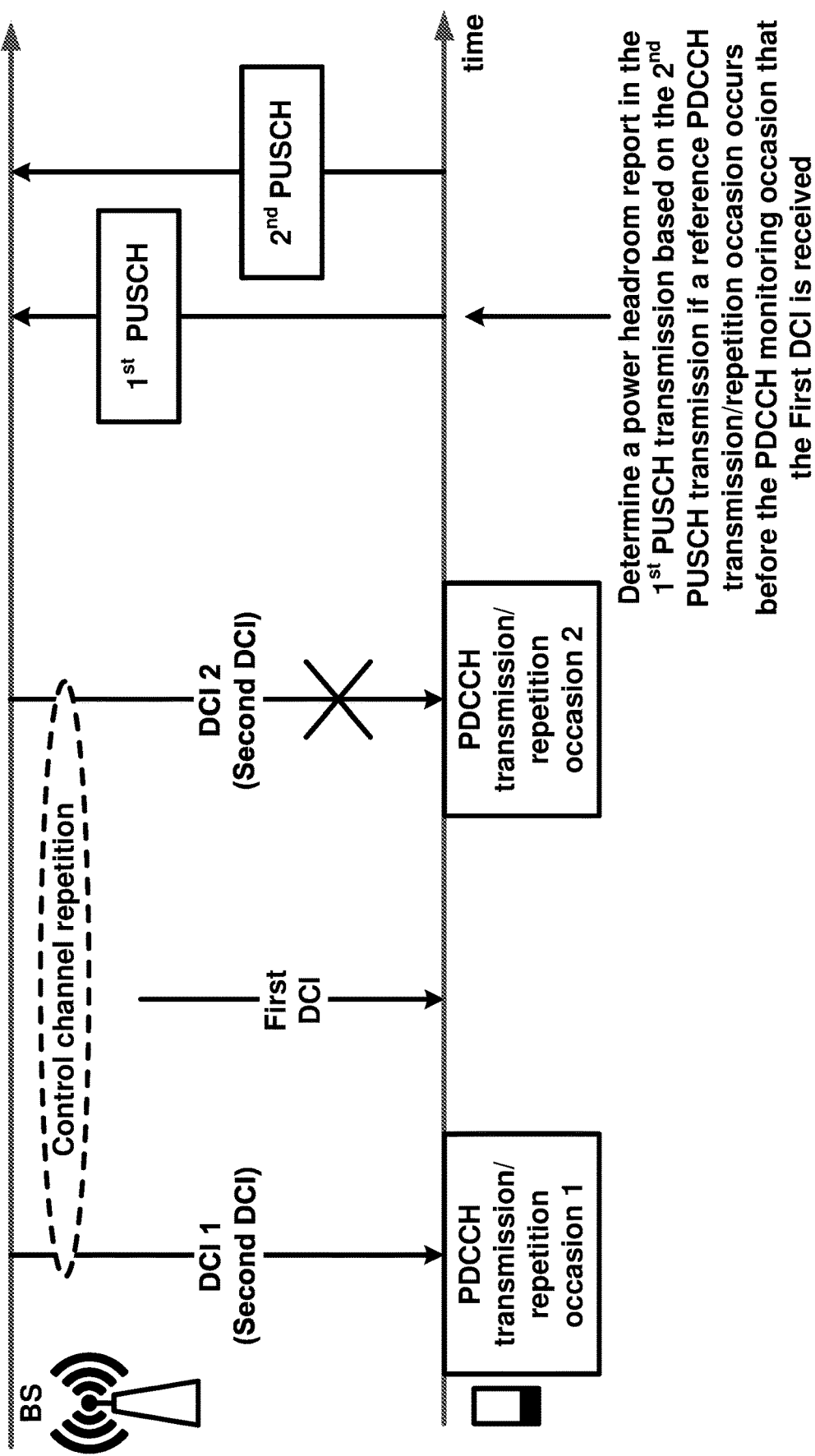
FIG. 26 is an example of control channel repetition as per an aspect of an embodiment of the present disclosure.

FIG. 24, FIG. 25, and FIG. 26 are examples of control channel repetition as per an aspect of an embodiment of the present disclosure.

In an example, a wireless device may receive one or more messages. In an example, the wireless device may receive the one or more messages from a base station. The one or more messages may comprise one or more configuration parameters. In an example, the one or more configuration parameters may be RRC configuration parameter(s). In an example, the one or more configuration parameters may be RRC reconfiguration parameter(s).

In an example, the one or more configuration parameters may be for a cell. In an example, at least one configuration parameter of the one or more configuration parameters may be for a cell. In an example, the cell may be a primary cell (PCell). In an example, the cell may be a secondary cell (SCell). The cell may be a secondary cell configured with PUCCH (e.g., PUCCH SCell). In an example, the cell may be an unlicensed cell, e.g., operating in an unlicensed band. In an example, the cell may be a licensed cell, e.g., operating in a licensed band. In an example, the cell may operate in a first frequency range (FR1). The FR1 may, for example, comprise frequency bands below 6 GHz. In an example, the cell may operate in a second frequency range (FR2). The FR2 may, for example, comprise frequency bands from 24 GHz to 52.6 GHz.

In an example, the wireless device may perform uplink transmissions (e.g., PUSCH, PUCCH, SRS) via the cell in a first time and in a first frequency. The wireless device may perform downlink receptions (e.g., PDCCH, PDSCH) via the cell in a second time and in a second frequency. In an example, the cell may operate in a time-division duplex (TDD) mode. In the TDD mode, the first frequency and the second frequency may be the same. In the TDD mode, the first time and the second time may be different. In an example, the cell may operate in a frequency-division duplex (FDD) mode. In the FDD mode, the first frequency and the second frequency may be different. In the FDD mode, the first time and the second time may be the same.

In an example, the wireless device may be in an RRC connected mode.

In an example, the wireless device may be in an RRC idle mode.

In an example, the wireless device may be in an RRC inactive mode.

In an example, the cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

In an example, a BWP of the plurality of BWPs may be in one of an active state and an inactive state. In an example, in the active state of a downlink BWP of the one or more downlink BWPs, the wireless device may monitor a downlink channel/signal (e.g., PDCCH, DCI, CSI-RS, PDSCH) on/for/via the downlink BWP. In an example, in the active state of a downlink BWP of the one or more downlink BWPs, the wireless device may receive a PDSCH on/via/for the downlink BWP. In an example, in the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In an example, in the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

In an example, in the active state of an uplink BWP of the one or more uplink BWPs, the wireless device may transmit an uplink signal/channel (e.g., PUCCH, preamble, PUSCH, PRACH, SRS, etc) on/via the uplink BWP. In an example, in the inactive state of an uplink BWP of the one or more uplink BWPs, the wireless device may not transmit an uplink signal/channel (e.g., PUCCH, preamble, PUSCH, PRACH, SRS, etc) on/via the uplink BWP.

In an example, the wireless device may activate the downlink BWP of the one or more downlink BWPs of the cell. In an example, the activating the downlink BWP may comprise that the wireless device sets (or switches to) the downlink BWP as an active downlink BWP of the cell. In an example, the activating the downlink BWP may comprise that the wireless device sets the downlink BWP in the active state. In an example, the activating the downlink BWP may comprise switching the downlink BWP from the inactive state to the active state.

In an example, the wireless device may activate the uplink BWP of the one or more uplink BWPs of the cell. In an example, the activating the uplink BWP may comprise that the wireless device sets (or switches to) the uplink BWP as an active uplink BWP of the cell. In an example, the activating the uplink BWP may comprise that the wireless device sets the uplink BWP in the active state. In an example, the activating the uplink BWP may comprise switching the uplink BWP from the inactive state to the active state.

In an example, the one or more configuration parameters may be for the (active) downlink BWP of the cell. In an example, at least one configuration parameter of the one or more configuration parameters may be for the downlink BWP of the cell.

In an example, the one or more configuration parameters may be for the (active) uplink BWP of the cell. In an example, at least one configuration parameter of the one or more configuration parameters may be for the uplink BWP of the cell.

In an example, the one or more configuration parameters may indicate one or more coresets. The one or more configuration parameters may indicate the one or more coresets for the (active) downlink BWP of the cell. In an example, the (active) downlink BWP of the cell may comprise the one or more coresets. The one or more coresets may comprise a first coreset. The one or more coresets may comprise a second coreset.

In an example, the one or more configuration parameters may indicate one or more coreset indexes (e.g., provided by a higher layer parameter ControlResourceSetId) for the one or more coresets. In an example, each coreset of the one or more coresets may be identified/indicated by a respective coreset index of the one or more coreset indexes. In an example, the first coreset of the one or more coresets may be identified by a first coreset index of the one or more coreset indexes. The second coreset of the one or more coresets may be identified by a second coreset index of the one or more coreset indexes.

In an example, a coreset index may be a coreset identifier/indicator.

In an example, the first coreset and the second coreset may be the same. The first coreset index and the second coreset index may be the same.

In an example, the first coreset and the second coreset may be different. The first coreset index and the second coreset index may be different.

In an example, the one or more configuration parameters may indicate a plurality of search space sets, e.g., for the downlink BWP of the cell (e.g., by a higher layer parameter SearchSpace). In an example, the one or more configuration parameters may indicate a plurality of search space sets, e.g., for the cell (e.g., by a higher layer parameter SearchSpace).

In an example, the one or more configuration parameters may indicate search space set indexes/identifiers e.g., provided by a higher layer parameter searchSpaceId) for the plurality of search space sets. In an example, each search space set of the plurality of search space sets may be identified by a respective search space set index of the search space set indexes. In an example, a first search space set of the plurality of search space sets may be identified by a first search space set index of the search space set indexes. In an example, a second search space set of the plurality of search space sets may be identified by a second search space set index of the search space set indexes.

In an example, the one or more configuration parameters may indicate PDCCH monitoring periodicities (e.g., monitoringSlotPeriodicityAndOffset) for the plurality of search space sets. The one or more configuration parameters may indicate a respective PDCCH monitoring periodicity of the PDCCH monitoring periodicities (e.g., monitoringSlotPeriodicityAndOffset) for each search space set of the plurality of search space sets. The one or more configuration parameters may indicate a first PDCCH monitoring periodicity (e.g., 2 slots) of the PDCCH monitoring periodicities for a first search space set of the plurality of search space sets. The one or more configuration parameters may indicate a second PDCCH monitoring periodicity (e.g., 10 slots) of the PDCCH monitoring periodicities for a second search space set of the plurality of search space sets.

In an example, a search space set of the plurality of search space sets may be associated with (or linked to) a coreset of the one or more coresets. In an example, the one or more configuration parameters may indicate the coreset (or a coreset index of the coreset) for the search space set (e.g., provided by a higher layer parameter controlResourceSetId in the higher layer parameter SearchSpace). In an example, the association (or the linkage) may be one-to-one. The association being one-to-one may comprise the search space set associated with (or linked to) the coreset not being associated (or linked to) a second coreset that is different from the coreset. The one or more coresets may comprise the second coreset.

In an example, based on the search space set being associated with (or linked to) the coreset, the wireless device may monitor PDCCH candidates, for a downlink control signal/channel (e.g., DCI, PDCCH, RS, GC-PDCCH, DMRS, etc), in PDCCH monitoring occasion(s) for the search space set associated with (or linked to) the coreset. In an example, based on the search space set being associated with (or linked to) the coreset, the wireless device may monitor, for a DCI, PDCCH candidates in PDCCH monitoring occasion(s) for the search space set in the coreset associated with (or linked to) the search space set. In an example, based on the search space set being associated with (or linked to) the coreset, the wireless device may monitor, for a DCI, a PDCCH for the search space set in the coreset associated with (or linked to) the search space set.

The wireless device may monitor, for DCI, downlink control channels in the coreset. The monitoring, for the DCI, the downlink control channels in the coreset may comprise monitoring, for the DCI, one or more PDCCH candidates in one or more PDCCH monitoring occasions for/of one or more search space sets associated with the coreset. The plurality of search space sets may comprise the one or more search space sets. The wireless device may determine the one or more PDCCH monitoring occasions of the one or more search space sets based on one or more search space set configuration parameters (e.g., IE SearchSpace) of the one or more configuration parameters. The one or more search space set configuration parameters may indicate one or more PDCCH monitoring periodicities (e.g., monitoringSlotPeriodicityAndOffset) for the one or more search space sets. The one or more search space set configuration parameters may indicate PDCCH monitoring symbols (e.g., monitoringSymbolsWithinSlot) for the one or more search space sets.

In an example, the one or more configuration parameters may indicate the one or more coreset indexes for the plurality of search space sets (e.g., provided by a higher layer parameter controlResourceSetId in the higher layer parameter SearchSpace). In an example, each search space set of the plurality of search space sets may be associated with (or linked to) a respective coreset, of the one or more coresets, identified by a respective coreset index of the one or more coreset indexes. In an example, the one or more configuration parameters may indicate the first coreset index of the first coreset for the first search space set. The one or more configuration parameters may indicate the first coreset index of the first coreset in a first coreset index field (e.g., provided by a higher layer parameter controlResourceSetId in the higher layer parameter SearchSpace) of the first search space set. Based on the one or more configuration parameters indicating the first coreset index of the first coreset for the first search space set, the first search space set may be associated with (or linked to) the first coreset. In an example, the one or more configuration parameters may indicate the first coreset index of the first coreset for the second search space set. The one or more configuration parameters may indicate the first coreset index of the first coreset in a second coreset index field (e.g., provided by a higher layer parameter controlResourceSetId in the higher layer parameter SearchSpace) of the second search space set. Based on the one or more configuration parameters indicating the first coreset index of the first coreset for the second search space set, the second search space set may be associated with (or linked to) the first coreset. In an example, the one or more configuration parameters may indicate the second coreset index of the second coreset for the first search space set. Based on the one or more configuration parameters indicating the second coreset index of the second coreset for the first search space set, the first search space set may be associated with (or linked to) the second coreset. In an example, the one or more configuration parameters may indicate the second coreset index of the second coreset for the second search space set. Based on the one or more configuration parameters indicating the second coreset index of the second coreset for the second search space set, the second search space set may be associated with (or linked to) the second coreset.

In an example, one or more first search space sets of the plurality of search space sets may be associated with (or linked to) the first coreset. The one or more configuration parameters may indicate the first coreset (or the first coreset index of the first coreset) for the one or more first search space sets. The one or more configuration parameters may indicate, for the first coreset, the one or more first search space sets. One or more second search space sets of the plurality of search space sets may be associated with (or linked to) the second coreset. The one or more configuration parameters may indicate the second coreset (or the second coreset index of the second coreset) for the one or more second search space sets. The one or more configuration parameters may indicate, for the second coreset, the one or more second search space sets.

The wireless device may monitor, for DCI, one or more PDCCH candidates in one or more first PDCCH monitoring occasions for/of the one or more first search space sets associated with the first coreset.

The wireless device may monitor, for DCI, one or more PDCCH candidates in one or more second PDCCH monitoring occasions for/of the one or more second search space sets associated with the second coreset.

The one or more configuration parameters may indicate a control channel repetition (e.g., PDCCH repetition/aggregation). The one or more configuration parameters may comprise a control channel repetition enabling parameter that enables (or activates or indicates) the control channel repetition. The control channel repetition may comprise a repetition of downlink control signal/channels (e.g., PDCCH, DCI).

In an example, the one or more configuration parameters may indicate a number of repetitions for the control channel repetition.

In an example, the one or more configuration parameters may indicate the number of repetitions of the control channel repetition for the one or more coresets. The one or more configuration parameters may indicate the number of repetitions of the control channel repetition for each coreset of the one or more coresets. In an example, the one or more configuration parameters may indicate the number of repetitions of the control channel repetition for the plurality of search space sets of the one or more coresets. The one or more configuration parameters may indicate the number of repetitions of the control channel repetition for respective search space sets of each coreset of the one or more coresets. In an example, the one or more configuration parameters may indicate the number of repetitions of the control channel repetition for at least one search space set of the plurality of search space sets.

In an example, the one or more configuration parameters may indicate the one or more coresets for the control channel repetition. The one or more configuration parameters may link/map/associate the one or more coresets for the control channel repetition.

In an example, the wireless device may receive a DCI indicating a number of repetitions for the control channel repetition. The DCI may comprise a field (e.g., DCI subframe/slot repetition number field) indicating the number of repetitions.

In an example, the number of repetitions, for example, may be a number of repetitions of a downlink control signal/channel (e.g., PDCCH, DCI). The base station may transmit a plurality of DCIs/PDCCHs (e.g., DCI 1 and DCI 2 in FIG. 24-FIG. 26) for the repetition of the downlink control signal/channel. The wireless device may monitor, for the plurality of DCIs/PDCCHs (or for the repetition of the downlink control signal/channel), PDCCH candidates. A number of the plurality of DCIs/PDCCHs may be equal to the number of repetitions (e.g., the number of repetitions is equal to 2 in FIG. 24-FIG. 26). The plurality of DCIs/PDCCHs may comprise a first downlink control signal/channel (e.g., DCI 1 in FIG. 24-FIG. 26) and a second downlink control signal/channel (e.g., DCI 2 in FIG. 24-FIG. 26).

In an example, the wireless device may be served by (e.g., receive from or transmit to) a plurality of TRPs (e.g., TRP 1 and TRP 2). Each downlink control signal/channel of the plurality of DCIs/PDCCHs may be transmitted by a respective TRP of the plurality of TRPs. For example, in FIG. 24-FIG. 26, a first TRP (e.g., TRP 1) of the plurality of TRPs may transmit DCI 1 and a second TRP (e.g., TRP 2) of the plurality of TRPs may transmit DCI 2.

In an example, each downlink control signal/channel of the plurality of DCIs/PDCCHs may be the same (or may have the same content, e.g., same DCI fields, the same DCI size, the same payload, same value for the DCI fields, etc). Each downlink control signal/channel of the plurality of DCIs/PDCCHs may be the same as the downlink control signal/channel. Each downlink control signal/channel of the plurality of DCIs/PDCCHs may be a repetition of the downlink control signal/channel. The base station may repeat the downlink control signal/channel by transmitting the plurality of DCIs/PDCCHs. For example, in FIG. 24-FIG. 26, DCI 1 and DCI 2 may be the same (or equal). The contents of the DCI 1 and DCI 2 may be the same. The payload of the DCI 1 and DCI 2 may be the same. The DCI fields (or the values of the DCI fields) of the DCI 1 and DCI 2 may be the same.

In an example, the first downlink control signal/channel and the second downlink control signal/channel may be the same (e.g., same content, same DCI fields, the same DCI size, the same payload, same value for the DCI fields, etc). In an example, the first downlink control signal/channel and the second downlink control signal/channel may be same as the downlink control signal/channel. The first downlink control signal/channel may be the downlink control signal/channel. The second downlink control signal/channel may be the downlink control signal/channel. The first downlink control signal/channel and the second downlink control signal/channel may be repetitions of the downlink control signal/channel.

The base station may transmit, for the repetition of the downlink control signal/channel, the plurality of DCIs/PDCCHs via/in the one or more coresets. The base station may transmit each downlink control signal/channel of the plurality of DCIs/PDCCHs via a respective coreset of the one or more coresets. The transmitting, for the repetition of the downlink control signal/channel, the plurality of DCIs/PDCCHs via/in the one or more coresets may comprise transmitting the downlink control signal/channel via/in the one or more coresets. The transmitting, for the repetition of the downlink control signal/channel, the plurality of DCIs/PDCCHs via/in the one or more coresets may comprise repeating transmission of the downlink control signal/channel via/in the one or more coresets. The base station may transmit, for the repetition of the downlink control signal/channel, the plurality of DCIs/PDCCHs via/in the plurality of search space sets associated with the one or more coresets. The base station may transmit, for the repetition of the downlink control signal/channel, each downlink control signal/channel of the plurality of DCIs/PDCCHs via/in a respective search space set of the plurality of search space sets. For example, in FIG. 24-FIG. 26, the base station transmits the first downlink control signal/channel via the first coreset. The base station may transmit the first downlink control signal/channel via the one or more first search space sets associated with the first coreset. The base station transmits the second downlink control signal/channel via the second coreset. The base station may transmit the second downlink control signal/channel via the one or more second search space sets associated with the second coreset.

The wireless device may monitor, for the plurality of DCIs/PDCCHs, the one or more coresets for the repetition of the downlink control signal/channel. The wireless device may monitor, for each downlink control signal/channel of the plurality of DCIs/PDCCHs, a respective coreset of the one or more coresets. The monitoring, for the plurality of DCIs/PDCCHs, the one or more coresets for the repetition of the downlink control signal/channel may comprise monitoring the one or more coresets for the downlink control signal/channel. The monitoring, for the plurality of DCIs/PDCCHs, the one or more coresets for the repetition of the downlink control signal/channel may comprise monitoring the one or more coresets for repetition of the downlink control signal/channel. The wireless device may monitor, for the plurality of DCIs/PDCCHs, the plurality of search space sets associated with the one or more coresets for the repetition of the downlink control signal/channel. The wireless device may monitor, for each downlink control signal/ channel of the plurality of DCIs/PDCCHs, a respective search space set of the plurality of search space sets for the repetition of the downlink control signal/channel. For example, in FIG. 24-FIG. 26, the wireless device may monitor, for the first downlink control signal/channel, the first coreset. The wireless device may monitor, for the first downlink control signal/channel, the one or more first search space sets associated with the first coreset. The wireless device may monitor, for the second downlink control signal/channel, the second coreset. The wireless device may monitor, for the second downlink control signal/channel, the one or more second search space sets associated with the second coreset.

In an example, the wireless device may determine a plurality of downlink control signal/channel transmission/repetition occasions (e.g., PDCCH transmission/repetition/monitoring occasions) for the control channel repetition. The wireless device may determine the plurality of downlink control signal/channel transmission/repetition occasions (or a plurality of PDCCH monitoring occasions or a plurality of time slots) for the repetition of the downlink control signal/channel. The base station may transmit, via the one or more coresets, the plurality of DCIs/PDCCHs across/over/on/in the plurality of downlink control signal/channel transmission/repetition occasions (e.g., PDCCH transmission/repetition occasion 1 and PDCCH transmission/repetition occasion 2 in FIG. 24-FIG. 26). The base station may transmit, via the one or more coresets, the downlink control signal/channel across/over/on/in the plurality of downlink control signal/channel transmission/repetition occasions. The base station may transmit, via each coreset of the one or more coresets, the downlink control signal/channel across/over/on/in respective downlink control signal/channel transmission/repetition occasion(s) of the plurality of downlink control signal/channel transmission/repetition occasions. The base station may repeat transmission of the downlink control signal/channel across/over/on/in the plurality of downlink control signal/channel transmission/repetition occasions. For example, in FIG. 24-FIG. 26, the plurality of downlink control signal/channel transmission/repetition occasions comprise a first downlink control signal/channel transmission/repetition occasion (e.g., PDCCH transmission/repetition occasion 1) and a second downlink control signal/channel transmission/repetition occasion (e.g., PDCCH transmission/repetition occasion 2). The base station may transmit, via the first coreset, the first downlink control signal/channel in the first downlink control signal/channel transmission/repetition occasion. The base station may transmit, via the second coreset, the second downlink control signal/channel in the second downlink control signal/channel transmission/repetition occasion.

The wireless device may monitor, for the plurality of DCIs/PDCCHs, the one or more coresets across/over/on/in the plurality of downlink control signal/channel transmission/repetition occasions. The wireless device may monitor, for the downlink control signal/channel, the one or more coresets across/over/on/in the plurality of downlink control signal/channel transmission/repetition occasions. The wireless device may monitor, for the downlink control signal/channel, each coreset of the one or more coresets across/over/on/in respective downlink control signal/channel transmission/repetition occasion(s) of the plurality of downlink control signal/channel transmission/repetition occasions. The wireless device may monitor, for repetition of the downlink control signal/channel, the one or more coresets across/over/on/in the plurality of downlink control signal/channel transmission/repetition occasions. For example, in FIG. 24-FIG. 26, the wireless device monitors, for the first downlink control signal/channel, the first coreset in the first downlink control signal/channel transmission/repetition occasion. The wireless device monitors, for the second downlink control signal/channel, the second coreset in the second downlink control signal/channel transmission/repetition occasion.

The wireless device may monitor the one or more coresets across/over/on/in the plurality of downlink control signal/channel transmission/repetition occasions. The wireless device may monitor each coreset of the one or more coresets across/over/on/in respective downlink control signal/channel transmission/repetition occasion(s) of the plurality of downlink control signal/channel transmission/repetition occasions. For example, the wireless device may monitor, for the downlink control signal/channel, the first coreset across/over/on/in one or more first downlink control signal/channel transmission/repetition occasions of the plurality of downlink control signal/channel transmission/repetition occasions. The wireless device may monitor, for the downlink control signal/channel, the second coreset across/over/on/in one or more second downlink control signal/channel transmission/repetition occasions of the plurality of downlink control signal/channel transmission/repetition occasions. The one or more first downlink control signal/channel transmission/repetition occasions may comprise the first downlink control signal/channel transmission/repetition occasion. The one or more second downlink control signal/channel transmission/repetition occasions may comprise the second downlink control signal/channel transmission/repetition occasion.

The base station may transmit, via each coreset of the one or more coresets, the downlink control signal/channel across/over/on/in respective downlink control signal/channel transmission/repetition occasion(s) of the plurality of downlink control signal/channel transmission/repetition occasions. For example, the base station may transmit, via the first coreset, the downlink control signal/channel across/over/on/in the one or more first downlink control signal/channel transmission/repetition occasions. The base station may transmit, via the second coreset, the downlink control signal/channel across/over/on/in the one or more second downlink control signal/channel transmission/repetition occasions.

In an example, the repetition of the downlink control signal/channel (or transmission of the plurality of DCIs/PDCCHs) may, for example, be/occur in time units (e.g. TDM-ed). The time units, for example, may be consecutive. The time units, for example, may not be consecutive. A number of the time units may be equal to the number of repetitions. The time units, for example, may be time slots. The time units may, for example, be mini-slots. The time units may, for example, be time symbols (e.g., OFDM symbols). The time units may, for example, be sub-frames. The time units, for example, may be monitoring occasions (e.g., PDCCH monitoring occasions) in time. A number of the plurality of downlink control signal/channel transmission occasions may be equal to the number of repetitions. The plurality of downlink control signal/channel transmission occasions may be/occur in the time units. For example, a first downlink control signal/channel transmission occasion of the plurality of downlink control signal/channel transmission occasions may be/occur in a first time unit of the time units. A second downlink control signal/channel transmission occasion of the plurality of downlink control signal/channel transmission occasions may be/occur in a second time unit of the time units, and so on.

In an example, the repetition of the downlink control signal/channel (or transmission of the plurality of DCIs/PDCCHs) may, for example, be/occur in frequency units (FDM-ed). A number of the frequency units may be equal to the number of repetitions. The frequency units, for example, may be frequency bands. The frequency units, for example, may be physical resource blocks (PRBs). The frequency units may, for example, be resource-element groups (REGs). The frequency units may, for example, be REG bundles. The frequency units may, for example, be control elements (CEs). The frequency units may, for example, be BWPs. The frequency units may, for example, be cells. A number of the plurality of downlink control signal/channel transmission occasions may be equal to the number of repetitions. The plurality of downlink control signal/channel transmission occasions may be/occur in the frequency units. For example, a first downlink control signal/channel transmission occasion of the plurality of downlink control signal/channel transmission occasions may be/occur in a first frequency unit of the frequency units. A second downlink control signal/channel transmission occasion of the plurality of downlink control signal/channel transmission occasions may be/occur in a second frequency unit of the frequency units, and so on.

The base station may transmit the plurality of DCIs/PDCCHs across/over/in the time units. The base station may transmit the plurality of DCIs/PDCCHs across/over/in the frequency units. The base station may repeat transmission of the downlink control signal/channel across/over/in the plurality of uplink signal/channel transmission occasions. The base station may transmit the downlink control signal/channel with the number of repetitions. For example, in FIG. 24-FIG. 26, the plurality of downlink control signal/channel transmission occasions comprises a first downlink control signal/channel transmission occasion (1st TX occasion) and a second downlink control signal/channel transmission occasion (2nd TX occasion). The first downlink control signal/channel transmission occasion may be/occur in a first time unit of the time units (e.g., 1st time slot, 1st symbol, 1st subframe, 1st PDCCH monitoring occasion). The second downlink control signal/channel transmission occasion may be/occur in a second time unit of the time units (e.g., 2nd time slot, 2nd symbol, 2nd subframe, 2nd PDCCH monitoring occasion). The first downlink control signal/channel transmission occasion may be/occur in a first frequency unit of the frequency units (e.g., 1st PRB, 1st cell, 1st frequency, 1st BWP, 1st subband, $1^{st}$ REG bundle, $1^{st}$ CE). The second downlink control signal/channel transmission occasion may be/occur in a second frequency unit of the frequency units (e.g., 2nd PRB, 2nd cell, 2nd frequency, 2nd BWP, 2nd subband, $2^{nd}$ REG bundle, $2^{nd}$ CE).

In an example, the one or more configuration parameters may indicate a repetition scheme (e.g., by a higher layer parameter RepetitionSchemeConfig, FDM-Scheme, TDM-Scheme, SDM-Scheme, CDM-Scheme) for the control channel repetition.

The repetition scheme, for example, may be a time domain repetition scheme. The repetition scheme, for example, may be a frequency domain repetition scheme. The repetition scheme, for example, may be a spatial/code domain repetition scheme.

In an example, the wireless device may monitor, for the plurality of DCIs/PDCCHs, the one or more coresets across/over/in the plurality of downlink control signal/channel transmission occasions based on the one or more configuration parameters indicating the repetition scheme.

In an example, the repetition scheme may be a time domain repetition scheme (e.g., TDM scheme, intra-slot repetition, inter-slot repetition, TDMSchemeA, TDMSchemeB, etc). In the time domain repetition scheme, the plurality of downlink control signal/channel transmission occasions (e.g., 1st TX occasion and 2nd TX occasion) may not overlap in time. In the time domain repetition scheme, the plurality of downlink control signal/channel transmission occasions may or may not overlap in frequency. Each downlink control signal/channel transmission occasion of the plurality of downlink control signal/channel transmission occasions may have a non-overlapping time domain resource allocation with respect to other signal/channel transmission occasion(s) of the plurality of downlink control signal/channel transmission occasions. For example, a first downlink control signal/channel transmission occasion of the plurality of downlink control signal/channel transmission occasions may not overlap, in time, with a second downlink control signal/channel transmission occasion of the plurality of downlink control signal/channel transmission occasions. The first downlink control signal/channel transmission occasion and the second downlink control signal/channel transmission occasion may be different. For example, in the time domain repetition scheme, the first downlink control signal/channel transmission occasion (1st TX occasion) and the second downlink control signal/channel transmission occasion (2nd TX occasion) may not overlap in time. The plurality of downlink control signal/channel transmission occasions may occur in different time units. For example, the first time unit and the second time unit may not overlap in time. The first time unit and the second time unit may be different.

In an example, the repetition scheme may be a frequency domain repetition scheme (e.g., FDM scheme, FDMSchemeA, FDMSchemeB, etc). In the frequency domain repetition scheme, the plurality of downlink control signal/channel transmission occasions may or may not overlap in time. In the frequency domain repetition scheme, the plurality of downlink control signal/channel transmission occasions may not overlap in frequency. Each downlink control signal/channel transmission occasion of the plurality of downlink control signal/channel transmission occasions may have a non-overlapping frequency domain resource allocation with respect to other signal/channel transmission occasion(s) of the plurality of downlink control signal/channel transmission occasions. For example, a first downlink control signal/channel transmission occasion of the plurality of downlink control signal/channel transmission occasions may not overlap, in frequency, with a second downlink control signal/channel transmission occasion of the plurality of downlink control signal/channel transmission occasions. The first downlink control signal/channel transmission occasion and the second downlink control signal/channel transmission occasion may be different. For example, in the frequency domain repetition scheme, the first downlink control signal/channel transmission occasion (1st TX occasion) and the second downlink control signal/channel transmission occasion (2nd TX occasion) may not overlap in frequency. The first downlink control signal/channel transmission occasion (1st TX occasion) and the second downlink control signal/channel transmission occasion (2nd TX occasion) may overlap in time. The plurality of downlink control signal/channel transmission occasions may occur in different frequency units (e.g., frequencies, REGs, CEs, PRBs, frequency bands, bandwidth parts, cells). For example, a first frequency unit of the first downlink control signal/channel transmission occasion and a second frequency unit of the second downlink control signal/channel transmission occasion may not overlap in frequency. The first frequency unit and the second frequency unit may be different.

In an example, the repetition scheme may be a spatial/code domain repetition scheme (e.g., SFN scheme, SDM scheme, CDM scheme, SDMScheme, CDMScheme, etc). In the spatial/code domain repetition scheme, the plurality of downlink control signal/channel transmission occasions may overlap in time. In the spatial/code domain repetition scheme, the plurality of downlink control signal/channel transmission occasions may overlap in frequency. In the spatial/code domain repetition scheme, the plurality of downlink control signal/channel transmission occasions may be a single downlink control signal/channel transmission occasion. Each downlink control signal/channel transmission occasion of the plurality of downlink control signal/channel transmission occasions may have an overlapping frequency domain resource allocation with respect to other downlink control signal/channel transmission occasion(s) of the plurality of downlink control signal/channel transmission occasions. Each downlink control signal/channel transmission occasion of the plurality of downlink control signal/channel transmission occasions may have an overlapping time domain resource allocation with respect to other downlink control signal/channel transmission occasion(s) of the plurality of downlink control signal/channel transmission occasions. Each downlink control signal/channel transmission occasion of the plurality of downlink control signal/channel transmission occasions may be the same. For example, a first downlink control signal/channel transmission occasion of the plurality of downlink control signal/channel transmission occasions may overlap, in time and frequency, with a second downlink control signal/channel transmission occasion of the plurality of downlink control signal/channel transmission occasions. The first downlink control signal/channel transmission occasion and the second downlink control signal/channel transmission occasion may be the same. For example, in the spatial/code domain repetition scheme, the first downlink control signal/channel transmission occasion (1st TX occasion) and the second downlink control signal/channel transmission occasion (2nd TX occasion) may overlap in frequency. The first downlink control signal/channel transmission occasion (1st TX occasion) and the second downlink control signal/channel transmission occasion (2nd TX occasion) may overlap in time. The plurality of downlink control signal/channel transmission occasions may occur in same frequency units (e.g., frequencies, PRBs, frequency bands, bandwidth parts, sub-bands, cells, REGs, REG bundles, CEs). For example, a first frequency unit of the first downlink control signal/channel transmission occasion and a second frequency unit of the second downlink control signal/channel transmission occasion may overlap in frequency. The first frequency unit and the second frequency unit may be the same. The plurality of downlink control signal/channel transmission occasions may occur in the same time units (e.g., symbols, mini-slots, slots, sub-frames, PDCCH monitoring occasions etc). For example, a first time unit of the first downlink control signal/channel transmission occasion and a second time unit of the second downlink control signal/channel transmission occasion may overlap in time. The first time unit and the second time unit may be the same.

For example, in the time domain repetition scheme, a downlink control signal/channel transmission occasion of the plurality of downlink control signal/channel transmission occasions may have non-overlapping time domain resource allocation with respect to another downlink control signal/channel transmission occasion of the plurality of downlink control signal/channel transmission occasions. For example, in the frequency domain repetition scheme, a downlink control signal/channel transmission occasion of the plurality of downlink control signal/channel transmission occasions may have non-overlapping frequency domain resource allocation with respect to another downlink control signal/channel transmission occasion of the plurality of downlink control signal/channel transmission occasions. For example, in the spatial/code domain repetition scheme, a downlink control signal/channel transmission occasion of the plurality of downlink control signal/channel transmission occasions may have overlapping time and frequency domain resource allocations with respect to another downlink control signal/channel transmission occasion of the plurality of downlink control signal/channel transmission occasions.

In an example, the plurality of DCIs/PDCCHs may be associated with (or linked to) the plurality of downlink control signal/channel transmission occasions. Each downlink control signal/channel of the plurality of DCIs/PDCCHs may be associated with a respective downlink control signal/channel transmission occasion of the plurality of downlink control signal/channel transmission occasions. The base station may transmit each downlink control signal/channel of the plurality of DCIs/PDCCHs in/via a respective downlink control signal/channel transmission occasion of the plurality of downlink control signal/channel transmission occasions. The wireless device may monitor, for each downlink control signal/channel of the plurality of DCIs/PDCCHs, in/via a respective downlink control signal/channel transmission occasion of the plurality of downlink control signal/channel transmission occasions. For example, in FIG. 24-FIG. 26, the first downlink control signal/channel (e.g., DCI 1) is associated with the first downlink control signal/channel transmission/repetition occasion (e.g., PDCCH transmission/repetition occasion 1), for example based on the first downlink control signal/channel being transmitted by the base station or monitored by the wireless device in/via the first downlink control signal/channel transmission/repetition occasion. The second downlink control signal/channel (e.g., DCI 2) is associated with the second downlink control signal/channel transmission/repetition occasion (e.g., PDCCH transmission/repetition occasion 2), for example based on the second downlink control signal/channel being transmitted by the base station or monitored by the wireless device in/via the second downlink control signal/channel transmission/repetition occasion.

The wireless device may receive/detect at least one downlink control signal/channel among the plurality of DCIs/PDCCHs (or among the repetitions of the downlink control signal/channel). For example, in FIG. 24-FIG. 26, the wireless device detects/receives DCI 1. The wireless device does not receive/detect DCI 2. The at least one downlink control signal/channel is DCI 1. The wireless device receives DCI 1 in the first downlink control signal/channel transmission occasion. The wireless device does not receive/detect DCI 2 in the second downlink control signal/channel transmission occasion.

The wireless device may receive the downlink control signal/channel in at least one downlink control signal/channel transmission/repetition occasion of the plurality of downlink control signal/channel transmission/repetition occasions. The wireless device may receive each downlink control signal/channel of the at least one downlink control signal/channel in a respective downlink control signal/channel transmission/repetition occasion of the at least one downlink control signal/channel transmission/repetition occasion. For example, in FIG. 24-FIG. 26, the at least one downlink control signal/channel transmission/repetition occasion is the first downlink control signal/channel transmission occasion. In an example, each downlink control signal/channel of the at least one downlink control signal/channel and the downlink control signal/channel may be the same.

The wireless device may receive/detect the downlink control signal/channel based on the receiving/detecting the at least one downlink control signal/channel among the plurality of DCIs/PDCCHs.

In an example, the at least one downlink control signal/channel (or the downlink control signal/channel) may indicate the number of repetitions. The at least one downlink control signal/channel may comprise the DCI indicating the number of repetitions.

In an example, the wireless device may receive the at least one downlink control signal/channel (or the downlink control signal/channel) via at least one coreset of the one or more coresets. The wireless device may receive each downlink control signal/channel of the at least one downlink control signal/channel via a respective coreset of the at least one coreset. For example, in FIG. 24-FIG. 26, the at least one coreset is the first coreset.

The wireless device may determine a reference downlink control signal/channel transmission occasion among the plurality of downlink control signal/channel transmission occasions. The wireless device may determine the reference downlink control signal/channel transmission occasion, for example, based on the receiving/detecting the at least one downlink control signal/channel. The wireless device may determine the reference downlink control signal/channel transmission occasion, for example, based on the receiving/detecting the downlink control signal/channel. The wireless device may determine the reference downlink control signal/channel transmission occasion, for example, based on the one or more configuration parameters indicating the control channel repetition.

The wireless device may receive/detect the at least one downlink control signal/channel during/in/via the at least one downlink control signal/channel transmission occasion of the plurality of downlink control signal/channel transmission occasions. The at least one downlink control signal/channel transmission occasion may or may not comprise the reference downlink control signal/channel transmission occasion. In FIG. 24-FIG. 26, the at least one downlink control signal/channel transmission occasion is the first downlink control signal/channel transmission occasion. The reference downlink control signal/channel transmission occasion may be the second downlink control signal/channel transmission occasion.

In an example, the determining the reference downlink control signal/channel transmission occasion among the plurality of downlink control signal/channel transmission occasions may comprise determining a reference downlink control signal/channel among the plurality of DCIs/PDCCHs, for example based on the plurality of DCIs/PDCCHs being associated with the plurality of downlink control signal/channel transmission occasions. For example, in FIG. 24-FIG. 26, when the first downlink control signal/channel transmission/repetition occasion is the reference downlink control signal/channel transmission occasion, the first downlink control signal/channel (e.g., DCI 1) is the reference downlink control signal/channel. When the second downlink control signal/channel transmission/repetition occasion is the reference downlink control signal/channel transmission occasion, the second downlink control signal/channel (e.g., DCI 2) is the reference downlink control signal/channel.

In an example, the wireless device may determine the reference downlink control signal/channel transmission occasion based on the number of repetitions and a starting downlink control signal/channel transmission occasion (or a starting time slot) of the plurality of downlink control signal/channel transmission occasions. The one or more configuration parameters, for example, may indicate the starting downlink control signal/channel transmission occasion. The at least one downlink control signal/channel, for example, may indicate the starting downlink control signal/channel transmission occasion. For example, in FIG. 24-FIG. 26, when the starting downlink control signal/channel transmission occasion is the first downlink control signal/channel transmission occasion and the number of repetitions is equal to two, the reference downlink control signal/channel transmission occasion may be the second downlink control signal/channel transmission occasion. When the starting downlink control signal/channel transmission occasion is the first downlink control signal/channel transmission occasion and the number of repetitions is equal to three, the reference downlink control signal/channel transmission occasion may be a third downlink control signal/channel transmission occasion of the plurality of downlink control signal/channel transmission occasions. When the starting downlink control signal/channel transmission occasion is the second downlink control signal/channel transmission occasion and the number of repetitions is equal to two, the reference downlink control signal/channel transmission occasion may be the third downlink control signal/channel transmission occasion.

In an example, the reference downlink control signal/channel transmission occasion may be a last (or latest or ending) downlink control signal/channel transmission occasion among the plurality of downlink control signal/channel transmission occasions.

The wireless device monitors, for the downlink control signal/channel, the first coreset in the first downlink control signal/channel transmission occasion at a first time unit (e.g., first time slot, first time symbol, first subframe, etc). The wireless device monitors, for the downlink control signal/channel, the second coreset in the second downlink control signal/channel transmission occasion at a second time unit.

The last downlink control signal/channel transmission occasion, for example, may have the latest starting time among starting times of the plurality of downlink control signal/channel transmission occasions. The second time unit may start later in time than the first time unit. A first/starting symbol of the second time unit may occur after (or later) in time than a first/starting symbol of the second time unit. The second downlink control signal/channel transmission occasion may be the reference downlink control signal/channel transmission occasion based on the second time unit starting later in time than the first time unit.

The last downlink control signal/channel transmission occasion, for example, may have the latest ending time among ending times of the plurality of downlink control signal/channel transmission occasions. The second time unit may end later in time than the first time unit. A last symbol of the second time unit may occur after (or later) in time than a last symbol of the first time unit. The second downlink control signal/channel transmission occasion may be the reference downlink control signal/channel transmission occasion based on the second time unit ending later in time than the first time unit.

The last downlink control signal/channel transmission occasion may be associated with a last downlink control signal/channel among the plurality of DCIs/PDCCHs. The base station may transmit the last downlink control signal/channel in/via the last downlink control signal/channel transmission occasion. The wireless device may monitor, for the last downlink control signal/channel, in/via the last downlink control signal/channel transmission occasion. The last downlink control signal/channel may be the reference downlink control signal/channel. The base station may transmit a last repetition of the downlink control signal/channel in the last downlink control signal/channel transmission occasion. The wireless device may monitor, for the last repetition of the downlink control signal/channel, in the last downlink control signal/channel transmission occasion. The last repetition of the downlink control signal/channel may be the last downlink control signal/channel.

For example, in FIG. 24-FIG. 26, the last downlink control signal/channel transmission occasion is the second downlink control signal/channel transmission occasion (e.g., PDCCH transmission/repetition occasion 2). The reference downlink control signal/channel transmission occasion is the second (or the last) downlink control signal/channel transmission occasion.

In an example, the reference downlink control signal/channel transmission occasion may be the earliest (or a first or a starting) downlink control signal/channel transmission occasion among the plurality of downlink control signal/channel transmission occasions.

The earliest (or the first or the starting) downlink control signal/channel transmission occasion, for example, may have the earliest starting time among starting times of the plurality of downlink control signal/channel transmission occasions. For example, the first time unit may start earlier in time than the second time unit. A first/starting symbol of the first time unit may occur before (or earlier) in time than a first/starting symbol of the second time unit. The first downlink control signal/channel transmission occasion may be the reference downlink control signal/channel transmission occasion based on the first time unit starting earlier than the second time unit.

The earliest (or the first or the starting) downlink control signal/channel transmission occasion, for example, may have the earliest ending time among ending times of the plurality of downlink control signal/channel transmission occasions. For example, the first time unit may end earlier in time than the second time unit. A last symbol of the first time unit may occur before (or earlier) in time than a last symbol of the second time unit. The first downlink control signal/channel transmission occasion may be the reference downlink control signal/channel transmission occasion based on the first time unit ending earlier than the second time unit.

The earliest (or the first or the starting) downlink control signal/channel transmission occasion may be associated with a first/starting downlink control signal/channel among the plurality of DCIs/PDCCHs. The base station may transmit the first/starting downlink control signal/channel in/via the earliest downlink control signal/channel transmission occasion. The wireless device may monitor, for the first/starting downlink control signal/channel, in/via the earliest downlink control signal/channel transmission occasion. The first/starting downlink control signal/channel may be the reference downlink control signal/channel. The base station may transmit a first/starting repetition of the downlink control signal/channel in the earliest downlink control signal/channel transmission occasion. The wireless device may monitor, for the first/starting repetition of the downlink control signal/channel, in the earliest downlink control signal/channel transmission occasion. The first/starting repetition of the downlink control signal/channel may be the first/starting downlink control signal/channel.

For example, in FIG. 24-FIG. 26, the earliest (or the first or the starting) downlink control signal/channel transmission occasion is the first downlink control signal/channel transmission occasion (e.g., PDCCH transmission/repetition occasion 1). The reference downlink control signal/channel transmission occasion is the first (or the earliest/first/starting) downlink control signal/channel transmission occasion.

In an example, the reference downlink control signal/channel transmission occasion may be associated with a coreset of the one or more coresets. The wireless device may monitor, for the downlink control signal/channel, the coreset in the reference downlink control signal/channel transmission occasion. The wireless device may monitor, for a DCI (or the downlink control signal/channel), the coreset in the reference downlink control signal/channel transmission occasion. The one or more configuration parameters may indicate the reference downlink control signal/channel transmission occasion for the coreset. The wireless device may determine the reference downlink control signal/channel transmission occasion based on the receiving the one or more configuration parameters.

In an example, the coreset may be identified/indicated by a coreset index of the one or more coreset indexes. In an example, the coreset index may be lowest (or highest) among the one or more coreset indexes. The coreset may be identified/indicated by a coreset index that is lowest (or highest) among the one or more coreset indexes.

The wireless device may determine/select the coreset with a coreset index that is lowest (or highest) among the one or more coreset indexes of the one or more coresets. For example, the wireless device may monitor, for a DCI, the coreset in a downlink control signal/channel transmission occasion of the plurality of downlink control signal/channel transmission occasions. The downlink control signal/channel transmission occasion may be the reference downlink control signal/channel transmission occasion. For example, the wireless device may monitor, for a DCI, the coreset in one or more downlink control signal/channel transmission occasions of the plurality of downlink control signal/channel transmission occasions. A last/latest/earliest/first/starting downlink control signal/channel transmission occasion of the one or more downlink control signal/channel transmission occasions may be the reference downlink control signal/channel transmission occasion. The wireless device may determine the reference downlink control signal/channel transmission occasion based on the coreset.

The reference downlink control signal/channel transmission occasion may be associated with a reference downlink control signal/channel among the plurality of DCIs/PDCCHs. The base station may transmit the reference downlink control signal/channel in/via the reference downlink control signal/channel transmission occasion. The wireless device may monitor, for the reference downlink control signal/channel, in/via the reference downlink control signal/channel transmission occasion. The wireless device may monitor, for the reference downlink control signal/channel, the coreset in the reference downlink control signal/channel transmission occasion.

In an example, the wireless device may monitor, for the downlink control signal/channel, a search space set of the plurality of search space sets in the reference downlink control signal/channel transmission occasion (e.g., PDCCH monitoring occasion). The reference downlink control signal/channel transmission occasion may be associated with the search space set. The wireless device may monitor, for a DCI (or the downlink control signal/channel), the search space set in the reference downlink control signal/channel transmission occasion. The one or more configuration parameters may indicate the reference downlink control signal/channel transmission occasion for the search space set. The wireless device may determine the reference downlink control signal/channel transmission occasion based on the receiving the one or more configuration parameters.

In an example, the search space set may be identified/indicated by a search space set index of the search space set indexes. In an example, the search space set index may be lowest (or highest) among the search space set indexes. The search space set may be identified/indicated by a search space set index that is lowest (or highest) among the search space set indexes.

The wireless device may determine/select the search space set with a search space set index that is lowest (or highest) among the search space set indexes of the plurality of search space sets. For example, the wireless device may monitor, for a DCI, the search space set in a downlink control signal/channel transmission occasion. The downlink control signal/channel transmission occasion may be the reference downlink control signal/channel transmission occasion. For example, the wireless device may monitor, for a DCI, the search space set in one or more downlink control signal/channel transmission occasions. A last/latest/earliest/first/starting downlink control signal/channel transmission occasion of the one or more downlink control signal/channel transmission occasions may be the reference downlink control signal/channel transmission occasion. The wireless device may determine the reference downlink control signal/channel transmission occasion based on the search space set.

The reference downlink control signal/channel transmission occasion may be associated with a reference downlink control signal/channel among the plurality of DCIs/PDCCHs. The base station may transmit the reference downlink control signal/channel in/via the reference downlink control signal/channel transmission occasion. The wireless device may monitor, for the reference downlink control signal/channel, in/via the reference downlink control signal/channel transmission occasion. The wireless device may monitor, for the reference downlink control signal/channel, the search space in the reference downlink control signal/channel transmission occasion.

In an example, the wireless device, for example, may determine the reference downlink control signal/channel transmission occasion based on receiving, via the at least one coreset of the one or more coresets, the at least one downlink control signal/channel (or the downlink control signal/channel).

The wireless device may determine the reference downlink control signal/channel transmission occasion based on the repetition scheme being a first repetition scheme. The first repetition scheme, for example, may be a time domain repetition scheme (e.g., TDM).

The first repetition scheme, for example, may be a frequency domain repetition scheme (e.g., FDM). The first repetition scheme, for example, may be a spatial/code domain repetition domain repetition scheme (e.g., SFN, SDM).

The wireless device may determine the reference downlink control signal/channel transmission occasion based on the repetition scheme not being a second repetition scheme. The second repetition scheme, for example, may be a frequency domain repetition scheme (e.g., FDM). The second repetition scheme, for example, may be a spatial/code domain repetition domain repetition scheme (e.g., SFN, SDM).

The second repetition scheme, for example, may be time domain repetition scheme (e.g., TDM).

The at least one downlink control signal/channel (or the downlink control signal/channel) may schedule/trigger one or more sidelink transmissions (e.g., Sidelink transmission in FIG. 24). Each downlink control signal/channel of the at least one downlink control signal/channel may schedule/trigger the one or more sidelink transmissions. The at least one downlink control signal/channel scheduling/triggering the one or more sidelink transmissions may comprise the downlink control signal/channel scheduling/triggering the one or more sidelink transmissions.

The one or more sidelink transmissions, for example, may be one or more physical sidelink shared channel (PSSCH) transmissions. The one or more sidelink transmissions, for example, may be transmission of one or more transport blocks (e.g., PSSCH, PSCCH). The one or more sidelink transmissions, for example, may be transmission of one or more physical sidelink control channels (PSCCH).

In an example, the wireless device may determine the reference downlink control signal/channel transmission occasion for a reception/transmission of the one or more sidelink transmissions.

In an example, the wireless device may determine the reference downlink control signal/channel transmission occasion for a reception/transmission of a first/starting/earliest sidelink transmission of the one or more sidelink transmissions.

When the one or more sidelink transmissions is a single sidelink transmission, the first/starting/earliest sidelink transmission of the one or more sidelink transmissions may be the single sidelink transmission.

In an example, the at least one downlink control signal/channel (or the downlink control signal/channel) may comprise a sidelink dynamic grant. The one or more transport blocks may be/comprise a transport block scheduled by the sidelink dynamic grant.

In an example, the wireless device may activate a configured grant for a sidelink configured grant (e.g., sidelink configured grant type 2) based on receiving/detecting the at least one downlink control signal/channel (or the downlink control signal/channel). The one or more transport blocks may be/comprise a plurality of transport blocks of the sidelink configured grant.

In an example, the one or more configuration parameters may indicate one or more sidelink SPS configurations (e.g., LTE sidelink SPS configuration). The at least one downlink control signal/channel (or the downlink control signal/channel) may comprise a sidelink SPS configuration index field indicating a sidelink SPS configuration of the one or more sidelink SPS configurations. A value of/in the sidelink SPS configuration index field may be equal to (or be mapped to) a sidelink SPS configuration index identifying/indicating/of the sidelink SPS configuration. The one or more configuration parameters may indicate, for the sidelink SPS configuration, the sidelink SPS configuration index.

The wireless device may activate the sidelink SPS configuration, for example, based on the receiving/detecting the at least one downlink control signal/channel (or the downlink control signal/channel). The one or more transport blocks may be/comprise a plurality of transport blocks of the sidelink SPS configuration.

The one or more configuration parameters may indicate a sidelink resource allocation mode. The sidelink resource allocation mode may be a first type of sidelink resource allocation (e.g., sidelink resource allocation mode 1).

The at least one downlink control signal/channel (or the downlink control signal/channel) may indicate a sidelink resource allocation mode. The sidelink resource allocation mode may be a first type of sidelink resource allocation (e.g., sidelink resource allocation mode 1).

The determining the reference downlink control signal/channel transmission occasion may comprise determining a reference time slot.

In an example, the reference downlink control signal/channel transmission occasion may be the reference time slot. The plurality of downlink control signal/channel transmission occasions may be a plurality of time slots. Each downlink control signal/channel transmission occasion of the plurality of downlink control signal/channel transmission occasions may be a respective time slot of the plurality of time slots. The first downlink control signal/channel transmission occasion may be a first time slot of the plurality of time slots. The second downlink control signal/channel transmission occasion may be a second time slot of the plurality of time slots. The determining the reference downlink control signal/channel transmission occasion may comprise/be determining the reference time slot among the plurality of time slots.

In an example, the reference downlink control signal/channel transmission occasion may occur in the reference time slot. The wireless device may monitor, for the downlink control signal/channel, downlink control channels in the reference downlink control signal/channel transmission occasion of/in the reference time slot. The reference time slot may comprise the reference downlink control signal/channel transmission occasion The at least one downlink control signal/channel (or the downlink control signal/channel) may be a DCI format. The DCI format, for example, may be DCI format 3-0. The DCI format, for example, may be DCI format 3-1. The DCI format, for example, may be DCI format 3-x, x=0, 1, 2, 3, 4, . . . .

The one or more configuration parameter may indicate an RNTI. A CRC of the downlink control signal/channel (or the DCI format) may be scrambled with the RNTI.

The RNTI, for example, may be SL-L-CS-RNTI.

The wireless device may determine, for the first/starting/earliest sidelink transmission (e.g., $1^{st}$ sidelink transmission in FIG. 24), a time slot. The wireless device may determine the time slot, for example, based on the reference downlink control signal/channel transmission occasion. The wireless device may determine the time slot, for example, based on the reference time slot. The wireless device may determine the time slot, for example, based on a reference PDCCH monitoring occasion in the reference downlink control signal/channel transmission occasion. The wireless device may monitor, for the downlink control signal/channel, in one or more PDCCH monitoring occasions of/in the reference downlink control signal/channel transmission occasion. The one or more PDCCH monitoring occasions may comprise the reference PDCCH monitoring occasion.

The wireless device may determine the time slot based on the reference PDCCH monitoring occasion, for example, in response to the one or more configuration parameters indicating the control channel repetition. The wireless device may determine the time slot based on the reference time slot, for example, in response to the one or more configuration parameters indicating the control channel repetition. The wireless device may determine the time slot based on the reference downlink control signal/channel transmission occasion, for example, in response to the one or more configuration parameters indicating the control channel repetition.

The wireless device may or may not receive the downlink control signal/channel in the reference PDCCH monitoring occasion (or in the reference time slot or in the reference downlink control signal/channel transmission occasion).

In an example, the reference PDCCH monitoring occasion may be a last (or latest or ending) PDCCH monitoring occasion among the one or more PDCCH monitoring occasions. The last PDCCH monitoring occasion, for example, may have a latest starting time among one or more starting times of the one or more PDCCH monitoring occasions. The last PDCCH monitoring occasion, for example, may have a latest ending time among one or more ending times of the one or more PDCCH monitoring occasions.

In an example, the reference PDCCH monitoring occasion may be a first (or earliest or starting) PDCCH monitoring occasion among the one or more PDCCH monitoring occasions. The first (or earliest or starting) PDCCH monitoring occasion, for example, may have an earliest starting time among one or more starting times of the one or more PDCCH monitoring occasions. The first (or earliest or starting) PDCCH monitoring occasion, for example, may have an earliest ending time among one or more ending times of the one or more PDCCH monitoring occasions.

The one or more configuration parameters may indicate one or more resource pools. The one or more configuration parameters may comprise a higher layer parameter sl-Tx-PoolScheduling indicating the one or more resource pools.

The at least one downlink control signal/channel (or the downlink control signal/channel) may comprise a resource pool index field indicating a resource pool among the one or more resource pools. The determining the time slot may comprise determining a time slot of the (corresponding) resource pool. The one or more configuration parameters may indicate a resource pool index identifying/indicating/for the resource pool. A value of/in the resource pool index field may be equal to (or mapped to) the resource pool index.

The wireless device may transmit/receive/perform the first/starting/earliest sidelink transmission based on the time slot. The wireless device may transmit/receive/perform the first/starting/earliest sidelink transmission, for example, in/at the time slot. The wireless device may transmit/receive/perform the first/starting/earliest sidelink transmission, for example, after the time slot. The wireless device may transmit/receive/perform the first/starting/earliest sidelink transmission, for example, not earlier than the time slot. The wireless device may transmit/receive/perform the first/starting/earliest sidelink transmission, for example, starting from the time slot. The wireless device may not transmit/receive/perform the first/starting/earliest sidelink transmission, for example, earlier than (or before) the time slot.

The wireless device may transmit/receive a first/starting transport block of the one or more transport blocks based on the time slot. The wireless device may transmit/receive the first/starting transport block, for example, in/at the time slot. The wireless device may transmit/receive the first/starting transport block, for example, after the time slot. The wireless device may transmit/receive the first/starting transport block, for example, not earlier than the time slot. The wireless device may transmit/receive the first/starting transport block, for example, starting from the time slot. The wireless device may not transmit/receive the first/starting transport block, for example, earlier than (or before) the time slot.

The time slot may be a first/starting/earliest sidelink time slot that occurs/starts after (or later than) a time value (e.g., Ending time in FIG. 24). The time slot may be a first/starting/earliest sidelink time slot that occurs/starts not earlier than (or before) a time value (e.g., Ending time in FIG. 24).

The wireless device may transmit/receive/perform the first/starting/earliest sidelink transmission based on the time value. The wireless device may transmit/receive/perform the first/starting/earliest sidelink transmission, for example, after the time value. The wireless device may transmit/receive/perform the first/starting/earliest sidelink transmission, for example, not earlier than the time value. The wireless device may transmit/receive/perform the first/starting/earliest sidelink transmission, for example, starting from the time value. The wireless device may not transmit/receive/perform the first/starting/earliest sidelink transmission, for example, earlier than (or before) the time value.

The wireless device may transmit/receive, for the sidelink SPS configuration, a first/starting transport block of the one or more transport blocks based on the time value. The wireless device may transmit/receive the first/starting transport block, for example, after the time value. The wireless device may transmit/receive the first/starting transport block, for example, not earlier than the time value. The wireless device may transmit/receive the first/starting transport block, for example, starting from the time value. The wireless device may start transmitting/receiving the first/starting transport block, for example, no earlier than (or after) the time value. The wireless device may not transmit/receive the first/starting transport block, for example, earlier than (or before) the time value.

The at least one downlink control signal/channel (or the downlink control signal/channel) may comprise a time gap field. Each downlink control signal/channel of the at least one downlink control signal/channel may comprise the time gap field. A value of the time gap field may indicate a row (or an index) in a slot offset table. The one or more configuration parameters may comprise a higher layer parameter timeGapFirstSidelinkTransmission indicating the slot offset table. The row (or the index) in the slot offset table may indicate/define a slot offset (e.g., K_SL). The slot offset may be, for example, a slot offset (or a time duration) between the reference PDCCH monitoring occasion (or the reference time slot or the reference downlink control signal/channel transmission occasion) and the first/starting/earliest sidelink transmission.

The at least one downlink control signal/channel (or the downlink control signal/channel) may comprise a sidelink index field. Each downlink control signal/channel of the at least one downlink control signal/channel may comprise the sidelink index field. The sidelink index field (or a value of the timing offset field) may indicate a sidelink index (e.g., m).

In an example, the at least one downlink control signal/channel (or the downlink control signal/channel) may not comprise a sidelink index field. The sidelink index field may not be present in the at least one downlink control signal/channel (or the downlink control signal/channel). Each downlink control signal/channel of the at least one downlink control signal/channel may not comprise the sidelink index field. The wireless device may set a sidelink index to zero (e.g., m=0), for example, based on the at least one downlink control signal/channel (or the downlink control signal/channel) not comprising the sidelink index field.

The at least one downlink control signal/channel (or the downlink control signal/channel) may comprise a timing offset field. Each downlink control signal/channel of the at least one downlink control signal/channel may comprise the timing offset field. The timing offset field (or a value of the timing offset field) may indicate a time offset (e.g., X)

In an example, the time value may be equal to $$T_{DL} - \frac{T_{TA}}{2} + K_{SL} \times T_{slot}.$$

In an example, the time value may be equal to $$T_{DCI} - \frac{N_{TA}}{2} \times T_C \times 10^3 + X + (4 + m) \text{ ms}.$$

In an example, the wireless device may determine the time value based on the slot offset (e.g., K_SL).

In an example, the wireless device may determine the time value based on the time offset (e.g., X).

In an example, the wireless device may determine the time value based on the sidelink index (e.g., m).

In an example, the wireless device may determine the time value based on a timing advance value (e.g., T_TA, N_TA).

In an example, the wireless device may determine the time value based on a duration of a sidelink slot (e.g., T_slot). The one or more configuration parameters, for example, may indicate the duration of the sidelink slot.

In an example, $T_c=1/(\Delta f_{max} \cdot N_f)$ where $\Delta f_{max}=480 \cdot 10^3$ Hz and $N_f=4096$.

In an example, the wireless device may determine the time value based on a starting time (e.g., Starting time in FIG. 24) of the reference downlink control signal/channel transmission occasion. The starting time (e.g., T_DL, T_DCI) may be a first/starting/earliest symbol of the reference downlink control signal/channel transmission occasion. The starting time may be, for example, a last/ending/latest symbol of the reference downlink control signal/channel transmission occasion.

In an example, the wireless device may determine the time value based on a starting time (e.g., Starting time in FIG. 24) of the reference PDCCH monitoring occasion. The starting time (e.g., T_DL, T_DCI) may be a first/starting/earliest symbol of the reference PDCCH monitoring occasion. The starting time may be, for example, a last/ending/latest symbol of the reference PDCCH monitoring occasion.

In an example, the wireless device may determine the time value based on a starting time (e.g., Starting time in FIG. 24) of the reference time slot. The starting time (e.g., T_DL, T_DCI) may be a first/starting/earliest symbol of the reference time slot. The starting time may be, for example, a last/ending/latest symbol of the reference time slot.

The wireless device may determine the time value based on the starting time, for example, in response to the one or more configuration parameters indicating the control channel repetition.

The wireless device may determine a time duration/gap between the starting time and the time value, for example, based on the duration of the sidelink slot. The wireless device may determine a time duration/gap between the starting time and the time value, for example, based on the timing advance value. The wireless device may determine a time duration/gap between the starting time and the time value, for example, based on the slot offset.

In an example, the wireless device may be a TX UE. The TX UE may transmit the first/starting transport block to a second wireless device. For example, the second wireless device may be an RX UE.

In an example, the wireless device may be a TX UE. The TX UE may receive the first/starting transport block from a second wireless device. For example, the second wireless device may be an RX UE.

In an example, the wireless device may receive/detect a first DCI (e.g., First DCI in FIG. 25). The first DCI may indicate a first uplink resource, for example, for transmission of a first HARQ-ACK information bit/feedback (e.g., First HARQ-ACK in FIG. 25). The first DCI may indicate the first uplink resource for a PUCCH transmission comprising (or with corresponding) the first HARQ-ACK information bit/feedback. The first uplink resource, for example, may be a first PUCCH resource. The first DCI may indicate the first uplink resource for transmission of the first HARQ-ACK information bit/feedback in a time slot (e.g., Time slot in FIG. 25). The first DCI may comprise a field (e.g., the PDSCH-to-HARQ_feedback timing indicator field) indicating the time slot for transmission of the first HARQ-ACK information bit/feedback.

In an example, the at least one downlink control signal/channel (or the downlink control signal/channel) may be a second DCI. The second DCI may indicate a second uplink resource, for example, for transmission of a second HARQ-ACK information bit/feedback. The second DCI may indicate the second uplink resource for a PUCCH transmission comprising (or with corresponding) the second HARQ-ACK information bit/feedback. The second uplink resource, for example, may be a second PUCCH resource. The second DCI may indicate the second uplink resource for transmission of the second HARQ-ACK information bit/feedback in the time slot (e.g., Time slot in FIG. 25). The second DCI may comprise a field (e.g., the PDSCH-to-HARQ_feedback timing indicator field) indicating the time slot for transmission of the second HARQ-ACK information bit/feedback.

In an example, the wireless device may receive/detect the second DCI after the receiving/detecting the first DCI. The wireless device may receive/detect the second DCI at a later time than the first DCI. The wireless device may receive/detect the first DCI at a first time (T1). The wireless device may receive/detect the second DCI at a second time (T2). The second time may occur/be after the first time (e.g., T2>=T1, or T2>T1).

In an example, the reference downlink control signal/channel transmission occasion may occur after the receiving/detecting the first DCI. The reference downlink control signal/channel transmission occasion may occur at a later time than the receiving/detecting the first DCI. The reference time slot may occur at a later time than the receiving/detecting the first DCI. In an example, the reference time slot may occur after the receiving/detecting the first DCI. In an example, the reference PDCCH monitoring occasion may occur after the receiving/detecting the first DCI. The reference PDCCH monitoring occasion may occur at a later time than the receiving/detecting the first DCI.

The wireless device may transmit, in the time slot, the first HARQ-ACK information bit/feedback. The wireless device may transmit, via the first uplink resource, the first HARQ-ACK information bit/feedback. The wireless device may transmit, via the first uplink resource, the first HARQ-ACK information bit/feedback in the time slot.

In an example, the wireless device may multiplex the second HARQ-ACK information bit/feedback in the first uplink resource in the time slot. The wireless device may transmit, via the first uplink resource, the second HARQ-ACK information bit/feedback in the time slot. The wireless device may transmit, via the first uplink resource, the second HARQ-ACK information bit/feedback in the time slot, for example, based on the multiplexing.

The wireless device may not transmit, via the second uplink resource, the second HARQ-ACK information bit/feedback in the time slot. The wireless device may not transmit, via the second uplink resource, the second HARQ-ACK information bit/feedback in the time slot, for example, based on the multiplexing the second HARQ-ACK information bit/feedback in the first uplink resource in the time slot.

In an example, the wireless device may determine the reference downlink control signal/channel transmission occasion to determine whether to multiplex the second HARQ-ACK information bit/feedback in the first uplink resource in the time slot or not.

The wireless device may multiplex the second HARQ-ACK information bit/feedback in the first uplink resource in the time slot, for example, based on the reference downlink control signal/channel transmission occasion (or the reference PDCCH monitoring occasion or the reference time slot) occurring/being earlier than a time duration (or a time gap or a processing time) before/from (the beginning of) a first/earliest/starting symbol (e.g., First/starting/earliest symbol in FIG. 25) of the first uplink resource. The wireless device may multiplex the second HARQ-ACK information bit/feedback in the first uplink resource in the time slot, for example, based on a first/last/starting/ending/earliest/latest symbol of the reference downlink control signal/channel transmission occasion (or of the reference PDCCH monitoring occasion or of the reference time slot) occurring/being earlier than the time duration (or the time gap or the processing time) before/from (the beginning of) the first/earliest/starting symbol of the first uplink resource. The first uplink resource may comprise one or more symbols (e.g., OFDM symbols). The one or more symbols may comprise the first/earliest/starting symbol.

The wireless device may determine a starting time (e.g., Starting time in FIG. 25). The wireless device may determine the starting time, for example, based on the first/earliest/starting symbol of the first uplink resource. The wireless device may determine the starting time, for example, based on the time duration (or the time gap or the processing time). The starting time may occur the time duration (or the time gap or the processing time) before (or prior to or from) the beginning of the first/earliest/starting symbol of the first uplink resource.

The wireless device may multiplex the second HARQ-ACK information bit/feedback in the first uplink resource in the time slot, for example, based on the reference downlink control signal/channel transmission occasion (or the reference PDCCH monitoring occasion or the reference time slot) occurring/being earlier than the starting time. The wireless device may multiplex the second HARQ-ACK information bit/feedback in the first uplink resource in the time slot, for example, based on a first/last/starting/ending/earliest/latest symbol of the reference downlink control signal/channel transmission occasion (or the reference PDCCH monitoring occasion or the reference time slot) occurring/being earlier than the starting time.

The wireless device may multiplex the second HARQ-ACK information bit/feedback in the first uplink resource in the time slot based on the reference downlink control signal/channel transmission occasion, for example, in response to the one or more configuration parameters indicating the control channel repetition. The wireless device may determine whether to multiplex the second HARQ-ACK information bit/feedback in the first uplink resource in the time slot or not based on the reference downlink control signal/channel transmission occasion, for example, in response to the one or more configuration parameters indicating the control channel repetition.

The wireless device may not multiplex the second HARQ-ACK information bit/feedback in the first uplink resource in the time slot, for example, based on the reference downlink control signal/channel transmission occasion (or the reference PDCCH monitoring occasion or the reference time slot) occurring/being not earlier (or occurring/being later) than a time duration (or a time gap or a processing time) before/from (the beginning of) a first/earliest/starting symbol (e.g., First/starting/earliest symbol in FIG. 25) of the first uplink resource. The wireless device may not multiplex the second HARQ-ACK information bit/feedback in the first uplink resource in the time slot, for example, based on a first/last/starting/ending/earliest/latest symbol of the reference downlink control signal/channel transmission occasion (or of the reference PDCCH monitoring occasion or of the reference time slot) occurring/being not earlier (or occurring/being later) than the time duration (or the time gap or the processing time) before/from (the beginning of) the first/earliest/starting symbol of the first uplink resource.

The wireless device may not multiplex the second HARQ-ACK information bit/feedback in the first uplink resource in the time slot, for example, based on the reference downlink control signal/channel transmission occasion (or the reference PDCCH monitoring occasion or the reference time slot) occurring/being not earlier (or occurring/being later) than the starting time. The wireless device may not multiplex the second HARQ-ACK information bit/feedback in the first uplink resource in the time slot, for example, based on a first/last/starting/ending/earliest/latest symbol of the reference downlink control signal/channel transmission occasion (or the reference PDCCH monitoring occasion or the reference time slot) occurring/being not earlier (or occurring/being later) than the starting time.

In an example, the time duration (or the time gap or the processing time) may be equal to $$N_3 \cdot (2048+144) \cdot \kappa \cdot 2^{-\mu} \cdot T_c$$

In an example, $T_c=1/(\Delta f_{max} \cdot N_f)$ wherein $\Delta f_{max}=480 \cdot 10^3$ Hz and $N_f=4096$. The constant $\kappa=T_s/T_c=64$ where $T_s=1/(\Delta f_{ref} \cdot N_{f,ref}) \cdot \Delta f_{ref}=15 \cdot 10^3$ Hz and $N_{f,ref}=2048$.

The wireless device may determine the time duration (or the time gap or the processing time), for example, based on a subcarrier spacing (e.g., µ) of the downlink BWP that the second DCI is received. The wireless device may determine the time duration (or the time gap or the processing time), for example, based on a subcarrier spacing (e.g., p) of a downlink BWP that the first DCI is received. The wireless device may determine the processing time, for example, based on a subcarrier spacing (e.g., µ) of an uplink BWP comprising the first uplink resource. The wireless device may determine the processing time, for example, based on a subcarrier spacing (e.g., µ) of an uplink BWP comprising the first uplink resource that the first HARQ-ACK information bit/feedback is transmitted. The wireless device may determine the processing time, for example, based on a smallest subcarrier spacing among i) the subcarrier spacing of the downlink BWP that the first DCI is received; ii)) the subcarrier spacing of the downlink BWP that the second DCI is received; and iii)) the subcarrier spacing of the uplink BWP comprising the first uplink resource.

The at least one downlink control signal/channel (or the downlink control signal/channel) may schedule a second transport block. Each downlink control signal/channel of the at least one downlink control signal/channel may schedule the second transport block. The at least one downlink control signal/channel scheduling the second transport block may comprise the downlink control signal/channel scheduling the second transport block.

In an example, the at least one downlink control signal/channel (or the downlink control signal/channel) may be a second DCI.

The at least one downlink control signal/channel (or the downlink control signal/channel or the second DCI) may be a DCI format. The DCI format, for example, may be DCI format 0-0. The DCI format, for example, may be DCI format 0-1. The DCI format, for example, may be DCI format 0-x, x=0, 1, 2, 3, 4, . . . .

The second transport block, for example, may be a second PUSCH (e.g., $2^{nd}$ PUSCH in FIG. 26). The second DCI may schedule transmission of the second PUSCH via the active uplink BWP of an uplink carrier (e.g., SUL, NUL) of the cell.

In an example, the wireless device may detect/receive a first DCI (e.g., First DCI in FIG. 26). The first DCI may schedule a first transport block. The first transport block may be a first PUSCH (e.g., $1^{st}$ PUSCH in FIG. 26). The first DCI may schedule an initial/first transmission of the first PUSCH. The first DCI may schedule transmission of the first PUSCH via an active uplink BWP of an uplink carrier (e.g., SUL, NUL) of a first cell. The first cell may be different from the cell.

The first DCI may be a DCI format. The DCI format, for example, may be DCI format 0-0. The DCI format, for example, may be DCI format 0-1. The DCI format, for example, may be DCI format 0-x, x=0, 1, 2, 3, 4, . . . .

In an example, the wireless device may trigger a power headroom report.

The power headroom report may be, for example, a Type 1 power headroom report. The power headroom report may be, for example, a Type 2 power headroom report. The power headroom report may be, for example, a Type 3 power headroom report.

The power headroom report may indicate a difference between a nominal maximum transmit power and an estimated power for an uplink transmission via an uplink channel (e.g., PUSCH, PUCCH, SRS).

In an example, the power headroom report may be based on an actual uplink transmission. The actual uplink transmission is an actual PUSCH transmission.

The power headroom report may be a power headroom report medium access control control element (PHR MAC CE).

In an example, the wireless device may determine the reference downlink control signal/channel transmission occasion for transmission of the power headroom report.

In an example, the first DCI may be a first/earliest/starting DCI that the wireless device receives/detects after the power headroom report was triggered. The first DCI may be a first/earliest/starting DCI that the wireless device receives/detects after the triggering of the power headroom report. The wireless device may trigger the power headroom report before (or prior to) the receiving/detecting the first DCI.

The first transport block scheduled by the first DCI and the second transport block scheduled by the second DCI may overlap, for example, in time. A first uplink resource (e.g., PUSCH resource) of the first transport block may overlap in time with a second uplink resource (e.g., PUSCH resource) of the second transport block. The first DCI may indicate the first uplink resource for transmission of the first transport block. The second DCI may indicate the second uplink resource for transmission of the second transport block. At least one symbol of the first transport block and at least one symbol of the second transport block may overlap in time.

The wireless device may determine/calculate/compute the power headroom report. For example, the wireless device may determine/calculate/compute the power headroom report in a first uplink transmission (e.g., a first PUSCH transmission) that comprises/includes the first transport block. The first uplink transmission may comprise the power headroom report.

The wireless device may transmit the power headroom report. The wireless device may transmit the power headroom report, for example, in the first uplink transmission. The wireless device may transmit the power headroom report, for example, for the first transport block.

For example, the wireless device may transmit, via the active uplink BWP of the uplink carrier (e.g., SUL, NUL) of the first cell, the power headroom report.

In an example, the wireless device may determine/calculate/compute the power headroom report in the first uplink transmission based on a second uplink transmission (e.g., a second PUSCH transmission) that comprises/includes the second transport block. The wireless device may transmit the power headroom report, for example, for the second transport block. The wireless device may transmit the power headroom report, for example, for the first transport block and the second transport block. The wireless device may consider (or take into account) the second uplink transmission for the determination/calculation/computation of the power headroom report. The wireless device may consider (or take into account) the second DCI scheduling the second uplink transmission (or the second transport block) for the determination/calculation/computation of the power headroom report.

In an example, the wireless device may receive, via a first PDCCH monitoring occasion, the first DCI. The one or more configuration parameters may not indicate, for example, a control channel repetition for the first cell.

The wireless device may determine/calculate/compute, based on the second uplink transmission, the power headroom report in the first uplink transmission in response to the reference downlink control signal/channel transmission occasion (or the reference PDCCH monitoring occasion or the reference time slot) occurring/being earlier than (or before) the first PDCCH monitoring occasion. The wireless device may determine/calculate/compute, based on the second uplink transmission, the power headroom report in the first uplink transmission in response to the one or more configuration parameters not indicating the control channel repetition for the first cell.

In an example, the one or more configuration parameters may indicate a control channel repetition for the first cell. The wireless device may monitor, for repetition of the first DCI, downlink control channels across/over/on/in a second plurality of downlink control signal/channel transmission/repetition occasions (or a second plurality of PDCCH monitoring occasions or a second plurality of time slots).

The wireless device may determine a second reference downlink control signal/channel transmission occasion (or a second reference PDCCH monitoring occasion or a second reference time slot) among the second plurality of downlink control signal/channel transmission occasions. The wireless device may determine the second reference downlink control signal/channel transmission occasion based on one or more criteria. The one or more criteria may be same as criteria(s) of determining the reference downlink control signal/channel transmission occasion. For example, the second reference downlink control signal/channel transmission occasion may be a last/latest/ending/first/earliest/starting downlink control signal/channel transmission occasion among the second plurality of downlink control signal/channel transmission occasions.

The wireless device may determine/calculate/compute, based on the second uplink transmission, the power headroom report in the first uplink transmission in response to the reference downlink control signal/channel transmission occasion (or the reference PDCCH monitoring occasion or the reference time slot) occurring/being earlier than (or before) the second reference downlink control signal/channel transmission occasion. The wireless device may determine/calculate/compute, based on the second uplink transmission, the power headroom report in the first uplink transmission in response to the one or more configuration parameters indicating the control channel repetition for the first cell.

The wireless device may determine/calculate/compute, based on the second uplink transmission and based on the reference downlink control signal/channel transmission occasion, the power headroom report in the first uplink transmission in response to the one or more configuration parameters indicating the control channel repetition.

In an example, the wireless device may not determine/calculate/compute the power headroom report in the first uplink transmission based on a second uplink transmission (e.g., a second PUSCH transmission) that comprises/includes the second transport block. The wireless device may not transmit the power headroom report, for example, for the second transport block. The wireless device may transmit the power headroom report, for example, for the first transport block. The wireless device may not consider (or not take into account) the second uplink transmission for the determination/calculation/computation of the power headroom report. The wireless device may not consider (or not take into account or ignore) the second DCI scheduling the second uplink transmission (or the second transport block) for the determination/calculation/computation of the power headroom report.

The wireless device may not determine/calculate/compute, based on the second uplink transmission, the power headroom report in the first uplink transmission in response to the reference downlink control signal/channel transmission occasion (or the reference PDCCH monitoring occasion or the reference time slot) occurring/being after (or later than) the first PDCCH monitoring occasion. The wireless device may not determine/calculate/compute, based on the second uplink transmission, the power headroom report in the first uplink transmission in response to the one or more configuration parameters not indicating the control channel repetition for the first cell.

The wireless device may not determine/calculate/compute, based on the second uplink transmission, the power headroom report in the first uplink transmission in response to the reference downlink control signal/channel transmission occasion (or the reference PDCCH monitoring occasion or the reference time slot) occurring/being after (or later than) the second reference downlink control signal/channel transmission occasion. The wireless device may not determine/calculate/compute, based on the second uplink transmission, the power headroom report in the first uplink transmission in response to the one or more configuration parameters indicating the control channel repetition for the first cell.

The wireless device may transmit the first transport block. The wireless device may transmit, via the active uplink BWP of the uplink carrier of the first cell, the first transport block. The wireless device may perform the first uplink transmission comprising the first transport block.

The wireless device may transmit the second transport block. The wireless device may transmit, via the active uplink BWP of the uplink carrier of the cell, the second transport block. The wireless device may perform the second uplink transmission comprising the second transport block.

In an example, the one or more configuration parameters may not indicate a control channel repetition.

The wireless device may receive/detect a first DCI. The first DCI may indicate a first uplink resource, for example, for transmission of a first HARQ-ACK information bit/feedback. The first DCI may indicate the first uplink resource for transmission of the first HARQ-ACK information bit/feedback in a time slot. The wireless device may receive/detect, in a first PDCCH monitoring occasion, the first DCI.

The wireless device may receive/detect a second DCI. The second DCI may indicate a second uplink resource, for example, for transmission of a second HARQ-ACK information bit/feedback. The second DCI may indicate the second uplink resource for transmission of the second HARQ-ACK information bit/feedback in the time slot. The wireless device may receive/detect, in a second PDCCH monitoring occasion, the second DCI. The wireless device may receive the second DCI, for example, after (or at a later time than) the receiving/detecting the first DCI.

The wireless device may multiplex the second HARQ-ACK information bit/feedback in the first uplink resource in the time slot, for example, based on the second PDCCH monitoring occasion being/occurring earlier (or before) earlier than the time duration (or the time gap or the processing time discussed in FIG. 25) before/from (the beginning of) a first/earliest/starting symbol of the first uplink resource. The wireless device may multiplex the second HARQ-ACK information bit/feedback in the first uplink resource in the time slot based on the second PDCCH monitoring occasion that the wireless device receives the second DCI, for example, in response to the one or more configuration parameters not indicating the control channel repetition.

The wireless device may transmit, in the time slot, the first HARQ-ACK information bit/feedback. The wireless device may transmit, via the first uplink resource, the first HARQ-ACK information bit/feedback. The wireless device may transmit, via the first uplink resource, the first HARQ-ACK information bit/feedback in the time slot. The wireless device may transmit, via the first uplink resource, the second HARQ-ACK information bit/feedback in the time slot. The wireless device may transmit, via the first uplink resource, the second HARQ-ACK information bit/feedback in the time slot, for example, based on the multiplexing.

In an example, the one or more configuration parameters may not indicate a control channel repetition.

In an example, the wireless device may receive, in a first PDCCH monitoring occasion, a first DCI (e.g., DCI 0-0, DCI 0-1) scheduling a first transport block (e.g., a first PUSCH). The first DCI may schedule an initial/first transmission of the first transport block. The first DCI may schedule transmission of the first transport block via an active uplink BWP of an uplink carrier (e.g., SUL, NUL) of a first cell. The first DCI may schedule a first uplink transmission (e.g., a first PUSCH transmission) comprising the first transport block. The first DCI may indicate a first uplink resource (e.g., a first PUSCH resource) for the first uplink transmission (or for transmission of the first transport block).

In an example, the wireless device may receive, in a second PDCCH monitoring occasion, a second DCI (e.g., DCI 0-0, DCI 0-1) scheduling a second transport block (e.g., a second PUSCH). The second DCI may schedule transmission of the second transport block via an active uplink BWP of an uplink carrier (e.g., SUL, NUL) of a second cell. The second cell may be different from the first cell. The second cell and the cell (discussed in FIG. 24-FIG. 26) may be the same. The second DCI may schedule a second uplink transmission (e.g., a second PUSCH transmission) comprising the second transport block. The second DCI may indicate a second uplink resource (e.g., a second PUSCH resource) for the second uplink transmission (or for transmission of the second transport block).

In an example, the first uplink resource and the second uplink resource may overlap in time. The overlapping may be a partially overlapping or a fully overlapping.

In an example, the wireless device may trigger a power headroom report (e.g., Type 1 power headroom report).

The wireless device may receive/detect the first DCI after the triggering of the power headroom report. The wireless device may receive/detect the first DCI after the power headroom report is/was triggered. The first DCI may be a first/starting/earliest DCI that is detected/received after the triggering of the power headroom report.

The wireless device may determine/calculate/compute the power headroom report in the first uplink transmission, for example, based on the second uplink transmission. The wireless device may determine/calculate/compute, based on the second uplink transmission, the power headroom report in the first uplink transmission in response to the second PDCCH monitoring occasion being/occurring before (or earlier than) the first PDCCH monitoring occasion.

The wireless device may not determine/calculate/compute the power headroom report in the first uplink transmission, for example, based on the second uplink transmission. The wireless device may not determine/calculate/compute, based on the second uplink transmission, the power headroom report in the first uplink transmission in response to the second PDCCH monitoring occasion being/occurring after (or later than) the first PDCCH monitoring occasion.

The wireless device may determine whether to determine/calculate/compute the power headroom report based on i) the second uplink transmission, and ii) the second PDCCH monitoring occasion being/occurring before (or earlier than) the first PDCCH monitoring occasion in response to the one or more configuration parameters not indicating the control channel repetition.

The wireless device may determine whether to determine/calculate/compute the power headroom report based on i) the second uplink transmission, and ii) the second PDCCH monitoring occasion that the wireless device receives/detects the second DCI in response to the one or more configuration parameters not indicating the control channel repetition.

In an example, the at least one downlink control signal/channel (or the downlink control signal/channel) may schedule a transport block. Each downlink control signal/channel of the at least one downlink control signal/channel may schedule the second transport block. The at least one downlink control signal/channel scheduling the second transport block may comprise the downlink control signal/channel scheduling the second transport block. The at least one downlink control signal/channel (or the downlink control signal/channel) may schedule the transport block in a time slot. The at least one downlink control signal/channel (or the downlink control signal/channel) may schedule reception of the transport block in the time slot. The base station may transmit the transport block in the time slot.

A downlink control signal/channel transmission occasion may be in the time slot. The time slot may comprise the downlink control signal/channel transmission occasion. The plurality of downlink control signal/channel transmission occasions may comprise the downlink control signal/channel transmission occasion.

The plurality of downlink control signal/channel transmission/repetition occasions (or the plurality of time slots) may comprise the downlink control signal/channel transmission/repetition occasion (or the time slot) of the transport block.

In an example, the downlink control signal/channel transmission occasion may be (or may be same as) the reference downlink control signal/channel transmission occasion (e.g., the last/latest/ending/first/earliest/starting downlink control signal/channel transmission occasion).

In an example, the downlink control signal/channel transmission occasion may not be (or may be different from) the reference downlink control signal/channel transmission occasion.

The transport block may be, for example, a PDSCH.

The transport block may be associated with a mapping type. The mapping type may be, for example, a mapping type A. The mapping type may be, for example, a mapping type B. For example, the one or more configuration parameters may indicate the mapping type. For example, the at least one downlink control signal/channel (or the downlink control signal/channel) may indicate the mapping type.

The wireless device may or may not receive the downlink control signal/channel in the downlink control signal/channel transmission/repetition occasion (or the time slot). The at least one downlink control signal/channel transmission/repetition occasion may or may not comprise the downlink control signal/channel transmission/repetition occasion.

The wireless device may monitor, for (repetition of) the downlink control signal/channel, downlink control channels in a first number of symbols in/of the downlink control signal/channel transmission/repetition occasion (or the time slot).

The wireless device may monitor, for (repetition of) the downlink control signal/channel, downlink control channels in a first number of symbols in/of the plurality of downlink control signal/channel transmission/repetition occasions (or the plurality of time slots). The wireless device may monitor, for (repetition of) the downlink control signal/channel, the downlink control channels in the first number of symbols in/of each downlink control signal/channel transmission/repetition occasion (or each time slot) of the plurality of downlink control signal/channel transmission/repetition occasions.

In an example, the one or more configuration parameters may indicate the first number of symbols.

In an example, the first number of symbols may be predefined/fixed/preconfigured.

In an example, the first number of symbols may be the first three symbols. In an example, the first number of symbols may be the first five symbols. In an example, the first number of symbols may be the first six symbols, and so on.

The wireless device may receive, in the time slot, the transport block with the mapping type.

The wireless device may receive the transport block with the mapping type, for example, based on the monitoring, for (repetition of) the downlink control signal/channel, the downlink control channels in the first number of symbols in/of the downlink control signal/channel transmission/repetition occasion (or the time slot).

The wireless device may receive the transport block with the mapping type, for example, based on the monitoring, for (repetition of) the downlink control signal/channel, the downlink control channels in the first number of symbols in/of the plurality of downlink control signal/channel transmission/repetition occasions.

In response to the one or more configuration parameters indicating the control channel repetition, the wireless device may receive the transport block with the mapping type based on the monitoring, for (repetition of) the downlink control signal/channel, the downlink control channels in the first number of symbols in/of the downlink control signal/channel transmission/repetition occasion (or the time slot).

The wireless device may not monitor, for (repetition of) the downlink control signal/channel, downlink control channels in the first number of symbols in/of the downlink control signal/channel transmission/repetition occasion (or the time slot).

The wireless device may not monitor, for (repetition of) the downlink control signal/channel, downlink control channels in the first number of symbols in/of the plurality of downlink control signal/channel transmission/repetition occasions (or the plurality of time slots). The wireless device may not monitor, for (repetition of) the downlink control signal/channel, the downlink control channels in the first number of symbols in/of each downlink control signal/channel transmission/repetition occasion (or each time slot) of the plurality of downlink control signal/channel transmission/repetition occasions.

The wireless device may not receive, in the time slot, the transport block with the mapping type.

The wireless device may not receive the transport block with the mapping type, for example, based on the not monitoring, for (repetition of) the downlink control signal/channel, the downlink control channels in the first number of symbols in/of the downlink control signal/channel transmission/repetition occasion (or the time slot).

The wireless device may not receive the transport block with the mapping type, for example, based on the not monitoring, for (repetition of) the downlink control signal/channel, the downlink control channels in the first number of symbols in/of the plurality of downlink control signal/channel transmission/repetition occasions.

In response to the one or more configuration parameters indicating the control channel repetition, the wireless device may not receive the transport block with the mapping type based on the not monitoring, for (repetition of) the downlink control signal/channel, the downlink control channels in the first number of symbols in/of the downlink control signal/channel transmission/repetition occasion (or the time slot).

The at least one downlink control signal/channel (or the downlink control signal/channel) may indicate a first/starting/earliest symbol for the transport block. The transport block may comprise one or more symbols. The one or more symbols may comprise the first/starting/earliest symbol. The at least one downlink control signal/channel (or the downlink control signal/channel) may comprise a time domain resource allocation field indicating the first/starting/earliest symbol for the transport block.

The wireless device may receive, in the time slot, the transport block with the mapping type.

The wireless device may receive the transport block with the mapping type, for example, based on a first/starting/earliest symbol of the reference downlink control signal/channel transmission occasion (or the reference PDCCH monitoring occasion or the reference time slot) occurring/being earlier than (or before or in an earlier symbol than) the first/starting/earliest symbol of the transport block.

The wireless device may receive the transport block with the mapping type, for example, based on a last/ending/latest symbol of the reference downlink control signal/channel transmission occasion (or the reference PDCCH monitoring occasion or the reference time slot) occurring/being earlier than (or before) the first/starting/earliest symbol of the transport block.

In response to the one or more configuration parameters indicating the control channel repetition, the wireless device may receive the transport block with the mapping type based on the first/starting/earliest symbol of the reference downlink control signal/channel transmission occasion occurring/being earlier than (or before) the first/starting/earliest symbol of the transport block.

In response to the one or more configuration parameters indicating the control channel repetition, the wireless device may receive the transport block with the mapping type based on the last/ending/latest symbol of the reference downlink control signal/channel transmission occasion occurring/being earlier than (or before) the first/starting/earliest symbol of the transport block.

The wireless device may receive the transport block with the mapping type, for example, based on a first/starting/earliest symbol of the downlink control signal/channel transmission occasion occurring/being earlier than (or before or in an earlier symbol than) the first/starting/earliest symbol of the transport block.

The wireless device may receive the transport block with the mapping type, for example, based on a last/ending/latest symbol of the downlink control signal/channel transmission occasion occurring/being earlier than (or before) the first/starting/earliest symbol of the transport block.

In response to the one or more configuration parameters indicating the control channel repetition, the wireless device may receive the transport block with the mapping type based on the first/starting/earliest symbol of the downlink control signal/channel transmission occasion occurring/being earlier than (or before) the first/starting/earliest symbol of the transport block.

In response to the one or more configuration parameters indicating the control channel repetition, the wireless device may receive the transport block with the mapping type based on the last/ending/latest symbol of the downlink control signal/channel transmission occasion occurring/being earlier than (or before) the first/starting/earliest symbol of the transport block.

The wireless device may not receive, in the time slot, the transport block with the mapping type.

The wireless device may not receive the transport block with the mapping type, for example, based on a first/starting/earliest symbol of the reference downlink control signal/channel transmission occasion (or the reference PDCCH monitoring occasion or the reference time slot) occurring/being later than (or after or in a later symbol than) the first/starting/earliest symbol of the transport block.

The wireless device may not receive the transport block with the mapping type, for example, based on a last/ending/latest symbol of the reference downlink control signal/channel transmission occasion (or the reference PDCCH monitoring occasion or the reference time slot) occurring/being later than (or after) the first/starting/earliest symbol of the transport block.

In response to the one or more configuration parameters indicating the control channel repetition, the wireless device may not receive the transport block with the mapping type based on the first/starting/earliest symbol of the reference downlink control signal/channel transmission occasion occurring/being later than (or after) the first/starting/earliest symbol of the transport block.

In response to the one or more configuration parameters indicating the control channel repetition, the wireless device may not receive the transport block with the mapping type based on the last/ending/latest symbol of the reference downlink control signal/channel transmission occasion occurring/being later than (or after) the first/starting/earliest symbol of the transport block.

The wireless device may not receive, in the time slot, the transport block with the mapping type.

The wireless device may not receive the transport block with the mapping type, for example, based on a first/starting/earliest symbol of the downlink control signal/channel transmission occasion occurring/being later than (or after or in a later symbol than) the first/starting/earliest symbol of the transport block.

The wireless device may not receive the transport block with the mapping type, for example, based on a last/ending/latest symbol of the downlink control signal/channel transmission occasion occurring/being later than (or after) the first/starting/earliest symbol of the transport block.

In response to the one or more configuration parameters indicating the control channel repetition, the wireless device may not receive the transport block with the mapping type based on the first/starting/earliest symbol of the downlink control signal/channel transmission occasion occurring/being later than (or after) the first/starting/earliest symbol of the transport block.

In response to the one or more configuration parameters indicating the control channel repetition, the wireless device may not receive the transport block with the mapping type based on the last/ending/latest symbol of the downlink control signal/channel transmission occasion occurring/being later than (or after) the first/starting/earliest symbol of the transport block.

In an example, the one or more configuration parameters may not indicate a control channel repetition.

In an example, the wireless device may receive, in a PDCCH monitoring occasion, a DCI scheduling a first transport block (e.g., PDCCH). The DCI may schedule reception of the transport block in a time slot. The base station may transmit the transport block in the time slot. The transport block may be associated with a mapping type (e.g., mapping type A, mapping type B). The time slot may comprise the PDCCH monitoring occasion. The wireless device may receive the DCI in the PDCCH monitoring occasion of the time slot.

In an example, the wireless device may receive the DCI in a first number of symbols (e.g., the first three symbols) of the time slot.

The wireless device may receive, in the time slot, the transport block with the mapping type. The wireless device may receive, in the time slot, the transport block with the mapping type, for example, based on the receiving the DCI in the first number of symbols of the time slot.

In response to the one or more configuration parameters not indicating the control channel repetition, the wireless device may receive, in the time slot, the transport block with the mapping type based on the receiving the DCI in the first number of symbols of the time slot.

In an example, the wireless device may not receive the DCI in a first number of symbols (e.g., the first three symbols) of the time slot.

The wireless device may not receive, in the time slot, the transport block with the mapping type. The wireless device may not receive, in the time slot, the transport block with the mapping type, for example, based on the not receiving the DCI in the first number of symbols of the time slot.

In response to the one or more configuration parameters not indicating the control channel repetition, the wireless device may not receive, in the time slot, the transport block with the mapping type based on the not receiving the DCI in the first number of symbols of the time slot.

The wireless device may receive, in the time slot, the transport block with the mapping type, for example, based on a first/starting/earliest symbol of the PDCCH monitoring occasion occurring/being earlier than (or before or in an earlier symbol than) the first/starting/earliest symbol of the transport block. In response to the one or more configuration parameters not indicating the control channel repetition, the wireless device may receive, in the time slot, the transport block with the mapping type based on the first/starting/earliest symbol of the PDCCH monitoring occasion occurring/being earlier than (or before or in an earlier symbol than) the first/starting/earliest symbol of the transport block.

The wireless device may not receive, in the time slot, the transport block with the mapping type, for example, based on a first/starting/earliest symbol of the PDCCH monitoring occasion occurring/being later than (or after or in a later symbol than) the first/starting/earliest symbol of the transport block. In response to the one or more configuration parameters not indicating the control channel repetition, the wireless device may not receive, in the time slot, the transport block with the mapping type based on the first/starting/earliest symbol of the PDCCH monitoring occasion occurring/being later than (or after or in a later symbol than) the first/starting/earliest symbol of the transport block.

What is claimed is:

1. A wireless device comprising:
   one or more processors; and
   memory storing instructions that, when executed by the one or more processors, cause the wireless device to:
     receive one or more radio resource control (RRC) messages comprising one or more configuration parameters, wherein:
       the one or more configuration parameters indicate two search space sets for physical downlink control channel (PDCCH) repetition; and
       each search space set of the two search space sets is associated with a respective control resource set (coreset) of two coresets;
     determine a first uplink resource for transmission of a first hybrid automatic repeat request acknowledgement (HARQ-ACK) in a time slot;
     receive, via at least one monitoring occasion of monitoring occasions of PDCCH candidates corresponding to the two search space sets, downlink control information (DCI) indicating a second uplink resource for transmission of a second HARQ-ACK in the time slot; and transmit, in the time slot, the second HARQ-ACK based on a monitoring occasion of the monitoring occasions being earlier than a time duration before a starting symbol of the first uplink resource, wherein an ending time of the monitoring occasion ends latest among ending times of the monitoring occasions.

2. The wireless device of claim 1, wherein the two coresets comprise:
a first coreset associated with a first search space set of the two search space sets; and
a second coreset associated with a second search space set of the two search space sets.

3. The wireless device of claim 2, wherein:
a first duration of the first coreset and a second duration of the second coreset are the same; and
a first number of control channel elements (CCEs) of the first coreset and a second number of CCEs of the second coreset are the same.

4. The wireless device of claim 3, wherein:
the instructions further cause the wireless device to monitor, in the monitoring occasions, the PDCCH candidates for a DCI format; and
each repetition of the DCI format has the same payload.

5. The wireless device of claim 4, wherein the monitoring occasions are in a slot.

6. The wireless device of claim 5, wherein:
the instructions further cause the wireless device to multiplex the second HARQ-ACK in the first uplink resource based on the monitoring occasion of the monitoring occasions being earlier than the time duration before the starting symbol of the first uplink resource; and
transmitting the second HARQ-ACK is after multiplexing the second HARQ-ACK in the first uplink resource.

7. The wireless device of claim 6, wherein the time duration is based on:
a subcarrier spacing of a downlink bandwidth part (BWP) that the DCI is received; and
a subcarrier spacing of an uplink BWP that the second HARQ-ACK is transmitted.

8. The wireless device of claim 7, wherein the instructions further cause the wireless device to:
determine a third uplink resource for transmission of a third HARQ-ACK in a second time slot;
receive, via at least one second monitoring occasion of second monitoring occasions of the PDCCH candidates, a second DCI indicating a fourth uplink resource for transmission of a fourth HARQ-ACK in the second time slot; and
not transmit, in the second time slot, the fourth HARQ-ACK based on a second monitoring occasion of the second monitoring occasions not being earlier than a second time duration before a starting symbol of the third uplink resource, wherein an ending time of the second monitoring occasion ends latest among ending times of the second monitoring occasions.

9. The wireless device of claim 8, wherein the instructions further cause the wireless device to not multiplex the fourth HARQ-ACK in the third uplink resource.

10. The wireless device of claim 9, wherein the instructions further cause the wireless device to receive a first DCI indicating the first uplink resource for transmission of the first HARQ-ACK in the time slot.

11. The wireless device of claim 1, wherein the instructions further cause the wireless device to:
determine a third uplink resource for transmission of a third HARQ-ACK in a second time slot;
receive, via at least one second monitoring occasion of second monitoring occasions of the PDCCH candidates, a second DCI indicating a fourth uplink resource for transmission of a fourth HARQ-ACK in the second time slot; and
not transmit, in the second time slot, the fourth HARQ-ACK based on a second monitoring occasion of the second monitoring occasions not being earlier than a second time duration before a starting symbol of the third uplink resource, wherein an ending time of the second monitoring occasion ends latest among ending times of the second monitoring occasions.

12. The wireless device of claim 11, wherein the instructions further cause the wireless device to not multiplex the fourth HARQ-ACK in the third uplink resource.

13. The wireless device of claim 12, wherein the instructions further cause the wireless device to multiplex the second HARQ-ACK in the first uplink resource.

14. The wireless device of claim 13, wherein the monitoring occasions are in a slot.

15. The wireless device of claim 14, wherein the two coresets comprise:
a first coreset associated with a first search space set of the two search space sets; and
a second coreset associated with a second search space set of the two search space sets.

16. The wireless device of claim 15, wherein:
a first duration of the first coreset and a second duration of the second coreset are the same; and
a first number of control channel elements (CCEs) of the first coreset and a second number of CCEs of the second coreset are the same.

17. The wireless device of claim 16, wherein the instructions further cause the wireless device to receive a first DCI indicating the first uplink resource for transmission of the first HARQ-ACK in the time slot.

18. The wireless device of claim 1, wherein the instructions further cause the wireless device to receive a first DCI indicating the first uplink resource for transmission of the first HARQ-ACK in the time slot.

19. The wireless device of claim 18, wherein the instructions further cause the wireless device to:
determine a third uplink resource for transmission of a third HARQ-ACK in a second time slot;
receive, via at least one second monitoring occasion of second monitoring occasions of the PDCCH candidates, a second DCI indicating a fourth uplink resource for transmission of a fourth HARQ-ACK in the second time slot; and
not transmit, in the second time slot, the fourth HARQ-ACK based on a second monitoring occasion of the second monitoring occasions not being earlier than a second time duration before a starting symbol of the third uplink resource, wherein an ending time of the second monitoring occasion ends latest among ending times of the second monitoring occasions.

20. The wireless device of claim 19, wherein the instructions further cause the wireless device to not multiplex the fourth HARQ-ACK in the third uplink resource.

* * * * *